US012585490B2

(12) United States Patent
Rolando et al.

(10) Patent No.: US 12,585,490 B2
(45) Date of Patent: Mar. 24, 2026

(54) MIGRATING VIRTUAL MACHINES WHILE PERFORMING MIDDLEBOX SERVICE OPERATIONS AT A PNIC

(71) Applicant: VMware LLC, Palo Alto, CA (US)

(72) Inventors: Pierluigi Rolando, San Marcos, CA (US); Peng Li, Fremont, CA (US); Boon S. Ang, Saratoga, CA (US); Guolin Yang, San Jose, CA (US); Wenyi Jiang, Fremont, CA (US); Yuxiao Zhang, San Jose, CA (US); Raju Koganty, San Jose, CA (US); Subrahmanyam Manuguri, San Jose, CA (US); Kok Pyng Liew, Cincinnati, OH (US); Jin Heo, Los Altos, CA (US); Srinath Suriyanarayanan Thillaisthanam, Fremont, CA (US)

(73) Assignee: VMware LLC, Palo Alto, CA (US)

( * ) Notice: Subject to any disclaimer, the term of this patent is extended or adjusted under 35 U.S.C. 154(b) by 426 days.

(21) Appl. No.: 18/229,644

(22) Filed: Aug. 2, 2023

(65) Prior Publication Data

US 2025/0036439 A1 Jan. 30, 2025

Related U.S. Application Data

(60) Provisional application No. 63/528,683, filed on Jul. 25, 2023, provisional application No. 63/528,680, (Continued)

(51) Int. Cl.
*G06F 9/455* (2018.01)
*H04L 9/40* (2022.01)
*H04L 41/0897* (2022.01)

(52) U.S. Cl.
CPC ...... *G06F 9/45558* (2013.01); *H04L 41/0897* (2022.05); *H04L 63/0218* (2013.01); (Continued)

(58) Field of Classification Search
CPC ......... G06F 9/45558; G06F 2009/4557; G06F 2009/45595; H04L 41/0897;
(Continued)

(56) References Cited

U.S. PATENT DOCUMENTS 9,116,736 B2 * 8/2015 Shamsee ............. G06F 9/45558
10,516,626 B1 * 12/2019 Kodeboyina ........... H04L 49/25
(Continued)

OTHER PUBLICATIONS

Stackexchange "Are two firewalls better than one" URL: https://security.stackexchange.com/questions/62213/ are-two-firewalls-better-than-one (Year: 2016).
(Continued)

*Primary Examiner* — Jorge A Chu Joy-Davila
(74) *Attorney, Agent, or Firm* — Kim & Stewart LLP

(57) ABSTRACT

Some embodiments provide a novel method for migrating virtual machines (VMs) from a first host computer to a second host computer. The first host computer is connected to a physical network interface card (PNIC) that performs middlebox service operations for flows associated with the VMs. At the PNIC, the method receives a notification that a VM is to be migrated from the first to the second host computer. The method configures an embedded hardware switch of the PNIC to forward a set of flows associated with the VM to a firewall of the PNIC. The embedded hardware switch was initially programmed to process the set of flows instead of the firewall. The method synchronizes flow cache information regarding the set of flows from the embedded hardware switch to the firewall. The method processes the set of flows at the firewall until the VM is migrated to the second host computer.

20 Claims, 29 Drawing Sheets

Related U.S. Application Data filed on Jul. 25, 2023, provisional application No. 63/528,681, filed on Jul. 25, 2023, provisional application No. 63/528,678, filed on Jul. 25, 2023, provisional application No. 63/528,675, filed on Jul. 25, 2023.

(52) U.S. Cl.
CPC ...... *H04L 63/0236* (2013.01); *H04L 63/0263* (2013.01); *H04L 63/20* (2013.01); *G06F 2009/4557* (2013.01); *G06F 2009/45595* (2013.01)

(58) Field of Classification Search
CPC ............. H04L 63/0218; H04L 63/0236; H04L 63/0263; H04L 63/20
See application file for complete search history.

(56) References Cited

U.S. PATENT DOCUMENTS

| | | | |
|---|---|---|---|
| 11,115,385 B1 | 9/2021 | Patel et al. | |
| 11,792,134 B2 | 10/2023 | Ang et al. | |
| 11,882,052 B2 | 1/2024 | Cheng et al. | |
| 2013/0125230 A1* | 5/2013 | Koponen | ........... H04L 41/0806 726/13 |
| 2013/0254766 A1 | 9/2013 | Zuo et al. | |
| 2013/0275592 A1 | 10/2013 | Xu et al. | |
| 2013/0322435 A1 | 12/2013 | Wood et al. | |
| 2015/0186174 A1* | 7/2015 | Borkmann | .......... G06F 9/45558 718/1 |
| 2017/0048200 A1* | 2/2017 | Chastain | ............. H04W 12/088 |
| 2017/0064749 A1 | 3/2017 | Jain et al. | |
| 2017/0161091 A1 | 6/2017 | Li et al. | |
| 2017/0244674 A1 | 8/2017 | Han | |
| 2017/0331739 A1 | 11/2017 | Sharma et al. | |
| 2019/0230025 A1 | 7/2019 | Kommula et al. | |
| 2019/0288947 A1 | 9/2019 | Jain et al. | |
| 2020/0028785 A1 | 1/2020 | Ang et al. | |
| 2020/0106744 A1 | 4/2020 | Miriyala et al. | |
| 2021/0092057 A1 | 3/2021 | Devireddy et al. | |
| 2021/0099383 A1 | 4/2021 | Chandra et al. | |
| 2021/0149708 A1 | 5/2021 | Koponen et al. | |
| 2022/0029858 A1 | 1/2022 | Jiang et al. | |
| 2022/0094644 A1 | 3/2022 | Cidon et al. | |
| 2022/0103487 A1* | 3/2022 | Ang | ...................... H04L 49/109 |
| 2024/0089294 A1 | 3/2024 | Khedri et al. | |
| 2025/0036439 A1 | 1/2025 | Rolando et al. | |
| 2025/0039128 A1 | 1/2025 | Rolando et al. | |

OTHER PUBLICATIONS

Non-Final Office Action mailed May 1, 2025 in U.S. Appl. No. 18/229,646, 11 pages.
Non-Final Office Action mailed Jul. 2, 2025 in U.S. Appl. No. 18/229,633, 25 pages.

* cited by examiner

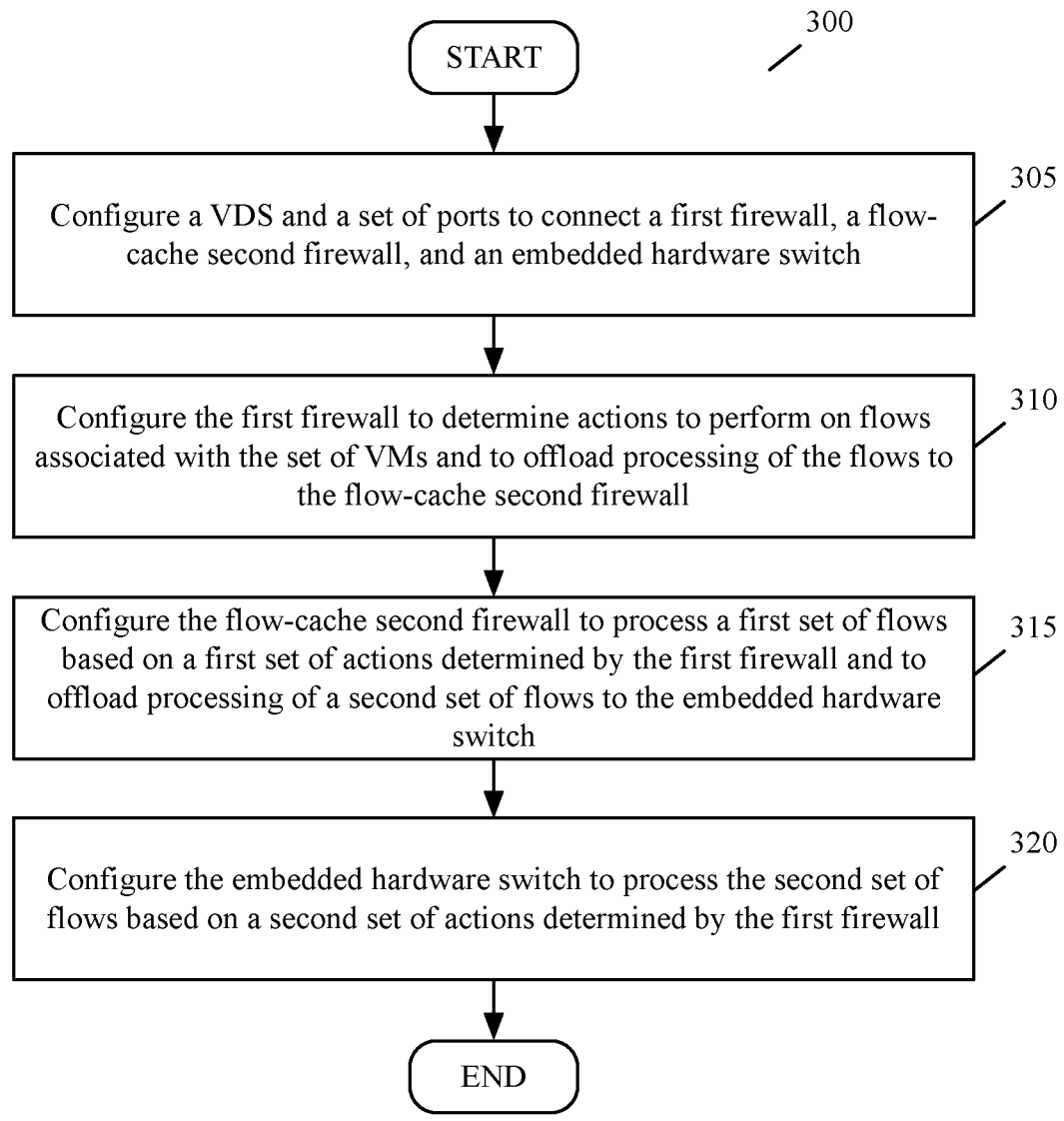

300

START

Configure a VDS and a set of ports to connect a first firewall, a flow-cache second firewall, and an embedded hardware switch

305

Configure the first firewall to determine actions to perform on flows associated with the set of VMs and to offload processing of the flows to the flow-cache second firewall

310

Configure the flow-cache second firewall to process a first set of flows based on a first set of actions determined by the first firewall and to offload processing of a second set of flows to the embedded hardware switch

315

Configure the embedded hardware switch to process the second set of flows based on a second set of actions determined by the first firewall

320

END

*Figure 3*

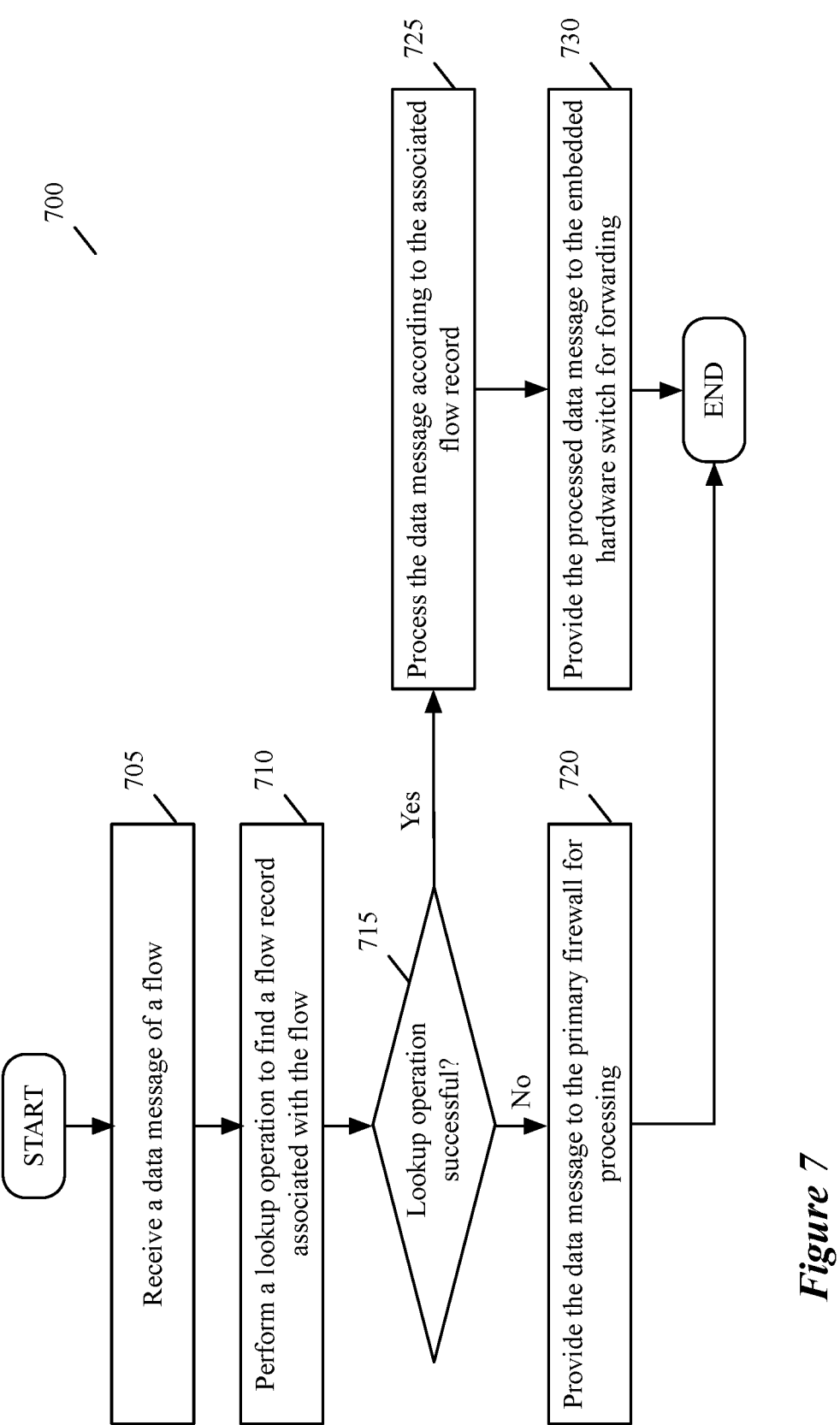

700

START

705
Receive a data message of a flow

710
Perform a lookup operation to find a flow record associated with the flow

715
Lookup operation successful?

Yes

No

725
Process the data message according to the associated flow record

720
Provide the data message to the primary firewall for processing

730
Provide the processed data message to the embedded hardware switch for forwarding

END

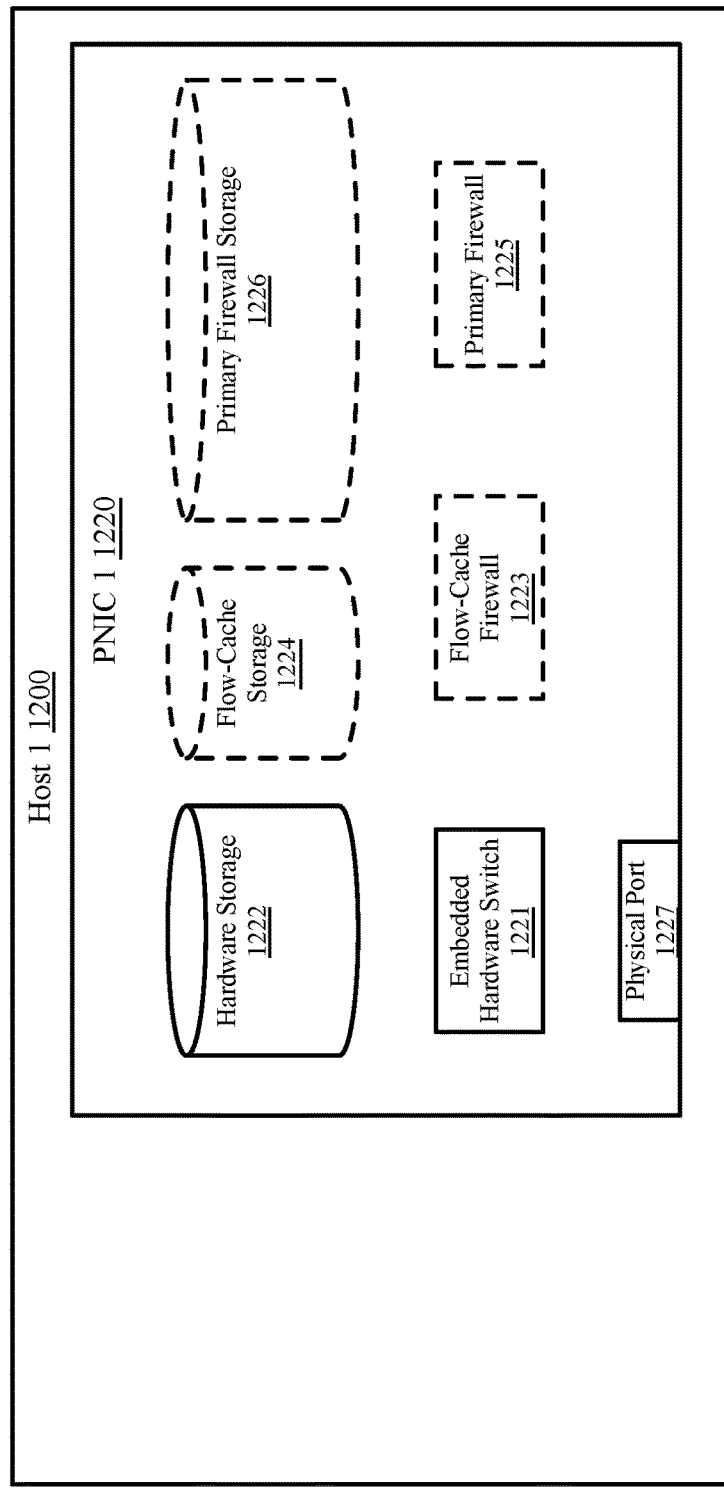
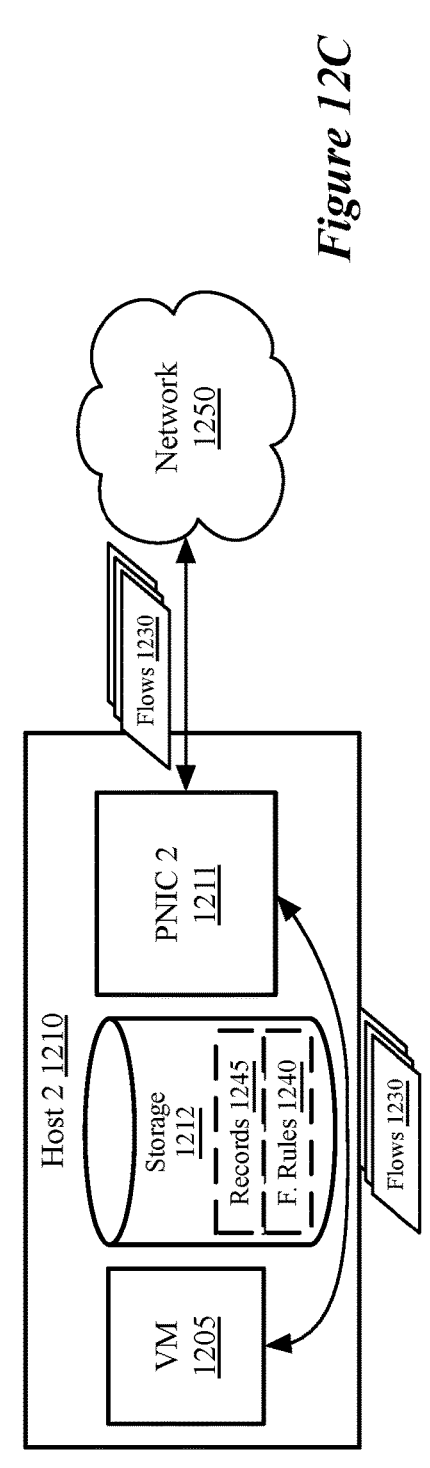
*Figure 12C*

1700

START

Receive a data message of a particular flow    1705

Identify a flow record already created for the particular flow    1710

Process the data message using the identified flow record    1715

1720

No    Was flow offloaded/
can it be offloaded?

Yes

Provide the particular flow's flow record to the flow-cache firewall    1725

END

MIGRATING VIRTUAL MACHINES WHILE PERFORMING MIDDLEBOX SERVICE OPERATIONS AT A PNIC

BACKGROUND

A firewall in some embodiments, such as a distributed firewall, monitors the state of active connections and uses this information to determine which data messages to allow through the firewall. Currently, a firewall is implemented in the hypervisor of a host computer and applied to virtual machines (VMs) executing on the host computer on a per-virtual network interface card (VNIC) basis. That is, the firewall rules are enforced at the VNIC of each VM. Inspection of an egress data message (i.e., a data message whose destination is external to the host computer) occurs at the VNIC of its source VM just as the data message is exiting the VM and entering a virtual switch of the host computer. Inspection on an ingress data message (i.e., a data message whose destination executes on the host computer) occurs also at the VNIC, just as the data message leaves the virtual switch of the host computer and before it reaches the destination VM.

Users in some embodiments create and configure firewall rules, which are stored in a network manager database. With a distributed firewall, a user is able to create Ethernet rules (e.g., Layer 2 (L2) rules) and general rules (e.g., Layer 3 (L3) to Layer 7 (L7) rules). These rules are published from the network manager to the host computers it manages and down to the VMs executing on the host computers. In some embodiments, all host computers in a cluster or a network store the same firewall policies and rules.

Smart network interface cards (NICs) are physical NICs with (1) a programmable or configurable switch or a packet processor on board, and (2) a general-purpose programmable Central Processing Unit (CPU) (e.g., ARM core). This allows the hypervisor of a host computer to offload networking and storage functionalities to the smart NIC in order to save CPU of the hypervisor. As such, methods and systems are needed for offloading firewall operations from the host computer to a connected smart NIC.

BRIEF SUMMARY

Some embodiments provide a novel method for offloading firewall operations from a host computer executing a set of one or more virtual machines (VMs) to a physical network interface card (PNIC) connected to the host computer. The method configures, on the PNIC, a first firewall (1) to determine actions to perform on data message flows associated with the set of VMs, and (2) to offload processing of the data message flows to a flow-cache second firewall of the PNIC. The method configures, on the PNIC, the flow-cache second firewall (1) to process a first set of data message flows based on a first set of actions determined by the first firewall, and (2) to offload processing of a second set of data message flows to an embedded hardware switch of the PNIC. The method configures, on the PNIC, the embedded hardware switch to process the second set of data message flows based on a second set of actions determined by the first firewall.

In some embodiments, the first firewall is the primary firewall of the PNIC. In some of these embodiments, the first firewall is a distributed firewall. The first firewall is configured to determine the actions to perform on the data message flows in some embodiments by determining the actions using at least a first data message of each data message flow.

In such embodiments, the first firewall receives the first data message of a flow, processes it using a set of firewall rules, and determines the actions to perform on the flow based on the firewall rules that were used to process the first data message. The set of firewall rules are provided to the first firewall in some embodiments by a network administrator. In some of these embodiments, the network administrator provides the set of firewall rules to a set of network management servers, which provides the set of firewall rules to the first firewall.

The actions to perform on the data message flows include allowing the data message flows, dropping the data message flows, or blocking the data message flows. Allowing a data message includes forwarding the data message to its specified destination. Dropping a data message includes dropping the data message at the component processing it (e.g., the primary firewall, the flow-cache firewall, or the embedded hardware switch) without notifying the source or the destination of the data message. Blocking a data message (also referred to as rejecting a data message, in some embodiments) includes not forwarding the data message to its specified destination and sending an error message to the source of the data message to notify the source that the data message was blocked.

Based on the firewall rule or rules that apply to each flow, the first firewall determines one of these actions to perform on the flow. In some embodiments, the actions further include one or more middlebox services, such as an intrusion detection system (IDS) service, a network address translation (NAT) service, a load balancing service, and a deep packet inspection (DPI) service. Any suitable middlebox service operation can be performed on a flow at the PNIC. In some embodiments, any L2-L7 services are performed at the PNIC, such as encryption and decryption (e.g., for virtual private network (VPN) or Transport Layer Security (TLS) traffic inspection), Uniform Resource Identifier (URI) filtering, Internet Protocol (IP) geographic filtering, etc. The first firewall in some embodiments determines services such as malware detection to be performed on the data message flow.

In some embodiments, before the first and second sets of data message flows are offloaded to the flow-cache second firewall and the embedded hardware switch, the method configures the embedded hardware switch to receive the data message flows and provide the data message flows to the first firewall. In such embodiments, the embedded hardware switch connects the PNIC to the host computer and to one or more external components (e.g., VMs executing on other host computers, external servers, etc.). As such, the embedded hardware switch is configured to provide the flows to the first firewall for processing, as the embedded hardware switch is not yet configured to process them itself. The embedded hardware switch receives the data message flows in some embodiments from the set of VMs executing on the connected host computer and/or a set of one or more external servers. The embedded hardware switch in some embodiments provides the data message flows to the first firewall by providing the data message flows to the flow-cache second firewall to provide to the first firewall.

After the first and second sets of data message flows are offloaded to the flow-cache second firewall and the embedded hardware switch, the method in some embodiments configures the embedded hardware switch to receive the first set of data message flows and provide the first set of data message flows to the flow-cache second firewall for processing. In such embodiments, because the embedded hardware switch is not configured to process the first set of data message flows, it provides it to the flow-cache second firewall for processing.

In some embodiments, the first firewall is configured to offload processing of the flows to the flow-cache second firewall by configuring the first firewall (1) to generate a first set of flow records for the first set of data message flows and a second set of flow records for the second set of data message flows, and (2) to provide the first and second sets of flow records to the flow-cache second firewall. In some embodiments, each flow record for each data message flow includes a flow identifier (ID) identifying the data message flow and a set of one or more actions to perform on data messages of the data message flow. The flow ID is in some embodiments the five-tuple of the flow (e.g., a source network address, a destination network address, a source port, a destination port, and a protocol of the flow). Conjunctively or alternatively, the flow ID includes a virtual local area network (VLAN) ID or a virtual network identifier (VNI).

In some embodiments a firewall rule specifies match criteria and an action to perform on a flow matching the match criteria. The firewall rule is in some embodiments applicable to one or more flows, as its match criteria is not limited to any specific five-tuple (e.g., the match criteria in some embodiments specifies two or more five-tuples relating to two or more different flows). Conversely, a flow record specifies a flow ID and a set of one or more actions to perform on a flow that has the same flow ID specified in the flow record. A flow record is only applicable to one flow, and a flow record indicates that the primary firewall has previously processed at least one data message of the flow (which was used to create the flow record). A flow record in some embodiments also specifies a firewall rule ID, which identifies which firewall rule was used to create the flow record. In some embodiments, a flow record is a connection tracking record, and specifies whether the software of the PNIC (i.e., the primary firewall or the flow-cache second firewall) or the hardware of the PNIC (i.e., the embedded hardware switch) is to process the flow.

The flow-cache second firewall is in some embodiments configured to process the first set of data message flows according to the first set of flow records it receives from the first firewall. In some embodiments, the second set of flow records is provided to the flow-cache second firewall because the flow-cache second firewall is configured to offload processing of the second set of data message flows to the embedded hardware switch. In such embodiments, the flow-cache second firewall is configured to provide the second set of flow records to the embedded hardware switch.

In some embodiments, the method also configures, on the PNIC, a physical network port to connect the embedded hardware switch to a set of one or more external servers through a network. This physical network port is what connects the host computer other components, such as the external servers and any other host computers. The method also configures on the host computer in some embodiments a set of one or more virtual network interface cards (VNICs) to connect the set of VMs to the PNIC. In some of these embodiments, each VM executing on the host computer is associated with its own VNIC to connect to the PNIC. Each VNIC in some embodiments connects to a different virtual function (VF) of the PNIC via a Peripheral Component Interconnect Express (PCIe) fabric.

The method in some embodiments configures, on the PNIC, a set of one or more ports to connect the embedded hardware switch to the flow-cache second firewall. In some of these embodiments, the set of ports is a set of representer ports, which are software ports of the PNIC. In some embodiments, the method also configures on the PNIC a virtual distributed switch (VDS) to connect the first firewall to the physical network port through the embedded hardware switch. In some of these embodiments, the VDS connects to a port of the set of ports on the PNIC to connect the first firewall to the physical network port through the embedded hardware switch.

Some embodiments provide a novel method for migrating VMs from a first host computer to a second host computer. The first host computer is connected to a PNIC that performs middlebox service operations for data message flows associated with the VMs. At the PNIC, the method receives a notification that a particular VM is to be migrated from the first host computer to the second host computer. The method configures an embedded hardware switch of the PNIC to forward a set of data message flows associated with the particular VM to a firewall of the PNIC. The embedded hardware switch was initially programmed to process the set of data message flows instead of the firewall. The method synchronizes flow cache information regarding the set of data message flows from a first flow record table of the embedded hardware switch to a second flow record table of the firewall. The method processes the set of data message flows at the firewall until the particular VM is migrated to the second host computer.

In some embodiments, the notification is received at the embedded hardware switch of the PNIC. In some of these embodiments, the embedded hardware switch received the notification from the particular VM. In such embodiments, the notification is received from the particular VM through a VNIC of the particular VM that connects to a VF of the PNIC. The VF is in some embodiments a virtualized PCIe function exposed as an interface of the PNIC. In some embodiments, the VF is associated with a physical interface of the PNIC, which is called a physical function (PF) in some embodiments.

The embedded hardware switch is configured to forward the set of data message flows associated with the particular VM to the primary firewall in some embodiments without processing the data message flows. This is because, in some embodiments, the particular VM is unable to be migrated unless the primary firewall processes all flows associated with the particular VM. In some embodiments, the flow cache information is synchronized from the embedded hardware switch to the firewall by extracting, for each data message flow in the set of data message flows, a flow record from the first flow record table and storing the flow record in the second flow record table. By extracting the flow records for the set of data message flows from the embedded hardware switch, the embedded hardware switch no longer has the necessary information to process the set of flows.

In some embodiments, the flow records are connection tracking records and include connection tracking information related to the components that process the flows (i.e., the firewall, flow-cache firewall, and embedded hardware switch). In other embodiments, the flow records are not connection tracking records. In such embodiments, a flow record specifies a flow ID and one or more actions to perform on the flow (and, in some embodiments, the set of one or more firewall rules that match the flow), but not any connection tracking information.

The flow ID is in some embodiments the five-tuple of the flow. Conjunctively or alternatively, the flow ID includes a VLAN ID or a VNI. Each set of actions in some embodiments includes one of (1) allowing the data message flow, (2) dropping the data message flow, or (3) blocking the data message flow. In some embodiments, at least one set of actions for at least one flow includes performing one or more middlebox service operations on the flow other than firewall operations. Examples of middlebox service operations includes IDS, IPS, NAT, load balancing, and DPI. Any suitable middlebox service operation can be performed on a flow at the PNIC.

While processing the set of data message flows at the firewall, the method in some embodiments provides the flow cache information and a set of firewall rules associated with the set of data message flows to the second host computer to migrate the particular VM to the second host computer. This allows the second host computer to have the necessary information to successfully instantiate the particular VM on the second host computer and replicate the exact firewall state of the particular VM. In some embodiments, the method provides the flow cache information and the set of firewall rules to the second host computer by providing the flow cache information and the set of firewall rules from the firewall to the embedded hardware switch to provide to the second host computer.

In some embodiments, the firewall is a first firewall, and the receiving, configuring, synchronizing, and processing are performed by a flow-cache second firewall of the PNIC. In such embodiments, the set of data message flows are processed at the first firewall as the flow-cache second firewall provides the set of data messages to the first firewall for processing. In some embodiments, the received notification is a first notification. In such embodiments, the method receives a second notification that migration of the particular VM to the second host computer has failed. After receiving the second notification, the method reconfigures the embedded hardware switch to process the set of data message flows without providing the set of data message flows to the firewall. Because the particular VM was not able to be migrated to the second host computer, the embedded hardware switch can again process the flows associated with it. In such embodiments, the flow-cache second firewall retrieves the flow cache information from the first firewall and provides the flow cache information a second time to the embedded hardware switch to store in the first flow record table.

Some embodiments provide a novel method for processing data message flows at an embedded hardware switch of a PNIC connected to a host computer. A firewall of the PNIC detects an end of a particular data message flow associated with a particular VM of the host computer. Processing of the particular data message flow was offloaded from the firewall to an embedded hardware switch of the PNIC. After detecting the end of the particular data message flow, the firewall ends offloading of the particular data message flow by deleting a first flow record stored at the embedded hardware switch for the particular data message flow. The firewall deletes a second flow record stored at the first firewall for the particular data message flow.

The firewall is in some embodiments a software firewall of the PNIC, and is the primary firewall of the PNIC. In such embodiments, the firewall offloads processing of at least one flow to the embedded hardware switch and/or a flow-cache second firewall of the PNIC.

In some embodiments, the particular data message flow is a Transmission Control Protocol (TCP) flow, and the firewall detects the end of the TCP flow by receiving from the embedded hardware switch a TCP finish (FIN) data message indicating the end of the TCP flow. In such embodiments, the TCP FIN data message is received from the embedded hardware switch after the embedded hardware switch determined that it could not process the TCP FIN data message.

In some embodiments, the firewall receives one TCP FIN message to detect that the particular data message flow is ending. In other embodiments, the received TCP FIN data message is a first TCP FIN data message, and the firewall detects the end of the TCP flow by also receiving a second TCP FIN data message from the embedded hardware switch. In these embodiments, the firewall receives TCP FIN data messages from both endpoints of the flow in order to detect that it is ending. The first TCP FIN data message originates in some embodiments from the particular VM. The second TCP FIN data message originates from another VM executing on another host computer in some embodiments and an external server in other embodiments.

In some embodiments, the particular data message flow is a user datagram protocol (UDP) flow, and the firewall detects the end of the UDP flow by determining that no data messages of the UDP flow have been processed by the embedded hardware switch for a particular period of time. In some of these embodiments, the firewall periodically receives, from the embedded hardware switch, statistics associated with the UDP flow indicating a number of data messages of the UDP flow being processed by the embedded hardware switch. These statistics in some embodiments also indicate a number of bytes of the particular data message flow processed by the embedded switch. The firewall in some embodiments determines that no data messages of the UDP flow have been processed by the embedded hardware switch for the particular period of time by examining the received statistics to determine that no data messages of the UDP flow have been processed by the embedded hardware switch for the particular period of time. Similarly to UDP flows, in some embodiments, the firewall periodically receives statistics associated with other types of flows (e.g., TCP flows) to use to determine when to end the flows.

The firewall in some embodiments ends offloading of the particular data message flow by directing the flow-cache second firewall of the PNIC to end the offloading. In such embodiments, the flow-cache second firewall is directed to delete the first flow record from a first flow record table of the embedded hardware switch. The firewall deletes the second flow record itself from a second flow record table of the firewall.

In some embodiments, the first and second flow records each include a flow ID identifying the particular data message flow and a set of one or more actions to perform on data messages of the particular data message flow. In some of these embodiments, the flow ID is the five-tuple of the flow. The set of actions in some embodiments specify an action to (1) allow the particular data message flow, (2) drop the particular data message flow, or (3) block the particular data message flow. In some embodiments, the set of actions also specifies performing one or more middlebox service operations on the particular data message flow. Examples of middlebox service operations includes IDS, IPS, NAT, load balancing, and DPI. Any suitable middlebox service operation can be performed on a flow at the PNIC.

Before the detecting, ending, and deleting, the firewall in some embodiments receives a first data message of the particular data message flow. After receiving the first data message, the firewall processes the first data message according to a set of firewall rules to determine the set of actions. Using the set of actions and the flow ID, the firewall creates the second flow record to store at the first firewall, and replicates the second flow record to create the first flow record. Then, the firewall provides the first flow record to the flow-cache second firewall to provide to the embedded hardware switch to offload processing of the particular data message flow.

Some embodiments provide a novel method for updating firewall rules for data message flows processed at a PNIC connected to a host computer. A firewall of the PNIC receives an update to a particular firewall rule. The firewall identifies a particular data message flow that is processed at an embedded hardware switch of the PNIC using the particular firewall rule. The firewall updates a flow record associated with the particular data message flow to reflect the received update to the particular firewall rule. The firewall provides the updated flow record to the embedded hardware switch for the embedded hardware switch to process the particular flow according to the received update.

The firewall is in some embodiments a software firewall of the PNIC, and is the primary firewall of the PNIC. In such embodiments, the firewall offloads processing of at least one flow to the embedded hardware switch and/or a flow-cache second firewall of the PNIC. In some embodiments, the update to the particular firewall rule is received from a network administrator (e.g., through a set of one or more management servers). The update to the particular firewall rule is received at the firewall in some embodiments from the embedded hardware switch which received it from the network administrator. In such embodiments, the embedded hardware switch is what connects the PNIC to the host computer and one or more external components (e.g., the set of management servers, other host computers, external servers, etc.).

In some embodiments, the firewall identifies the particular data message flow by examining the data message flows processed at the PNIC and firewall rules associated with the data message flows to identify that the particular data message flow is processed using the particular firewall rule. The firewall identifies the particular data message flow such that it can update the flow record for the particular data message flow to reflect the received update. In some embodiments, the flow record associated with the particular data message flow includes a flow ID (e.g., five-tuple) of the particular flow and a set of one or more actions to perform on data messages of the particular data message flow. The actions in some embodiments specify a particular action to perform on the particular data message flow according to the particular firewall rule, such that the firewall updates the flow record by updating the particular action to reflect the received update.

The firewall updates the particular action in some embodiments by (1) updating the particular action from allowing the particular data message flow to dropping the particular data message flow, (2) updating the particular action from dropping the particular data message flow to allowing the particular data message flow, (3) updating the particular action from allowing the particular data message flow to blocking the particular data message flow, (4) updating the particular action from blocking the particular data message flow to allowing the particular data message flow, (5) updating the particular action from dropping the particular data message flow to blocking the particular data message flow, or (6) updating the particular action from blocking the particular data message flow to dropping the particular data message flow.

In some embodiments, the firewall updates the flow record by adding or removing a particular action specified in the received update to the set of actions. In some of these embodiments, the newly added or removed action is a particular middlebox service to perform on the particular data message flow (e.g., IDS, IPS, NAT, load balancing, DPI, etc.). Any suitable middlebox service can be added to or removed from the set of actions.

The firewall of the PNIC is in some embodiments a first firewall of the PNIC. In such embodiments, the first firewall provides the updated flow record to the embedded hardware switch by providing the updated flow record to a flow-cache second firewall of the PNIC to provide to the embedded hardware switch. In such embodiments, the first firewall notifies the flow-cache second firewall that the embedded hardware switch is to receive the updated flow record. In some of these embodiments, the flow-cache firewall also stores the updated flow record in its own data storage or flow record table.

In some embodiments, before the receiving, identifying, updating, and providing, the first firewall receives a first data message of the particular data message flow. The first firewall creates the flow record for the particular data message flow. The first firewall stores the flow record at a first flow record table of the first firewall, and provides the flow record to the flow-cache second firewall to provide to the embedded hardware switch to offload processing of the particular data message flow. In some embodiments, the first firewall creates the flow record by processing the first data message according to a set of firewall rules, including the particular firewall rule, to determine the set of actions to perform on the particular data message flow.

Some embodiments provide a novel method for using connection tracking records to process data messages at a PNIC connected to a host computer. A first software firewall of the PNIC determines whether processing of a particular data message flow is passable to a second software firewall of the PNIC and to a third hardware firewall of the PNIC. The first software firewall creates (1) a connection tracking record for the particular data message flow, and (2) data specifying whether processing of the particular data message flow is passable to the second software firewall and independently whether processing of the particular data message flow is passable to the third hardware firewall. The first software firewall provides the connection tracking record and said data to the second software firewall of the PNIC so that the second software firewall processes the particular data message flow or passes the connection tracking record and the data to the third hardware firewall if determination was that the particular data message flow is passable to the third hardware firewall.

In some embodiments, the first software firewall is a primary firewall of the PNIC, the second software firewall is a flow-cache firewall of the PNIC, and the third hardware firewall is an embedded hardware switch of the PNIC. The particular data message flow is exchanged in some embodiments between a particular VM executing on the host computer and an external server.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description, and Drawings.

BRIEF DESCRIPTION OF THE DRAWINGS

The novel features of the invention are set forth in the appended claims. However, for purposes of explanation, several embodiments of the invention are set forth in the following figures.

FIG. 3 conceptually illustrates a process of some embodiments for offloading firewall operations from a host computer executing a set of one or more VMs to a PNIC connected to the host computer.

FIG. 7 conceptually illustrates a process of some embodiments for processing flows at a flow-cache secondary firewall of a PNIC that also includes a primary firewall for processing flows.

FIGS. 12A-C illustrate three stages of an example first host computer migrating a VM to a second host computer while processing flows associated with the VM at a PNIC connected to the first host computer.

DETAILED DESCRIPTION

Figure 1:
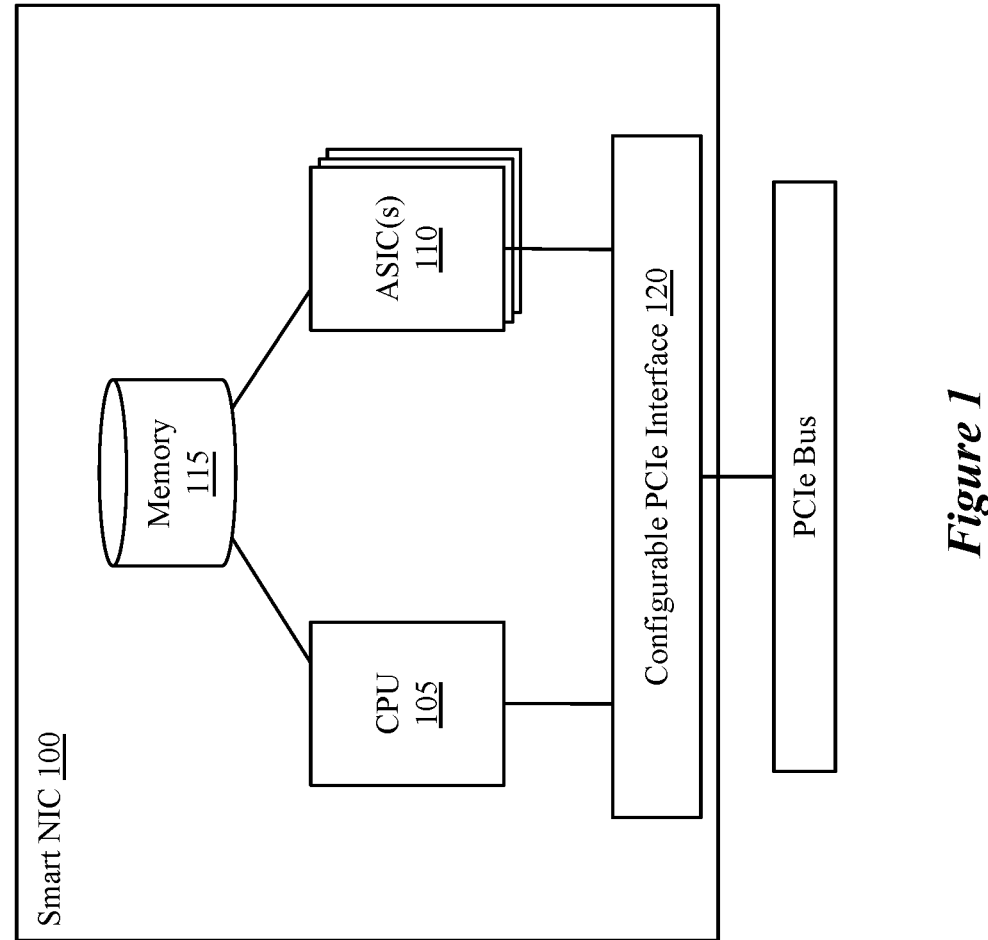
FIG. 1 illustrates the hardware of a smart NIC of some embodiments that can be configured to perform middlebox service offload for a host computer.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a novel method for offloading firewall operations from a host computer executing a set of one or more virtual machines (VMs) to a physical network interface card (PNIC) connected to the host computer. The method configures, on the PNIC, a first firewall (1) to determine actions to perform on data message flows associated with the set of VMs, and (2) to offload processing of the data message flows to a flow-cache second firewall of the PNIC. The method configures, on the PNIC, the flow-cache second firewall (1) to process a first set of data message flows based on a first set of actions determined by the first firewall, and (2) to offload processing of a second set of data message flows to an embedded hardware switch of the PNIC. The method configures, on the PNIC, the embedded hardware switch to process the second set of data message flows based on a second set of actions determined by the first firewall.

In some embodiments, the first firewall is the primary firewall of the PNIC. In some of these embodiments, the first firewall is a distributed firewall. The first firewall is configured to determine the actions to perform on the data message flows in some embodiments by determining the actions using at least a first data message of each data message flow. In such embodiments, the first firewall receives the first data message of a flow, processes it using a set of firewall rules, and determines the actions to perform on the flow based on the firewall rules that were used to process the first data message. The set of firewall rules are provided to the first firewall in some embodiments by a network administrator. In some of these embodiments, the network administrator provides the set of firewall rules to a set of network management servers, which provides the set of firewall rules to the first firewall.

The actions to perform on the data message flows include allowing the data message flows, dropping the data message flows, or blocking the data message flows. Allowing a data message includes forwarding the data message to its specified destination. Dropping a data message includes dropping the data message at the component processing it (e.g., the primary firewall, the flow-cache firewall, or the embedded hardware switch) without notifying the source or the destination of the data message. Blocking a data message (also referred to as rejecting a data message, in some embodiments) includes not forwarding the data message to its specified destination and sending an error message to the source of the data message to notify the source that the data message was blocked.

Based on the firewall rule or rules that apply to each flow, the first firewall determines one of these actions to perform on the flow. In some embodiments, the actions further include one or more middlebox services, such as an intrusion detection system (IDS) service, a network address translation (NAT) service, a load balancing service, and a deep packet inspection (DPI) service. Any suitable middlebox service operation can be performed on a flow at the PNIC.

In some embodiments, before the first and second sets of data message flows are offloaded to the flow-cache second firewall and the embedded hardware switch, the method configures the embedded hardware switch to receive the data message flows and provide the data message flows to the first firewall. In such embodiments, the embedded hardware switch connects the PNIC to the host computer and to one or more external components (e.g., VMs executing on other host computers, external servers, etc.). As such, the embedded hardware switch is configured to provide the flows to the first firewall for processing, as the embedded hardware switch is not yet configured to process them itself. The embedded hardware switch receives the data message flows in some embodiments from the set of VMs executing on the connected host computer and/or a set of one or more external servers. The embedded hardware switch in some embodiments provides the data message flows to the first firewall by providing the data message flows to the flow-cache second firewall to provide to the first firewall.

After the first and second sets of data message flows are offloaded to the flow-cache second firewall and the embedded hardware switch, the method in some embodiments configures the embedded hardware switch to receive the first set of data message flows and provide the first set of data message flows to the flow-cache second firewall for processing. In such embodiments, because the embedded hardware switch is not configured to process the first set of data message flows, it provides it to the flow-cache second firewall for processing.

In some embodiments, the first firewall is configured to offload processing of the flows to the flow-cache second firewall by configuring the first firewall (1) to generate a first set of flow records for the first set of data message flows and a second set of flow records for the second set of data message flows, and (2) to provide the first and second sets of flow records to the flow-cache second firewall. In some embodiments, each flow record for each data message flow includes a flow identifier (ID) identifying the data message flow and a set of one or more actions to perform on data messages of the data message flow. The flow ID is in some embodiments the five-tuple of the flow (e.g., a source network address, a destination network address, a source port, a destination port, and a protocol of the flow). Conjunctively or alternatively, the flow ID includes a virtual local area network (VLAN) ID or a virtual network identifier (VNI).

In some embodiments a firewall rule specifies match criteria and an action to perform on a flow matching the match criteria. The firewall rule is in some embodiments applicable to one or more flows, as its match criteria is not limited to any specific five-tuple. Conversely, a flow record specifies a flow ID and a set of one or more actions to perform on a flow that has the same flow ID specified in the flow record. A flow record is only applicable to one flow, and a flow record indicates that the primary firewall has previously processed at least one data message of the flow (which was used to create the flow record). A flow record in some embodiments also specifies a firewall rule ID, which identifies which firewall rule was used to process the flow and create the flow record. In some embodiments, a flow record is a connection tracking record, and specifies whether the software of the PNIC (i.e., the primary firewall or the flow-cache firewall) or the hardware of the PNIC (i.e., the embedded hardware switch) is to process the flow.

The flow-cache second firewall is in some embodiments configured to process the first set of data message flows according to the first set of flow records it receives from the first firewall. In some embodiments, the second set of flow records is provided to the flow-cache second firewall because the flow-cache second firewall is configured to offload processing of the second set of data message flows to the embedded hardware switch. In such embodiments, the flow-cache second firewall is configured to provide the second set of flow records to the embedded hardware switch.

In some embodiments, the method also configures, on the PNIC, a physical network port to connect the embedded hardware switch to a set of one or more external servers through a network. This physical network port is what connects the host computer other components, such as the external servers and any other host computers. The method also configures on the host computer in some embodiments a set of one or more virtual network interface cards (VNICs) to connect the set of VMs to the PNIC. In some of these embodiments, each VM executing on the host computer is associated with its own VNIC to connect to the PNIC. Each VNIC in some embodiments connects to a different virtual function (VF) of the PNIC via a Peripheral Component Interconnect Express (PCIe) fabric. In other embodiments, each VM connects to the PNIC through a software switch executing on the host computer.

The method in some embodiments configures, on the PNIC, a set of one or more ports to connect the embedded hardware switch to the flow-cache second firewall. In some of these embodiments, the set of ports is a set of representer ports, which are software ports on the PNIC. In some embodiments, the method also configures on the PNIC a virtual distributed switch (VDS) to connect the first firewall to the physical network port through the embedded hardware switch. In some of these embodiments, the VDS connects to a port of the set of ports on the PNIC to connect the first firewall to the physical network port through the embedded hardware switch.

Some embodiments provide a novel method for migrating VMs from a first host computer to a second host computer. The first host computer is connected to a PNIC that performs middlebox service operations for data message flows associated with the VMs. At the PNIC, the method receives a notification that a particular VM is to be migrated from the first host computer to the second host computer. The method configures an embedded hardware switch of the PNIC to forward a set of data message flows associated with the particular VM to a firewall of the PNIC. The embedded hardware switch was initially programmed to process the set of data message flows instead of the firewall. The method synchronizes flow cache information regarding the set of data message flows from a first flow record table of the embedded hardware switch to a second flow record table of the firewall. The method processes the set of data message flows at the firewall until the particular VM is migrated to the second host computer.

In some embodiments, the notification is received at the embedded hardware switch of the PNIC. In some of these embodiments, the embedded hardware switch received the notification from the particular VM. In such embodiments, the notification is received from the particular VM through a VNIC of the particular VM that connects to a VF of the PNIC. The VF is in some embodiments a virtualized PCIe function exposed as an interface of the PNIC. In some embodiments, the VF is associated with a physical interface of the PNIC, which is called a physical function (PF) in some embodiments.

The embedded hardware switch is configured to forward the set of data message flows associated with the particular VM to the firewall in some embodiments without processing the data message flows. This is because, in some embodiments, the particular VM is unable to be migrated until the firewall processes all flows associated with the particular VM. In some embodiments, the flow cache information is synchronized from the embedded hardware switch to the firewall by extracting, for each data message flow in the set of data message flows, a flow record from the first flow record table and storing the flow record in the second flow record table. By extracting the flow records for the set of data message flows from the embedded hardware switch, the embedded hardware switch no longer has the necessary information to process the set of flows.

In some embodiments, the flow records are connection tracking records and include connection tracking information related to the components that process the flows (i.e., the firewall, flow-cache firewall, and embedded hardware switch). In other embodiments, the flow records are not connection tracking records. In such embodiments, a flow record specifies a flow ID and one or more actions to perform on the flow (and, in some embodiments, the set of one or more firewall rules that match the flow), but not any connection tracking information.

While processing the set of data message flows at the firewall, the method in some embodiments provides the flow cache information and a set of firewall rules associated with the set of data message flows to the second host computer to migrate the particular VM to the second host computer. This allows the second host computer to have the necessary information to successfully instantiate the particular VM on the second host computer and replicate the exact firewall state of the particular VM. In some embodiments, the method provides the flow cache information and the set of firewall rules to the second host computer by providing the flow cache information and the set of firewall rules from the firewall to the embedded hardware switch to provide to the second host computer.

Some embodiments provide a novel method for processing data message flows at an embedded hardware switch of a PNIC connected to a host computer. A firewall of the PNIC detects an end of a particular data message flow associated with a particular VM of the host computer. Processing of the particular data message flow was offloaded from the firewall to an embedded hardware switch of the PNIC. After detecting the end of the particular data message flow, the firewall ends offloading of the particular data message flow by deleting a first flow record stored at the embedded hardware switch for the particular data message flow. The firewall deletes a second flow record stored at the first firewall for the particular data message flow.

In some embodiments, the particular data message flow is a Transmission Control Protocol (TCP) flow, and the firewall detects the end of the TCP flow by receiving from the embedded hardware switch a TCP finish (FIN) data message indicating the end of the TCP flow. In such embodiments, the TCP FIN data message is received from the embedded hardware switch after the embedded hardware switch determined that it could not process the TCP FIN data message.

In some embodiments, the firewall receives one TCP FIN message to detect that the particular data message flow is ending. In other embodiments, the received TCP FIN data message is a first TCP FIN data message, and the firewall detects the end of the TCP flow by also receiving a second TCP FIN data message from the embedded hardware switch. In these embodiments, the firewall receives TCP FIN data messages from both endpoints of the flow in order to detect that it is ending. The first TCP FIN data message originates in some embodiments from the particular VM. The second TCP FIN data message originates from another VM executing on another host computer in some embodiments and an external server in other embodiments.

In some embodiments, the firewall detects the end of the particular data message flow by determining that no data messages of the particular data message flow have been processed by the embedded hardware switch for a particular period of time. In such embodiments, the particular data message flow may be any type of flow, such as a user datagram protocol (UDP) flow, a TCP, or any other type of flow. In some of these embodiments, the firewall periodically receives, from the embedded hardware switch, statistics associated with the particular data message flow indicating a number of data messages of the particular data message flow being processed by the embedded hardware switch. These statistics in some embodiments also indicate a number of bytes of the particular data message flow processed by the embedded switch. The firewall in some embodiments determines that no data messages of the particular data message flow have been processed by the embedded hardware switch for the particular period of time by examining the received statistics to determine that no data messages of the particular data message flow have been processed by the embedded hardware switch for the particular period of time.

The firewall in some embodiments ends offloading of the particular data message flow by directing the flow-cache second firewall of the PNIC to end the offloading. In such embodiments, the flow-cache second firewall is directed to delete the first flow record from a first flow record table of the embedded hardware switch. The firewall deletes the second flow record itself from a second flow record table of the firewall.

Some embodiments provide a novel method for updating firewall rules for data message flows processed at a PNIC connected to a host computer. A firewall of the PNIC receives an update to a particular firewall rule. The firewall identifies a particular data message flow that is processed at an embedded hardware switch of the PNIC using the particular firewall rule. The firewall updates a flow record associated with the particular data message flow to reflect the received update to the particular firewall rule. The firewall provides the updated flow record to the embedded hardware switch for the embedded hardware switch to process the particular flow according to the received update.

The firewall is in some embodiments a software firewall of the PNIC, and is the primary firewall of the PNIC. In such embodiments, the firewall offloads processing of at least one flow to the embedded hardware switch and a flow-cache second firewall of the PNIC. In some embodiments, the update to the particular firewall rule is received from a network administrator (e.g., through a set of one or more management servers). The update to the particular firewall rule is received at the firewall in some embodiments from the embedded hardware switch which received it from the network administrator. In such embodiments, the embedded hardware switch is what connects the PNIC to the host computer and one or more external components (e.g., the set of management servers, other host computers, external servers, etc.).

In some embodiments, the firewall identifies the particular data message flow by examining the data message flows processed at the PNIC and firewall rules associated with the data message flows to identify that the particular data message flow is processed using the particular firewall rule. The firewall identifies the particular data message flow such that it can update the flow record for the particular data message flow to reflect the received update. In some embodiments, the flow record associated with the particular data message flow includes a flow ID (e.g., five-tuple, VLAN ID, VNI, etc.) of the particular flow and a set of one or more actions to perform on data messages of the particular data message flow. The actions in some embodiments specify a particular action to perform on the particular data message flow according to the particular firewall rule, such that the firewall updates the flow record by updating the particular action to reflect the received update.

The firewall updates the particular action in some embodiments by (1) updating the particular action from allowing the particular data message flow to dropping the particular data message flow, (2) updating the particular action from dropping the particular data message flow to allowing the particular data message flow, (3) updating the particular action from allowing the particular data message flow to blocking the particular data message flow, (4) updating the particular action from blocking the particular data message flow to allowing the particular data message flow, (5) updating the particular action from dropping the particular data message flow to blocking the particular data message flow, or (6) updating the particular action from blocking the particular data message flow to dropping the particular data message flow.

Some embodiments provide a novel method for using connection tracking records to process data messages at a PNIC connected to a host computer. A first software firewall of the PNIC determines whether processing of a particular data message flow is passable to a second software firewall of the PNIC and to a third hardware firewall of the PNIC. The first software firewall creates (1) a connection tracking record for the particular data message flow, and (2) data specifying whether processing of the particular data message flow is passable to the second software firewall and independently whether processing of the particular data message flow is passable to the third hardware firewall. The first software firewall provides the connection tracking record and said data to the second software firewall of the PNIC so that the second software firewall processes the particular data message flow or passes the connection tracking record and the data to the third hardware firewall if determination was that the particular data message flow is passable to the third hardware firewall.

In some embodiments, the first software firewall is a primary firewall of the PNIC, the second software firewall is a flow-cache firewall of the PNIC, and the third hardware firewall is an embedded hardware switch of the PNIC. The particular data message flow is exchanged in some embodiments between a particular VM executing on the host computer and an external server.

As used in this document, references to L2, L3, L4, and L7 layers (or Layer 2, Layer 3, Layer 4, or Layer 7) are references respectively to the second data link layer, the third network layer, the fourth transport layer, and the seventh application layer of the OSI (Open System Interconnection) layer model.

In some embodiments, the PNIC is a smart NIC. The smart NIC, in some embodiments, is a configurable network interface controller that includes a general-purpose central processing unit (CPU) (typically low-power compared to the processor of the computer for which the smart NIC acts as the network interface) in addition to one or more application-specific circuits (e.g., data message processing circuits).

FIG. 1 illustrates the hardware of a smart NIC 100 of some embodiments that can be configured to perform middlebox service (e.g., firewall service) offload for a host computer. As shown, the smart NIC 100 includes its own general-purpose CPU 105, a set of application-specific integrated circuit (ASICs) 110, a memory 115, and a configurable PCIe interface 120. The ASICs 110, in some embodiments, include at least one Input/Output (I/O) ASIC that handles the processing of data messages forwarded to and from the host computer, and are at least partly controlled by the CPU 105. In some embodiments, either in addition to or as an alternative to the ASICs, the smart NIC includes a set of configurable field-programmable gate arrays (FPGAs). Conjunctively or alternatively, the smart NIC includes other accelerators (e.g., cryptographic accelerators) and regular expression engines.

The configurable PCIe interface 120 enables connection of the smart NIC 100 to the other physical components of a computer system (e.g., the x86 CPU, memory, etc.) via the PCIe bus of the computer system. Via this configurable PCIe interface 120, the smart NIC 100 of some embodiments presents itself to the computer system as a multitude of devices, including a data message processing NIC, a hard disk (using non-volatile memory express (NVMe) over PCIe), a set of VFs and PFs, or other types of devices. The CPU 105 executes a NIC operating system (OS) in some embodiments that controls the ASICs 110 and can perform other operations as well. In some embodiments, a network forwarding and middlebox service offload ASIC 110 performs the operations to offload middlebox services, such as firewall services, from a host computer.

Figure 2:
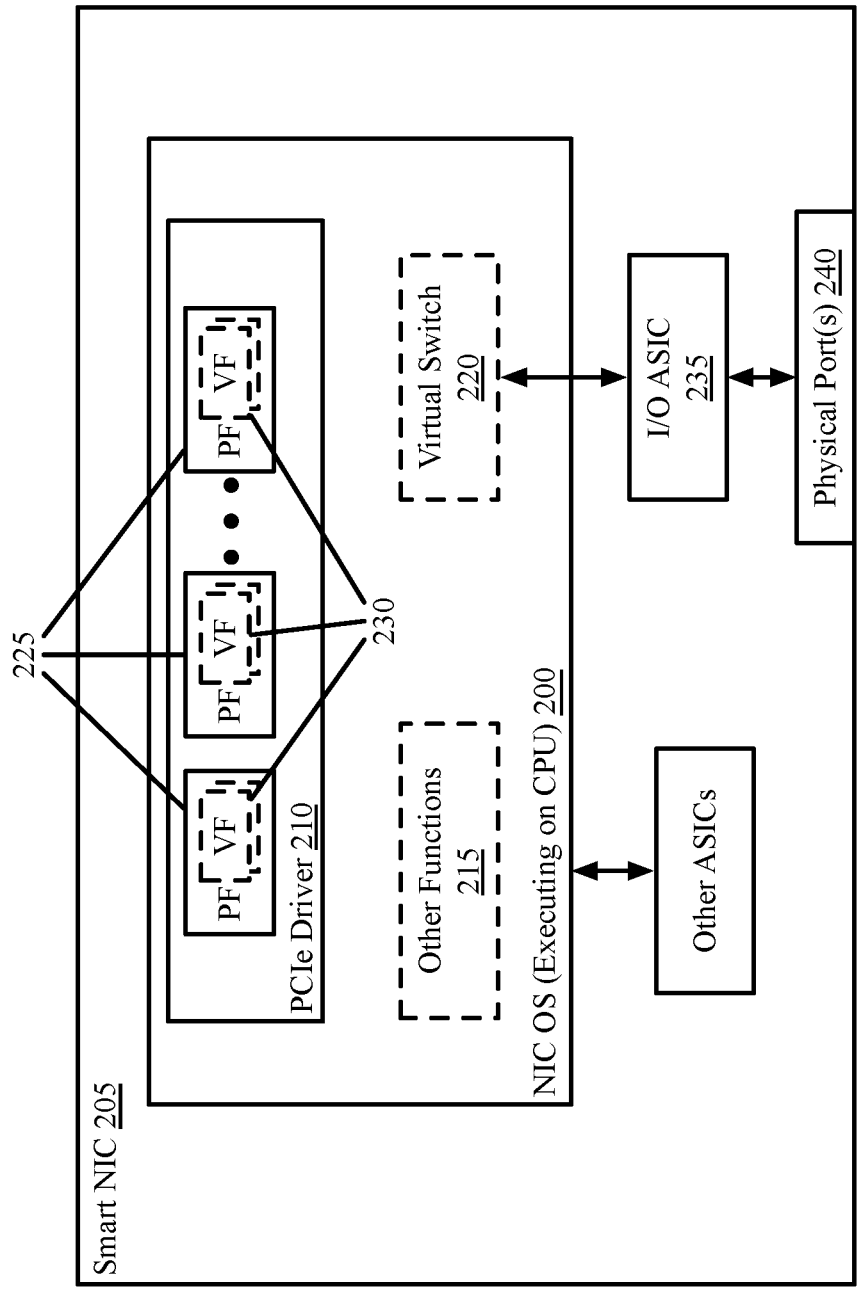
FIG. 2 illustrates the NIC OS of a smart NIC of some embodiments.

FIG. 2 illustrates an example NIC OS 200 of a smart NIC 205 of some embodiments. The NIC OS 200 is executed, in some embodiments, by the CPU of the smart NIC (e.g., CPU 105 of FIG. 1). This NIC OS 200 includes a PCIe driver 210, a virtual switch 220, and other functions 215.

The PCIe driver 210 exposes multiple PFs 225, each of which capable of instantiating multiple VFs 230. These different VFs 225 enable the smart NIC 205 to present as multiple different types of devices to the computer system to which it attaches via its PCIe bus. For instance, the smart NIC can present itself as a network adapter (for processing data messages to and from the computer system) as well as an NVMe disk in some embodiments.

The NIC OS 200 of some embodiments is capable of executing a virtualization program (similar to a hypervisor) that enables sharing resources (e.g., memory, CPU resources) of the smart NIC among multiple machines (e.g., VMs) if those VMs execute on the computer. The virtualization program in some embodiments provides compute virtualization services and/or network virtualization services similar to a managed hypervisor in some embodiments. These network virtualization services, in some embodiments, include segregating data messages into different private (e.g., overlay) networks that are defined over the physical network (shared between the private networks), forwarding the data messages for these private networks (e.g., performing switching and/or routing operations), and/or performing middlebox services for the private networks.

To implement these network virtualization services, the NIC OS 200 of some embodiments executes the virtual switch 220. The virtual switch 220 enables the smart NIC 205 to perform software-defined networking and provide the I/O ASIC 235 of the smart NIC 205 with a set of flow entries (e.g., the cache entries described herein) so that the I/O ASIC 235 can perform flow processing offload (FPO) for the computer system in some embodiments. The I/O ASIC 235, in some embodiments, receives data messages from the network and transmits data messages to the network via one or more physical network ports 240.

The other functions 215 executed by the NIC operating system 200 of some embodiments can include various other operations, including operations not directly related to data message processing (e.g., operations for a machine-learning system). In addition, the NIC operating system 200 (either the virtual switch 220 or other functions 215 of the operating system) in some embodiments performs various cache entry validation and invalidation operations and maintain a rule update table used to perform the cache entry validation.

As noted, the smart NIC of some embodiments processes data messages using cache entries (e.g., cache entries installed by a software forwarding element (SFE) executing on a computer for which the smart NIC is the interface) such that at least a subset of the data messages received at the smart NIC can be processed without a need to provide the data messages to the SFE. Data message processing by the smart NIC ASIC tends to be faster than processing by the SFE, even before accounting for the savings realized by avoiding the need to pass the data messages to and from the computer (e.g., via the PCIe interface).

FIG. 3 conceptually illustrates a process 300 of some embodiments for offloading firewall operations from a host computer executing a set of one or more VMs to a PNIC connected to the host computer. The process 300 is performed in some embodiments to configure the PNIC for performing firewall operations on data message flows sent to and from the set of VMs. In some embodiments, the PNIC is a smart NIC. The data message flows associated with the VMs are in some embodiments exchanged with a set of one or more external servers through a network. In other embodiments, the data message flows associated with the VMs are exchanged with one or more other VMs executing on one or more other host computers.

The process 300 begins by configuring (at 305) a VDS and a set of ports on the PNIC to connect a first firewall, a flow-cache second firewall, and an embedded hardware switch. In some embodiments, the set of ports includes a first port to connect the embedded hardware switch and the flow-cache second firewall. A second port is configured in some embodiments to connect the embedded hardware switch and flow-cache second firewall, and to also connect the embedded hardware switch to the first firewall through the VDS.

In some embodiments, the process 300 also configures (1) a physical network port on the PNIC to connect the embedded switch to the network, one or more external servers, one or more other host computers, etc., and (2) a set of VNICs on the host computer to connect the set of VMs to the PNIC (specifically to the embedded hardware switch). The VNICs in some embodiments each connect to a different VF of the PNIC via a PCIe fabric.

Next, the process 300 configures (at 310) the first firewall of the PNIC to (1) determine actions to perform on flows associated with the set of VMs, and (2) to offload processing of the flows to the flow-cache second firewall of the PNIC. In some embodiments, the first firewall is configured to determine actions to perform on each flow based on a first data message of the flow. In such embodiments, the first firewall receives the first data message of the flow, compares the first data message against a set of firewall rules to determine one or more matching firewall rules, and performs the actions specified in the matching firewall rules on the first data message. In some embodiments, the first firewall also determines one or more middlebox services to perform on the data message, such as IDS, IPS, NAT, load balancing, DPI, etc. The firewall may determine any L2-L7 services to perform on a data message, such as encryption and decryption (e.g., for virtual private network (VPN) or Transport Layer Security (TLS) traffic inspection), Uniform Resource Identifier (URI) filtering, Internet Protocol (IP) geographic filtering, etc. The first firewall in some embodiments determines services, such as malware detection, to be performed on a data message flow.

The set of firewall rules are provided to the first firewall in some embodiments by a network administrator. The first data message is provided to the first firewall in some embodiments by the flow-cache second firewall of the PNIC that received it from the embedded hardware switch. In some embodiments, the embedded hardware switch received the first data message from its source (e.g., a VM executing on the host computer or an external server).

After performing the action or actions on the first data message of the flow, the first firewall creates a flow record for the flow, which specifies a flow ID identifying the flow and the action or actions to perform on the data messages of the flow. In some embodiments, the flow ID is the flow's five-tuple (e.g., source network address, destination network address, source port, destination port, protocol), a VLAN ID, and/or a VNI. In other embodiments, it is a universal unique identifier (UUID) or a globally unique identifier (GUID). Any suitable flow ID may be used.

In some embodiments, a set of flow records is stored in an explicit table. In other embodiments, the set of flow records is stored as a session object created and associated with different flows. In some embodiments, the primary firewall creates a single flow record for both directions of a flow. In other embodiments, the primary firewall creates different flow records for different directions of a flow (i.e., two flow records are created for each direction of one connection). In such embodiments, the primary firewall does so because the flow-cache second firewall and the embedded hardware switch only process unidirectional flows.

The first firewall is configured to offload the flows to the flow-cache second firewall in some embodiments by providing flow records for the flows to the flow-cache second firewall. In some embodiments, the embedded hardware switch of the PNIC is also capable of performing flow processing and firewall operations. In such embodiments, the first firewall is configured to provide one or more flow records for one or more flows to the flow-cache second firewall, for the flow-cache second firewall to provide to the embedded hardware switch. In some embodiments, the first firewall offloads a flow after having received and processed at least one data message in each direction of the flow (i.e., in both directions for a bidirectional flow, in one direction for a unidirectional flow). In other embodiments, the first firewall offloads the processing of a flow after receiving and processing a first data message of the flow used to create the flow record. For TCP flows, the firewall in some embodiments offloads the TCP flows after the connection has been established (i.e., after a synchronize (SYN) data message and a SYN-Acknowledge (SYN-ACK) data message has been processed for the TCP flow).

At 315, the process 300 configures the flow-cache second firewall on the PNIC (1) to process a first set of flows based on a first set of actions determined by the first firewall, and (2) to offload processing of a second set of flows to the embedded hardware switch of the PNIC. After receiving a first set of flow records for the first set of flows (which specifies the first set of actions), the flow-cache second firewall is able to process the first set of flows instead of the first firewall. The first set of flows is in some embodiments not able to be processed by the embedded hardware switch, so they are offloaded only to the flow-cache second firewall. For instance, the first set of flows require processing operations not supported by the embedded hardware switch but supported by the flow-cache second firewall.

In some embodiments, in receiving flow records from the first firewall, the flow-cache second firewall is notified that the second set of flows can be either processed at the flow-cache second firewall or the embedded hardware switch. Upon receiving a second set of flow records for the second set of flows, the flow-cache second firewall offloads processing of the second set of flows by providing the second set of flow records to the embedded hardware switch. In other embodiments, the flow-cache firewall processes the second set of flows instead of offloading the processing to the embedded hardware switch.

TCP flows are in some embodiments offloaded to the embedded hardware switch after the PNIC processes both TCP SYN data messages and SYN-ACK data messages of the flow. UDP flows and Internet Control Message Protocol (ICMP) flows are in some embodiments offloaded to the embedded hardware switch after the primary firewall processes at least one data message of the flow.

Lastly, the process 300 configures (at 320) the embedded hardware switch on the PNIC to process the second set of flows based on a second set of actions determined by the first firewall. After receiving the second set of flow records for the second set of flows (which specifies the second set of actions), the embedded hardware switch is able to process the second set of flows instead of the first firewall and the flow-cache second firewall. In some embodiments, the embedded hardware switch is also configured to receive the first set of flows from its source or sources and provide the first set of flows to the flow-cache second firewall for processing. After configuring the embedded hardware switch, the process 300 ends.

Figure 4:
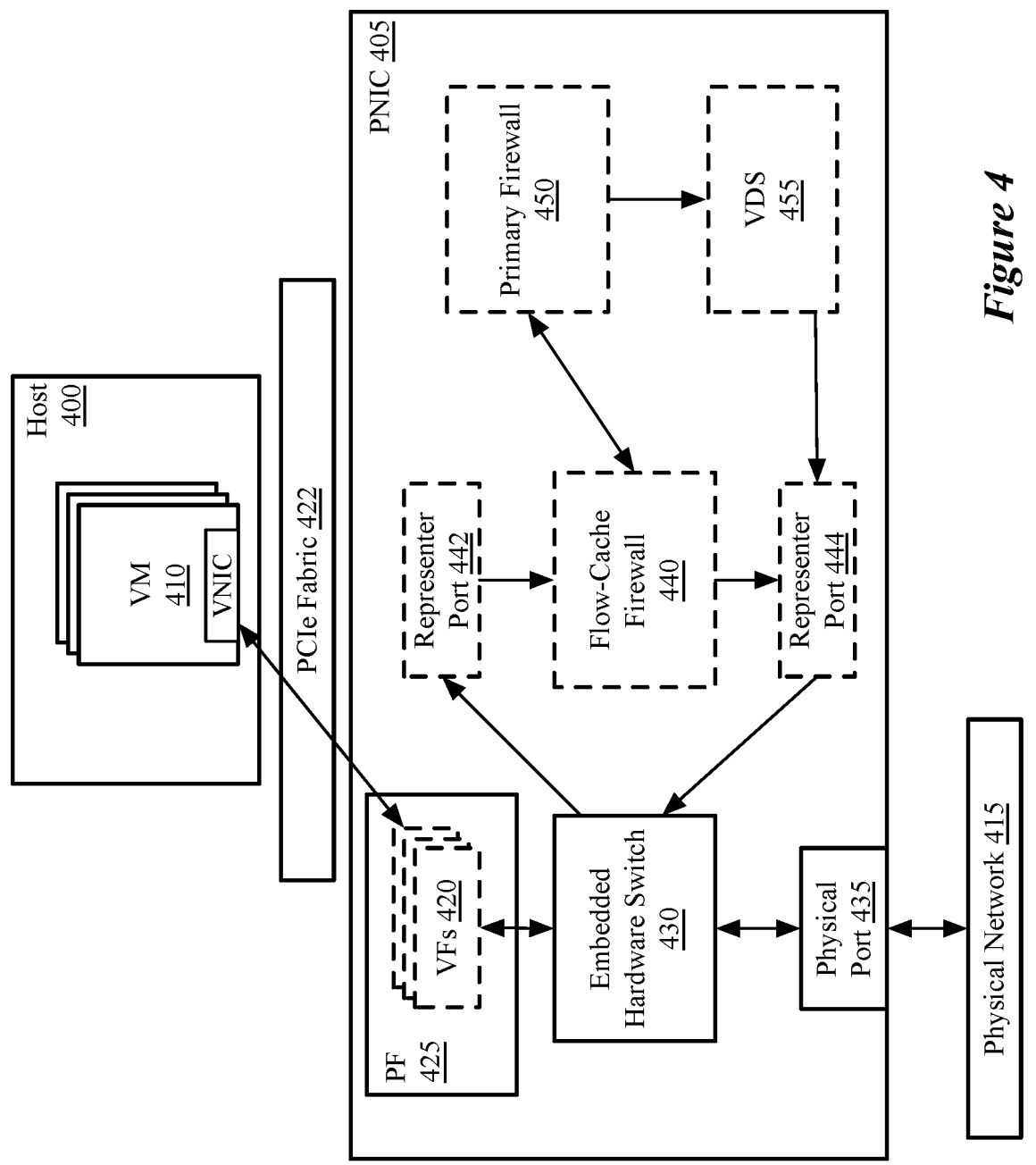
FIG. 4 illustrates an example host computer that connects to a PNIC that includes a primary firewall, a flow-cache firewall, and an embedded hardware switch for performing firewall operations.

FIG. 4 illustrates an example host computer 400 that connects to a PNIC 405. The PNIC 405 is in some embodiments a smart NIC. The host computer 400 executes a set of one or more VMs 410 that send and receive data message flows with a physical network 415. The host computer 400 can execute any number of VMs 410, and each VM can send and receive any number of flows with the physical network 415.

Each of the VMs 410 in some embodiments has an associated VNIC that connects to a different VF 420 of the PNIC 405 via a PCIe fabric 422 (e.g., a motherboard-level interconnect that connects the physical processor of the host computer 400 to the physical interfaces of the PNIC 405). In some of these embodiments, each VNIC, and thus each VM 410, is bound to a different VF of the PNIC 405. The VFs 420, in some embodiments, are virtualized PCIe functions exposed as interfaces of the PNIC 405. Each VF is associated with a PF 425, which is a physical interface of the PNIC that is recognized as a unique PCIe resource. The VFs 420 are illustrated using dashed lines to indicate that they are software components of the PNIC 405, and the PF 425 is illustrated using a solid line to indicate that it is a physical component of the PNIC 405. In this case, the PNIC 405 has one PF 425, but other embodiments the PNIC 405 has more than one PF. The PF 425 is virtualized to provide at least the VFs 420. In some embodiments, the VFs 420 are provided so as to provide different VMs 410 with different virtual interfaces of the PNIC 405 to which they each connect. In some embodiments, VF drivers (not shown) execute in each of the VMs 410 to manage their respective connections to the VFs 420.

Alternatively or conjunctively, the VMs 410 connect to the PNIC 405 using a software switch (not shown) of the host computer 400, which uses one or more interfaces (e.g., PF 425) exposed by the PNIC 405 as the uplink. In such embodiments, the PNIC 405 does not expose any VFs 420.

The VFs 420 connect to an embedded hardware switch 430 of the PNIC 405. The embedded hardware switch 430 is a hardware component of the PNIC 405 (as denoted by a solid line) that is configured to send and receive flows from the VMs 410 and the physical network 415. In some embodiments, the embedded hardware switch 430 is configured for allowing processing of the flows at the PNIC 405. In such embodiments, the embedded hardware switch 430, upon receiving a data message of a flow, performs a lookup operation to determine whether it stores a flow record needed for processing the data message. In some embodiments, a single flow record is created for both directions of a flow (i.e., a first direction from a VM 410 to an external component and a second direction from the external component to the VM 410). In other embodiments, different flow records are created for different directions of a flow (i.e., two flow records are created for each flow). For example, different flow records are created for a single flow in some embodiments because the VM 410 is allowed to send data messages to the external component, but the external component is blocked from sending data messages to the VM 410.

If the embedded hardware switch 430 determines that it does have an associated flow record, the embedded hardware switch 430 processes the data message and forwards it to its destination (if the data message is allowed). If the destination is one of the VMs 410, the embedded hardware switch 430 forwards the processed data message to one of the VFs 420 to forward to the destination VM. If the destination is external to the host computer (e.g., it is an external server, a VM executing on a different host computer, etc.), it forwards the processed data message to a physical port 435 of the PNIC 405 to forward to the physical network 415 to reach its destination. The physical network port 435 provides the physical communication to the physical network 415 for the host computer 400. In some embodiments, the PNIC 405 includes multiple physical network ports to connect to the physical network 415.

If the embedded hardware switch 430 determines that it does not have an associated flow record for a received data message, it provides the data message to the flow-cache firewall 440 through a first representer port 442 of the PNIC 405. In some embodiments, the flow-cache firewall 440 is a software firewall of the PNIC 405 and the representer port 442 is a software port of the PNIC 405, as denoted by dashed lines.

A flow-cache firewall 440 is a virtual switch or a packet processor in some embodiments that, when properly configured with information about a flow, implements the functionality of a firewall and/or of a switch on that flow. After a primary firewall 450 of the PNIC 405 identifies the firewall rule and creates a flow record for a flow, the flow-cache firewall 440 takes responsibility of the flow's processing and matches the created flow record to the flow in order to process it. In some embodiments, a flow-cache firewall of a PNIC is implemented by an Enhanced Network Stack (ENS) software switch (e.g., offered by VMware, inc.). In other embodiments, a flow-cache firewall of a PNIC is implemented by an Open Virtual Switch (OVS). Any suitable software switch may be used to implement a flow-cache firewall of a PNIC.

Upon receiving a data message for a flow from the embedded hardware switch 430, the flow-cache firewall 440 performs a lookup operation (similarly to the embedded hardware switch 430) to determine whether it stores a flow record needed for processing the data message. If the flow-cache firewall 440 determines that it does have an associated flow record, it processes the data message and forwards the processed data message back to the embedded hardware switch 430 for forwarding it to its destination (if the data message is allowed). In some embodiments, the flow-cache firewall 440 provides the processed data message back to the embedded hardware switch 430 through a second representer port 444 of the PNIC 405 (as shown). In other embodiments, it provides the processed data message back through the first representer port 442.

If the flow-cache firewall 440 determines that it does not have an associated flow record for a received data message, it provides the data message to the primary firewall 450 of the PNIC 405. The primary firewall 450 is in some embodiments a software firewall of the PNIC 405, as denoted by a dashed line. In some embodiments, the primary firewall 450 is a distributed firewall implemented by multiple firewall instances. Upon receiving a data message from the flow-cache firewall 440, the primary firewall 450 performs a lookup operation (similarly to the embedded hardware switch 430 and flow-cache firewall 440) to determine whether it has already created a flow record for the data message's flow.

If the primary firewall 450 determines that it does store a flow record for the received data message's flow, it processes the data message using the flow record and forwards the processed data message to the VDS 455 (if the data message is allowed). The VDS 450 provides the processed data message to the second representor port 444 to reach the embedded hardware switch 430 for forwarding to its destination. If the primary firewall 450 determines that it has not yet created a flow record for the received data message's flow (e.g., if the data message is the first data message of the flow), the primary firewall 450 processes the data message according to a set of firewall rules. In some embodiments, the set of firewall rules is received at the primary firewall 450 by a network administrator.

To process the data message using the set of firewall rules, the primary firewall 450 in some embodiments compares the data message against the firewall rules in a priority order. In such embodiments, the primary firewall 450 stores the set of firewall rules in a list, and compares the data message against the first firewall rule. If the first firewall rule matches the data message, the first firewall rule is enforced on the data message. If the first firewall rule does not match the data message, the primary firewall 450 moves onto the next firewall rule. This process continues until the primary firewall 450 finds a matching firewall rule for the data message. In some embodiments, the last firewall rule in the set of firewall rules is a default firewall rule, meaning that it will match any data message. This to ensure that all data messages processed at the primary firewall 450 are processed. In some embodiments, the set of firewall rules used by the primary firewall rule are L2-L4 stateful firewall rules.

After processing the data message, the primary firewall 450 creates a flow record for the data message's flow. In some embodiments, the flow record identifies the flow (e.g., using a flow ID) and summarizes the actions to perform on the data messages of the flow. The actions to perform on the flow include one of allowing the flow, dropping the flow, or blocking the flow. In some embodiments, the actions also to perform on the flow include at least one middlebox service other than a firewall service (e.g., IDS, IPS, NAT, load balancing, DPI, etc.). The flow record allows the primary firewall 450 to process subsequent data messages of the flow without having to refer to the set of firewall rules. This also allows the primary firewall 450 to offload processing of the flow to the flow-cache firewall 440 or the embedded hardware switch 430 by providing the flow record to the flow-cache firewall 440 or the embedded hardware switch 430. In some embodiments, the primary firewall 450 keeps track of which flows it has offloaded. In other embodiments, it does not, and the flow-cache firewall 440 keeps track of which flows are offloaded.

Figure 5:
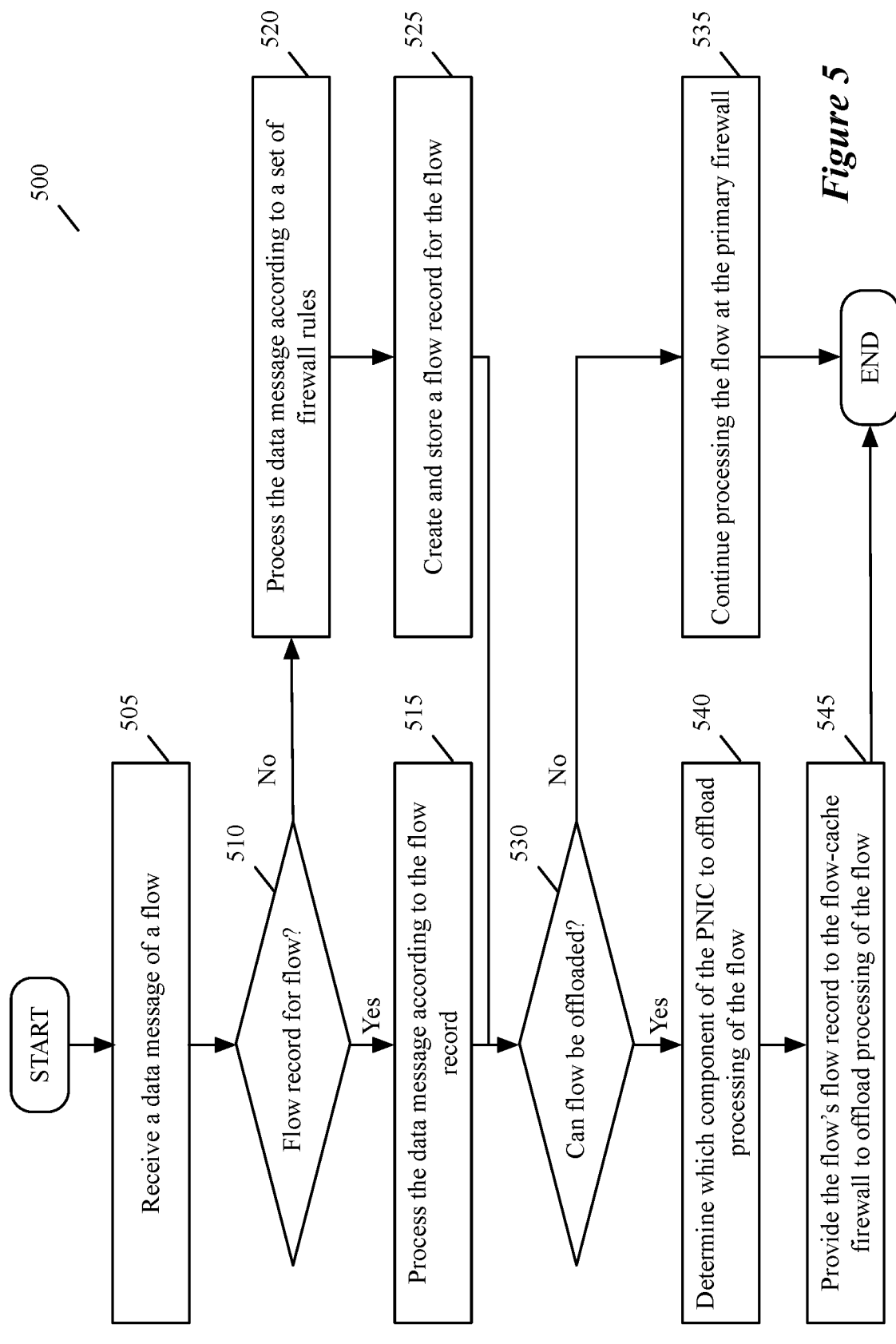
FIG. 5 conceptually illustrates a process of some embodiments for processing flows at a primary firewall of a PNIC.

FIG. 5 conceptually illustrates a process 500 of some embodiments for processing flows at a primary firewall of a PNIC. The process 500 is performed in some embodiments by a primary firewall (such as the primary firewall 450 of FIG. 4) for a particular data message flow associated with a VM executing on a host computer connected to the PNIC. In some embodiments, the data message is sent by the VM to be forwarded to a destination external to the host computer, such as an external server or another VM executing on another host computer. In other embodiments, it is sent by an external source to be forwarded to the VM executing on the host computer.

The process 500 begins by receiving (at 505) a data message of the particular data message flow. In some embodiments, the primary firewall receives the data message from a flow-cache second firewall of the PNIC, which received it from an embedded hardware switch of the PNIC. The received data message is in some embodiments a first data message of the flow, such that neither the embedded hardware switch nor the flow-cache second firewall have a flow record needed for processing the data message. In other embodiments, the data message is not a first data message of the flow, but the embedded hardware switch and flow-cache second firewall were unable to process the data message. Further information regarding such data messages will be described below.

After receiving the data message, the process 500 determines (at 510) whether a flow record is stored for the data message's flow. In some embodiments, the primary firewall creates and stores in a local data store a flow record for each flow it processes. A flow record in some embodiments specifies a flow ID (e.g., five-tuple, VLAN ID, VNI, GUID, UUID, etc.) identifying the flow and a set of one or more actions to perform on the data messages of the flow. In such embodiments, the primary firewall extracts the flow ID from the received data message and compares it to each flow record it stores.

If the process 500 determines that a flow record is stored for the received data message, the process 500 processes (at 515) the data message according to the flow record. In some embodiments, the flow record specifies that data messages of the flow are to be dropped. In such embodiments, the primary firewall drops the data message. In other embodiments, the flow record specifies that data messages of the flow are to be allowed. In such embodiments, the primary firewall allows the data message to be forwarded to its destination. Still, in other embodiments, the flow record specifies that data messages of the flow are to be blocked (i.e., rejected). In such embodiments, the primary firewall drops the data message and sends a rejection data message back to the blocked data message's source.

If the process 500 determines that a flow record is not stored for the received data message, the process 500 processes (at 520) the data message according to a set of firewall rules. Because no flow record is stored for the data message's flow, the primary firewall uses the set of firewall rules to process the data message. For example, the primary firewall in some embodiments stores a set of firewall rules that were received from a network administrator, and determines which rule or rules are to be applied to the received data message.

The primary firewall in some embodiments processes the data message according to the set of firewall rules by comparing the data message against the firewall rules in a priority order, as discussed above. In some embodiments, different VMs of the host computer require different firewall rules. In such embodiments, the primary firewall rule determines which firewall rule or rules are associated with the data message by determining which VM is associated with the received data message.

After processing the data message according to the set of firewall rules, the process 500 creates (at 525) and stores a flow record for the flow. After the primary firewall determines which actions are to be performed on the flow (based on how the primary firewall processed the data message according to the set of firewall rules), the primary firewall creates a flow record for the flow that specifies the flow's ID and the action or actions to perform on the flow. In some embodiments, flows whose data messages are not allowed do not have flow records created. In some of these embodiments, the primary firewall continues to process these flows without offloading the processing of the flows to a flow-cache firewall (e.g., a packet processor or a software switch) or an embedded hardware switch of the PNIC.

In some embodiments, the primary firewall creates a single flow record for both directions of a flow. In other embodiments, the primary firewall creates different flow records for different directions of a flow (i.e., two flow records are created for each direction of a bidirectional flow). In such embodiments, the primary firewall does so because the flow-cache firewall and the embedded hardware switch only process unidirectional flows.

Next, the process 500 determines (at 530) whether the processing of the flow can be offloaded or not. In some embodiments, the primary firewall is able to offload flow processing (e.g., firewall operations) of at least one flow to a flow-cache firewall of the PNIC or an embedded hardware switch of the PNIC. In some of these embodiments, the ability to offload depends on the processing capabilities of the flow-cache firewall and the embedded hardware switch. For example, neither the embedded hardware switch nor the flow-cache firewall are capable of processing TCP SYN data messages and SYN-ACK data messages, so these data messages have to be processed at the primary firewall. As another example, L4 flows that are selected for L7 attribute sampling are not offloaded to the embedded hardware switch, but can be offloaded to the flow-cache firewall. The primary firewall in some embodiments examines the flow and the actions needed to perform on the flow in order to determine whether the flow's processing can be offloaded.

In some embodiments, the primary firewall determines whether the flow can be offloaded or not by determining whether it has received and processed at least one data message in each direction of the flow (i.e., in both directions for a bidirectional flow, in one direction for a unidirectional flow). In other embodiments, the primary firewall determines whether the flow can be offloaded by determining that it has received and processed at least one data message of the flow. For TCP flows, the primary firewall in some embodiments determines whether it can offload a TCP flow by determining whether the connection has been established (i.e., after a SYN data message and a SYN-ACK data message has been processed for the TCP flow).

If the process 500 determines that the processing of the flow cannot be offloaded, the process 500 continues (at 535) processing the flow at the primary firewall. When the primary firewall determines that neither the embedded switch nor the flow-cache firewall are capable of processing the flow, the primary firewall continues to process it. After continuing to process the flow at the primary firewall, the process 500 ends.

If the process 500 determines that the processing of the flow can be offloaded, the process 500 determines (at 540) which component of the PNIC to offload processing of the flow. In some embodiments, the flow-cache firewall is capable of processing a particular flow, while the embedded hardware switch is not. For example, the embedded switch in some embodiments is incapable of processing Application Layer Gateway (ALG) data messages (i.e., data messages that require an ALG), but the flow-cache firewall is. In such embodiments, the primary firewall can offload the flow's processing to the flow-cache firewall but not the embedded hardware switch. In some embodiments, all flows that are able to be processed at the embedded hardware switch can also be processed at the flow-cache firewall. In such embodiments, the primary firewall notifies the flow-cache firewall that the flow processing can be processed at the flow-cache firewall or further offloaded to the embedded hardware switch if the flow-cache firewall wishes to offload it further.

After determining which component of the PNIC to offload the processing (e.g., the flow-cache firewall or the embedded hardware switch), the process 500 provides (at 545) the flow's flow record to the flow-cache firewall to offload processing of the flow. The primary firewall provides the flow's flow record to the flow-cache firewall. In some embodiments, the primary firewall notifies the flow-cache firewall that it is to perform the flow processing using the flow record and does not specify that the flow-cache firewall can further offload the processing to the embedded hardware switch. In such embodiments, the flow is unable to be processed by the embedded hardware switch, so the primary firewall tells the flow-cache firewall to process the flow.

In other embodiments, the primary firewall notifies the flow-cache firewall that it is to perform the flow processing using the flow record or it can provide the flow record to the embedded hardware switch to process the flow (i.e., when the embedded hardware switch is capable of processing the flow). In such embodiments, the primary firewall tells the flow-cache firewall that it can either process the flow itself or decide to further offload the flow to the embedded hardware switch. After receiving this notification from the primary firewall, the flow-cache firewall processes one or more data messages of the flow, and then offloads the processing to the embedded hardware switch by providing the flow record to the embedded hardware switch.

Alternatively, after receiving notification from the primary firewall that the flow-cache firewall can determine whether to further offload the flow's processing to the embedded hardware switch, the flow-cache firewall does not process any data messages of the flow before offloading the processing to the embedded hardware switch. Still, in other embodiments, after receiving notification from the primary firewall that the flow-cache firewall can determine whether to further offload the flow's processing to the embedded hardware switch, the flow-cache firewall never offloads the processing to the embedded hardware switch and processes the flow itself.

In embodiments where the primary firewall creates two flow records for a single connection (i.e., a flow record for each direction of the connection), the primary firewall provides both flow records to the flow-cache firewall. In other embodiments, the primary firewall provides only one of the flow records to the flow-cache firewall, meaning that the processing of one direction of the flow will be offloaded, but not the other. The primary firewall does this in some embodiments to continue processing one direction of the flow. After providing the flow's flow record, the process 500 ends.

Figure 6:
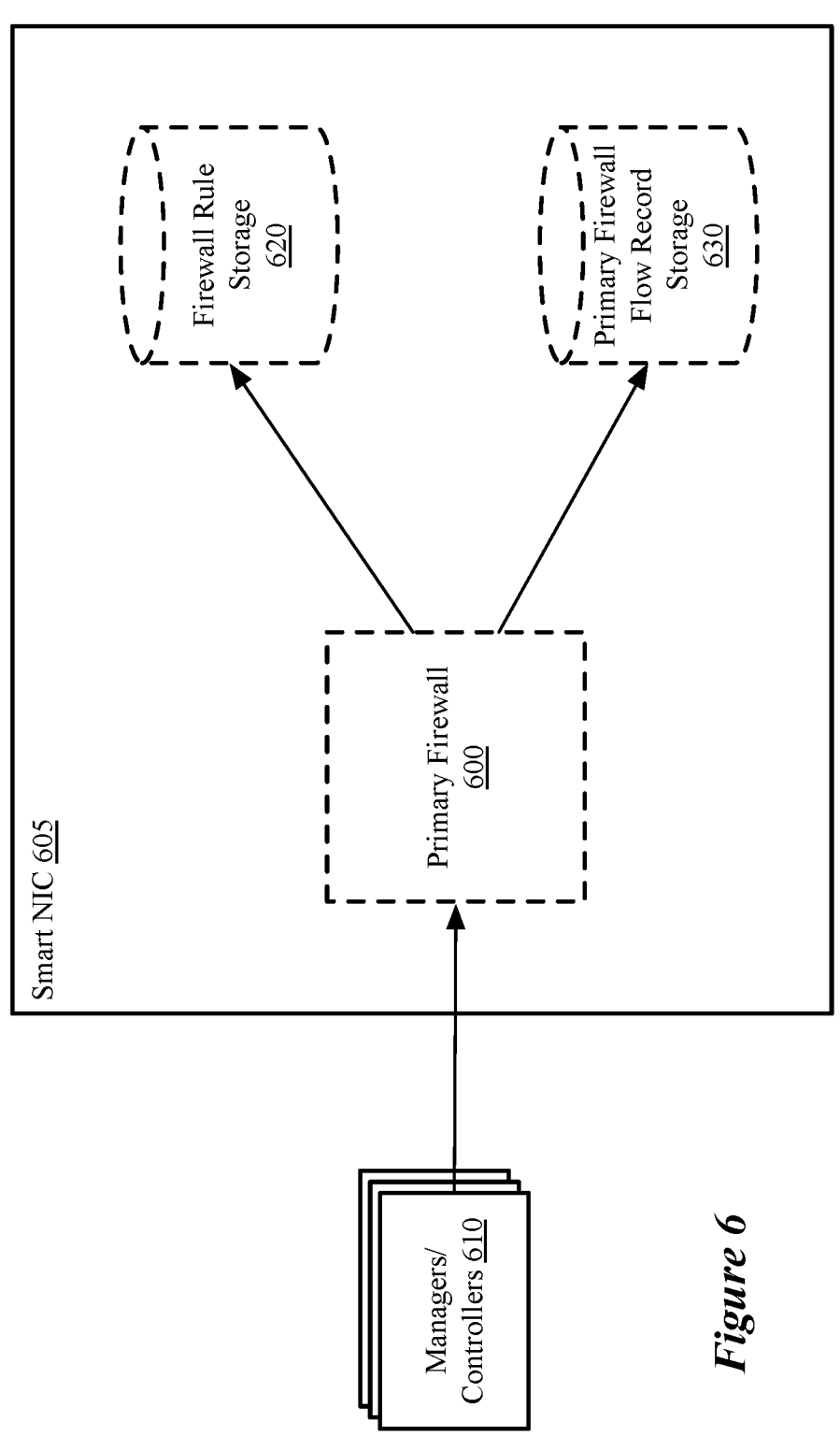
FIG. 6 illustrates an example primary firewall of a PNIC that stores firewall rules and flow records.

As discussed previously, a primary firewall of a PNIC uses flow records and firewall rules to process flows. FIG. 6 illustrates an example primary firewall 600 of a PNIC 605 that stores firewall rules and flow records. In this example, a network administrator provides the primary firewall 600 with firewall rules through a set of one or more network management servers and controllers 610. The network manager and controller set 610 provides the firewall rules to the primary firewall 600, which stores them in a local firewall rule storage 620. In some embodiments, the firewall rules are also stored in a data store of the network manager and controller set (not shown).

When the primary firewall 600 processes data messages, it refers to the rules stored the firewall rule storage 620, and creates flow records for the data messages' flows. After a flow record is created, the primary firewall 600 stores it in a local flow record storage 630. The flow records are stored for the primary firewall 600 to process flows according to flow records instead of the firewall rules stored in the storage 620, and to provide the flow records to other components of the PNIC 605 (e.g., a flow-cache firewall, an embedded hardware switch) to offload flow processing from the primary firewall 600.

As discussed previously, a flow-cache firewall is configured on a PNIC in some embodiments to process flows instead of the PNIC's primary firewall. FIG. 7 conceptually illustrates a process 700 of some embodiments for processing flows at a flow-cache secondary firewall of a PNIC that also includes a primary firewall for processing flows. The process 700 is performed in some embodiments by a flow-cache firewall (such as the flow-cache firewall 440 of FIG. 4) for a particular data message flow associated with a VM executing on a host computer connected to the PNIC. The flow-cache firewall is in some embodiments a software switch of the PNIC. In some embodiments, the data message is sent by the VM to be forwarded to a destination external to the host computer, such as an external server or another VM executing on another host computer. In other embodiments, it is sent by an external source to be forwarded to the VM executing on the host computer.

The process 700 begins by receiving (at 705) a data message of a particular flow. In some embodiments, the flow-cache firewall receives the data message from an embedded hardware switch of the PNIC, which received the data message from its source. The flow-cache firewall in some embodiments receives the data message from the embedded hardware switch through a represener port of the PNIC. In some embodiments, the data message was provided by the embedded hardware switch because it did not have a flow record needed to process the data message itself.

Next, the process 700 performs (at 710) a lookup operation to find a flow record associated with the flow. The flow-cache firewall in some embodiments receives flow records from the primary firewall of the PNIC so the primary firewall can offload processing of one or more flows from itself to the flow-cache firewall. In such embodiments, the flow-cache firewall stores the flow records in a local data store to process flows. A flow record in some embodiments specifies a flow ID (e.g., five-tuple, VLAN ID, VNI, GUID, UUID, etc.) identifying the flow and a set of one or more actions to perform on the data messages of the flow. In such embodiments, the flow-cache firewall extracts the flow ID from the received data message and compares it to each flow record it stores in order to find the associated flow record.

At 715, the process 700 determines whether the lookup operation was successful. The flow-cache firewall in some embodiments determines whether it successfully found a flow record associated with the flow of the received data message. If the process 700 determines that the lookup operation was unsuccessful (i.e., the flow-cache firewall did not find a flow record associated with the data message's flow in its local data store), the process 700 provides (at 720) the data message to the primary firewall of the PNIC for processing. Because the flow-cache firewall does not have a flow record for the data message's flow, it does not know what actions need to be performed on the data message in order to process it. As such, the flow-cache firewall of some embodiments provides the data message to the PNIC's primary firewall so it can be processed. After providing the data message to the primary firewall, the process 700 ends.

If the process 700 determines that the lookup operation was successful (i.e., the flow-cache firewall found a flow record associated with the data message's flow in its local data store), the process 700 processes (at 725) the data message according to the associated flow record. In some embodiments, the flow-cache firewall performs on the data message the action or actions specified in the flow record to process it. For instance, the flow record in some embodiments specifies that the flow is allowed, so the flow-cache firewall allows the data message.

After processing the data message, the process 700 provides (at 730) the processed data message to the embedded hardware switch of the PNIC for forwarding. In some embodiments, only allowed flows are offloaded to the flow-cache firewall. In such embodiments, the data message is always allowed at the flow-cache firewall to be forwarded to its destination. The flow-cache firewall in some embodiments provides the processed data message to the embedded hardware switch through a represener port of the PNIC. In some embodiments, this represener port is the same represener port through which the flow-cache firewall received the data message. In other embodiments, it is a different represener port of the PNIC. After providing the processed data message to the embedded hardware switch, the process 700 ends.

Figure 8A:
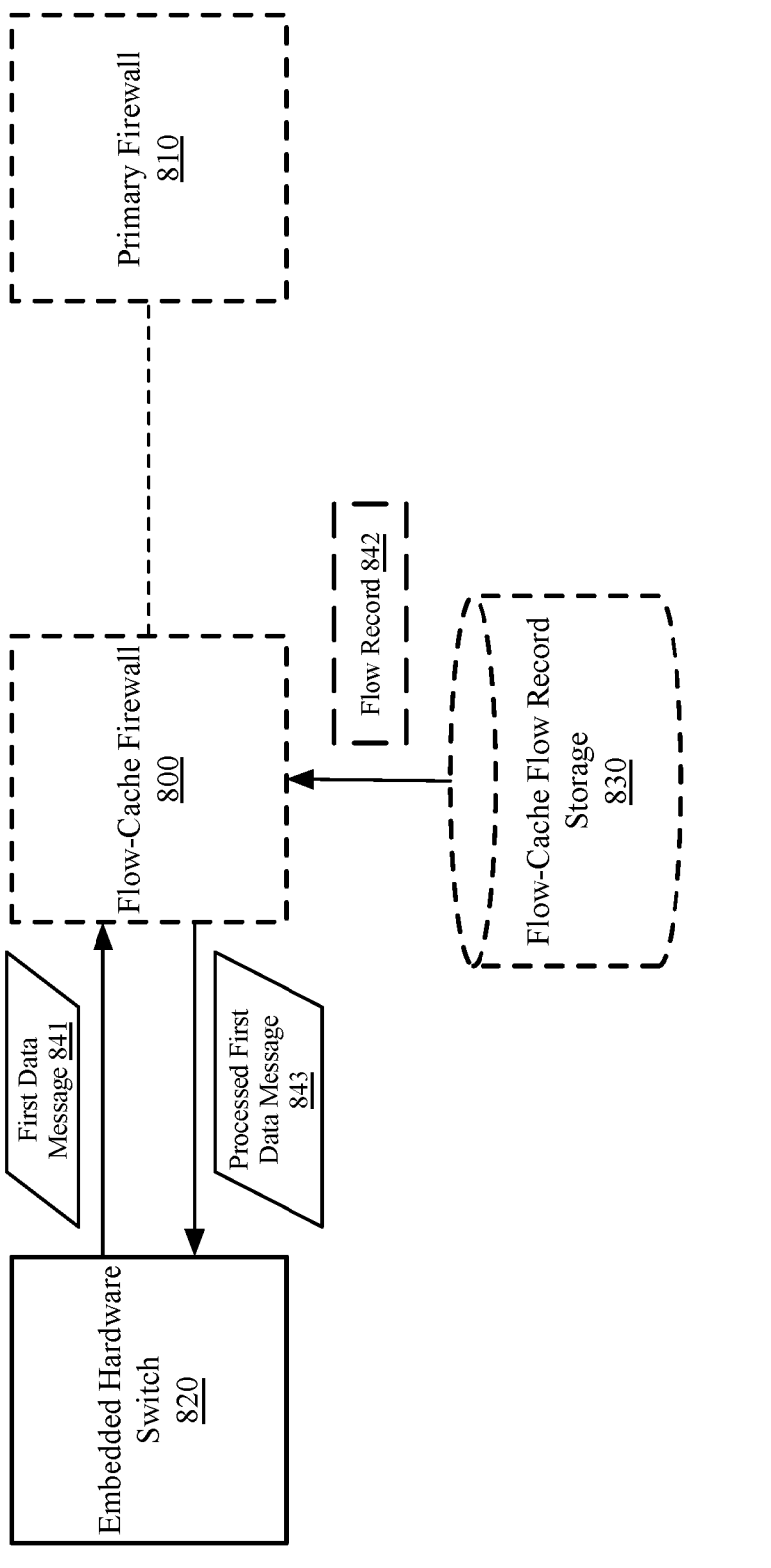
FIGS. 8A-B illustrate an example flow-cache firewall of a PNIC that processes flows.
Figure 8B:
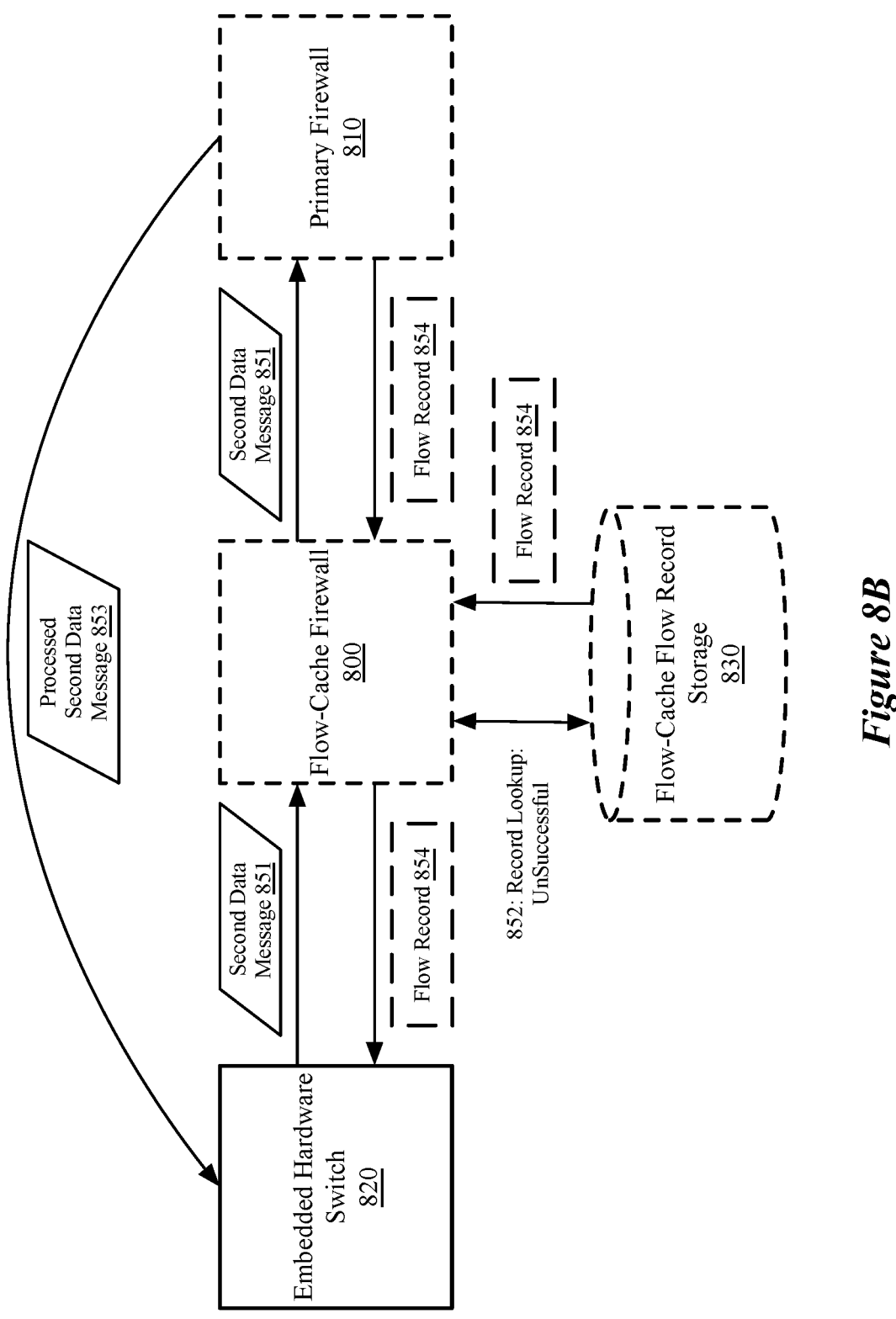

FIGS. 8A-B illustrate an example flow-cache firewall 800 that performs the process 700 of FIG. 7. In this example, the flow-cache firewall 800 executes on a PNIC and connects to a primary firewall 810 of the PNIC, an embedded hardware switch 820 of the PNIC, and a flow record storage 830 on the PNIC for the flow-cache firewall 800. While not illustrated, in some embodiments, the primary firewall 810 and embedded hardware switch 820 each have their own storages for storing flow records. In some embodiments, the flow-cache firewall 800 receives flow records for flows from the primary firewall 810 and stores them in the storage 830. By sending flow records to the flow-cache firewall 800, the primary firewall 810 offloads flow processing from itself to the flow-cache firewall 800.

FIG. 8A illustrates the embedded hardware switch 820 forwarding a first data message 841 to the flow-cache firewall 800. The embedded hardware switch 820 in some embodiments received the first data message 841 from a VM executing on a host computer connected to the PNIC. In other embodiments, the embedded hardware switch 820 received the first data message 841 from an external source (e.g., a VM executing on another host computer, an external server, etc.). Before sending the first data message 841 to the flow-cache firewall 800, the embedded hardware switch 820 in some embodiments performed a lookup operation to determine whether it stores a flow record needed to process the first data message 841. After determining that it does not store such a flow record, the embedded hardware switch 820 provided it to the flow-cache firewall 800.

After receiving the first data message 841, the flow-cache firewall 800 performs its own lookup operation to determine whether it stores in the storage 830 a flow record associated with the data message's flow. In this example, the lookup operation is successful, and the flow-cache firewall 800 retrieves a flow record 842 from the storage 830. Because the flow-cache firewall 800 has a flow record 842 for the first data message's flow, the flow-cache firewall 800 has the necessary information needed to process the first data message 841. Because the flow-cache firewall 800 is able to process the first data message 841, the primary firewall 810 in this example does not see the first data message 841.

Using the retrieved flow record 842, the flow-cache firewall 800 processes the first data message 841 and provides the processed first data message 843 to the embedded hardware switch 820 for forwarding. After receiving the processed first data message 843, the embedded hardware switch 820 in some embodiments then forwards the processed first data message 843 to its destination (e.g., an external server, a VM, etc.).

FIG. 8B illustrates the embedded hardware switch 820 forwarding a second data message 851 to the flow-cache firewall 800. The embedded hardware switch 820 in some embodiments received the second data message 851 from a VM executing on a host computer connected to the PNIC. In other embodiments, the embedded hardware switch 820 received the second data message 851 from an external source (e.g., a VM executing on another host computer, an external server, etc.). Before sending the second data message 851 to the flow-cache firewall 800, the embedded hardware switch 820 in some embodiments performed a lookup operation to determine whether it stores a flow record needed to process the second data message 851. After determining that it does not store such a flow record, the embedded hardware switch 820 provided it to the flow-cache firewall 800.

After receiving the second data message 851, the flow-cache firewall 800 performs its own lookup operation at 852 to determine whether it stores in the storage 830 a flow record associated with the data message's flow. In this example, the lookup operation 852 is unsuccessful, so the flow-cache firewall 800 does not have the necessary information needed to process the second data message 851. Because the flow-cache firewall 800 in this example is not able to process the second data message 851, the flow-cache firewall 800 provides the second data message 851 to the primary firewall 810.

When the primary firewall 810 receives the second data message 851, the primary firewall 810 processes it. In some embodiments, the primary firewall 810 stores a flow record 854 associated with the second data message's flow and uses it to process the second data message 851. In other embodiments, the primary firewall 810 does not store such a flow record, and uses a set of firewall rules to process the second data message 851. In such embodiments, after processing the second data message 851 using the set of firewall rules, the primary firewall 810 in some embodiments creates the flow record 854 for the second data message's flow.

After processing the second data message 851, the primary firewall 810 provides the processed second data message 853 to the embedded hardware switch 820 for forwarding. After receiving the processed second data message 853, the embedded hardware switch 820 in some embodiments then forwards the processed second data message 853 to its destination (e.g., an external server, a VM, etc.).

In some embodiments, the primary firewall 810, after processing the second data message 851, it has a flow record 854 for this data message's flow (e.g., because it already had one, because it created one based on the processing, etc.). In some of these embodiments, the primary firewall 810 provides the second data message's flow record 854 to the flow-cache firewall 800 to offload processing of the second data message's flow to the flow-cache firewall 800. After receiving the flow record 854, the flow-cache firewall 800 stores it in its flow record storage 830. In some embodiments, the primary firewall 810 notifies the flow-cache firewall 800 that the flow processing can be further offloaded to the embedded hardware switch. In some of these embodiments, the flow-cache firewall 800 provides the flow record 854 to the embedded hardware switch 820 to further offload the second data message's flow.

Figure 9:
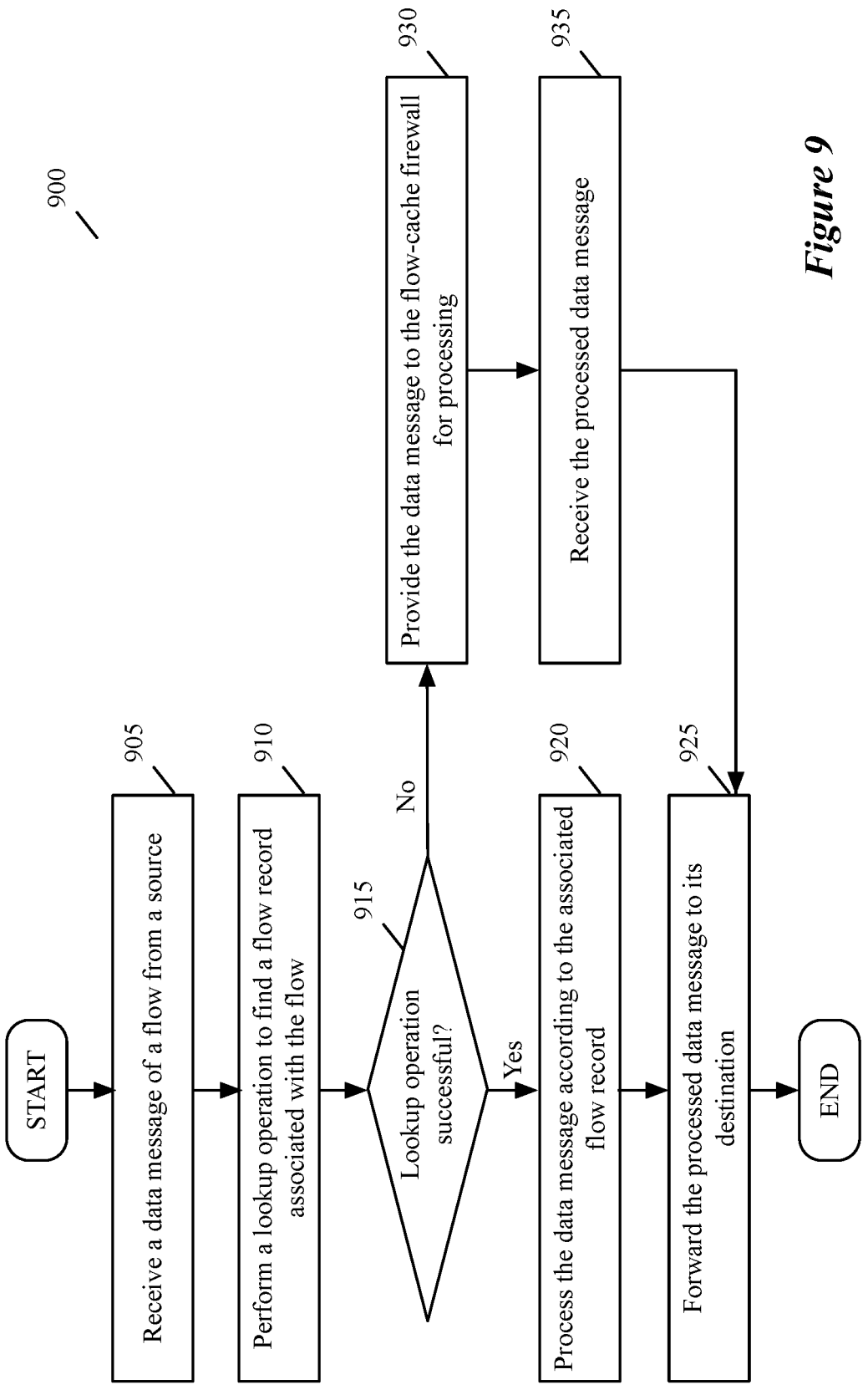
FIG. 9 conceptually illustrates a process of some embodiments for processing flows at an embedded hardware switch of a PNIC that also includes a primary firewall and a flow-cache firewall for processing flows.

As discussed previously, an embedded hardware switch of a PNIC performs data message forwarding and processing in some embodiments for a set of one or more flows. FIG. 9 conceptually illustrates a process 900 of some embodiments for processing flows at an embedded hardware switch of a PNIC that also includes a primary firewall and a flow-cache firewall for processing flows. The process 900 is performed in some embodiments by an embedded hardware switch (such as the embedded hardware switch 430 of FIG. 4) for a particular data message flow associated with a VM executing on a host computer connected to the PNIC.

The process 900 begins by receiving (at 905) a data message of a particular flow. In some embodiments, the embedded hardware switch receives the data message from the VM executing on the host computer to forward it to an external destination (e.g., a VM executing on another host computer, an external server, etc.). In such embodiments, the embedded hardware switch receives the data message from the VM through a VF on the PNIC. In other embodiments, the embedded hardware switch receives the data message from an external source to be forwarded to the VM. In such embodiments, the embedded hardware switch receives the data message through a physical network port of the PNIC.

Next, the process 900 performs (at 910) a lookup operation to find a flow record associated with the flow. The embedded hardware switch in some embodiments receives flow records from the flow-cache firewall of the PNIC so the flow-cache firewall can offload processing of one or more flows from itself to the embedded hardware switch. In such embodiments, the embedded hardware switch stores the flow records in a local data store to process flows. A flow record in some embodiments specifies a flow ID (e.g., five-tuple, VLAN ID, VNI, GUID, UUID, etc.) identifying the flow, a set of one or more actions to perform on the data messages of the flow, and/or a firewall rule ID identifying the firewall rule used to process the flow. In such embodiments, the embedded hardware switch extracts the flow ID from the received data message and compares it to each flow record it stores in order to find a matching flow record.

At 915, the process 900 determines whether the lookup operation was successful. The embedded hardware switch in some embodiments determines whether it successfully found a flow record associated with the flow of the received data message. If the process 900 determines that the lookup operation was successful (i.e., the embedded hardware switch found a flow record associated with the data message's flow in its local data store), the process 900 processes (at 920) the data message according to the associated flow record. In some embodiments, the embedded hardware switch performs on the data message the action or actions specified in the flow record to process it. For instance, the flow record in some embodiments specifies that the flow is allowed, so the embedded hardware switch allows the data message.

After processing the data message, the process 900 forwards (at 925) the processed data message to its destination. In embodiments where the destination is a VM executing on the host computer, the embedded hardware switch forwards the processed data message through a VF of the PNIC to a VNIC of the VM to reach the VM. In embodiments where the destination is external to the host computer, the embedded hardware switch forwards the processed data message through a physical network port of the PNIC to forward it to its destination. After forwarding the processed data message, the process 900 ends.

If the process 900 determines that the lookup operation was unsuccessful (i.e., the embedded hardware switch did not find a flow record associated with the data message's flow in its local data store), the process 900 provides (at 930) the data message to the flow-cache firewall of the PNIC for processing. Because the embedded hardware switch does not have a flow record for the data message's flow, it does not know which action or actions need to be performed on the data message in order to process it. As such, the embedded hardware switch provides the data message to the PNIC's flow-cache firewall so it can be processed.

After providing the data message to the primary firewall, the process 900 receives (at 935) the processed data message. In some embodiments, the flow-cache firewall processed the data message and provided the processed data message to the embedded hardware switch through a representer port of the PNIC. In such embodiments, the flow-cache firewall is capable of processing the flow and stores a flow record for the data message's flow. In other embodiments, the primary firewall processed the data message and provided the processed data message to the embedded hardware switch through a VDS and a representer port of the PNIC. In such embodiments, the flow-cache firewall determined that it did not store a flow record for the data message's flow, and provided the data message to the primary firewall for processing.

After receiving the processed data message, the process 900 proceeds to step 925 to forward the processed data message to its destination (e.g., a VM executing on the host computer, an external destination, etc.), as described above. After forwarding the processed data message, the process 900 ends. The above process 900 is described for a data message that is allowed, such that it is forwarded by the embedded hardware switch to its destination. However, in other embodiments, when the flow-cache firewall or the primary firewall receives the data message to process it, the data message is blocked or dropped. In such embodiments, the embedded hardware switch does not receive a processed data message, and the process ends after step 930.

Figure 10A:
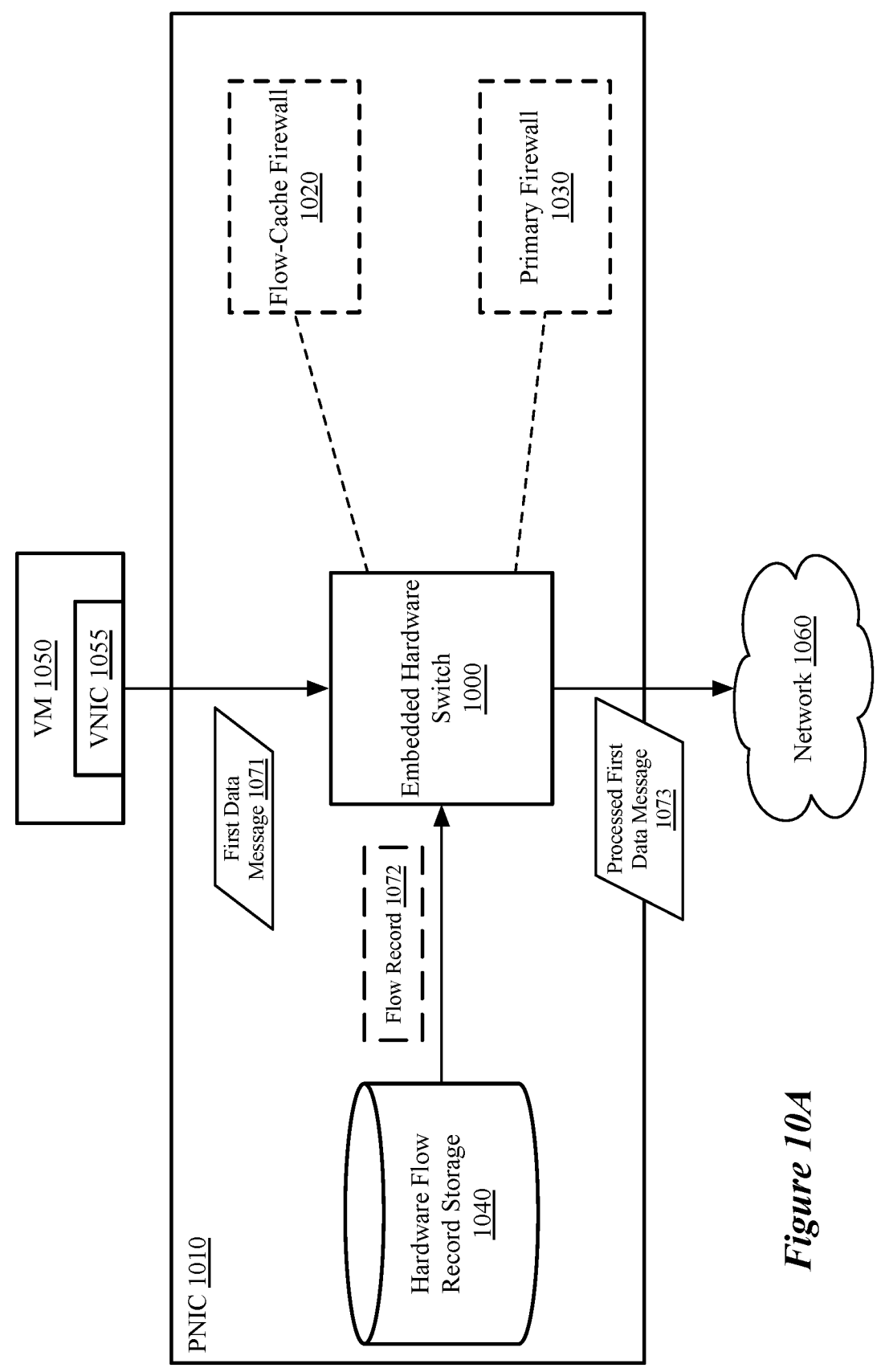
FIGS. 10A-B illustrate an example embedded hardware switch of a PNIC that processes flows.
Figure 10B:
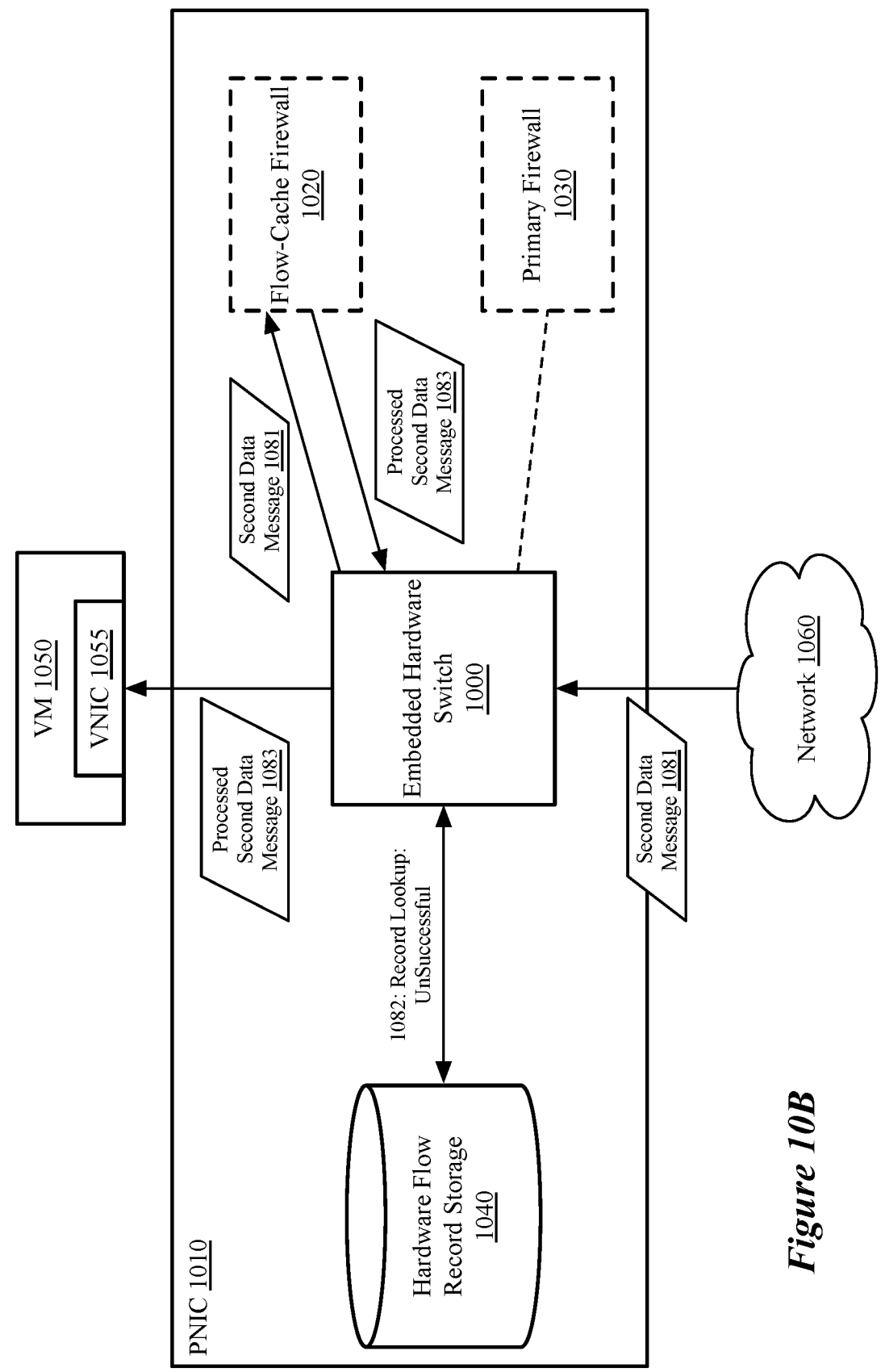

FIGS. 10A-B illustrate an example embedded hardware switch 1000 that performs the process 900 of FIG. 9. In this example, the embedded hardware switch 1000 executes on a PNIC 1010 along with a flow-cache firewall 1020, a primary firewall 1030, and a flow record storage 1040 for the embedded hardware switch 1000. In some embodiments, the flow record storage 1040 resides on the embedded hardware switch 1000. In other embodiments, it resides along with the embedded hardware switch 1000 in the PNIC 1010.

In some embodiments, the embedded hardware switch 1000 receives flow records for flows from the flow-cache firewall 1020 (which received them from the primary firewall 1030) and stores them in the storage 1040. By sending flow records to the embedded hardware switch 1000, the flow-cache firewall 1020 offloads flow processing from itself to the embedded hardware switch 1000.

FIG. 10A illustrates the embedded hardware switch 1000 receiving a first data message 1071 from a VM 1050 through a VNIC 1055 of the VM 1050. After receiving the first data message 1071 from the VM 1050, the embedded hardware switch 1000 performs a lookup operation to determine whether it stores a flow record needed to process the first data message 1071. In this example, the lookup operation is successful, and the embedded hardware switch 1000 retrieves a flow record 1072 from the storage 1040. In some embodiments, the retrieved flow record 1072 is the flow record for both outgoing data messages of the flow (e.g., the first data message 1071) and for incoming data messages of the flow (e.g., data messages coming from the first data message's destination and to the VM 1050). In other embodiments, the flow record 1072 is only for outgoing data messages of the flow.

Because the embedded hardware switch 1000 has a flow record 1072 for the first data message's flow, the embedded hardware switch 1000 has the necessary information needed to process the first data message 1071. And, because the embedded hardware switch 1000 is able to process the first data message 1071, neither the flow-cache firewall 1020 nor the primary firewall 1030 sees the first data message 1071.

Using the retrieved flow record, the embedded hardware switch 1000 processes the first data message 1071 and forwards the processed first data message 1073 to its destination (e.g., an external server, a VM, etc.) through a network 1060.

FIG. 10B illustrates the embedded hardware switch 1000 receiving a second data message 1081 from an external source through the network 1060 to forward to the VM 1050. After receiving the second data message 1081, the embedded hardware switch 1000 performs a lookup operation at 1082 to determine whether it stores in the storage 1040 a flow record associated with the data message's flow. In this example, the lookup operation 1082 is unsuccessful, so the embedded hardware switch 1000 does not have the necessary information needed to process the second data message 1081. And, because the embedded hardware switch 1000 in this example is not able to process the second data message 1081, the embedded hardware switch 1000 provides the second data message 1081 to the flow-cache firewall 1020.

When the flow-cache firewall 1020 receives the second data message 1081, the flow-cache firewall 1020 performs its own lookup operation to determine whether it stores the second data message's flow record. In this example, it does store an associated flow record, so the flow-cache firewall 1020 processes the second data message 1081. After processing the second data message 1081, the flow-cache firewall 1020 provides the processed second data message 1083 to the embedded hardware switch 1000. After receiving the processed data message 1083, the embedded hardware switch 1000 forwards it to its destination, the VM 1050, through the VNIC 1055.

In other embodiments, the flow-cache firewall 1020 does not store an associated flow record for the second data message 1081, to the flow-cache firewall 1020 provides it to the primary firewall 1030 for processing and the embedded hardware switch 1000 receives the processed second data message 1083 from the primary firewall 1030 for forwarding. In some embodiments, the embedded hardware switch 1000 also receives, from the flow-cache firewall 1020, a flow record for the second data message's flow. In such embodiments, the embedded hardware switch 1000 stores the flow record in the storage 1040, and is then able to process subsequent data messages of the second data message's flow.

Figure 11:
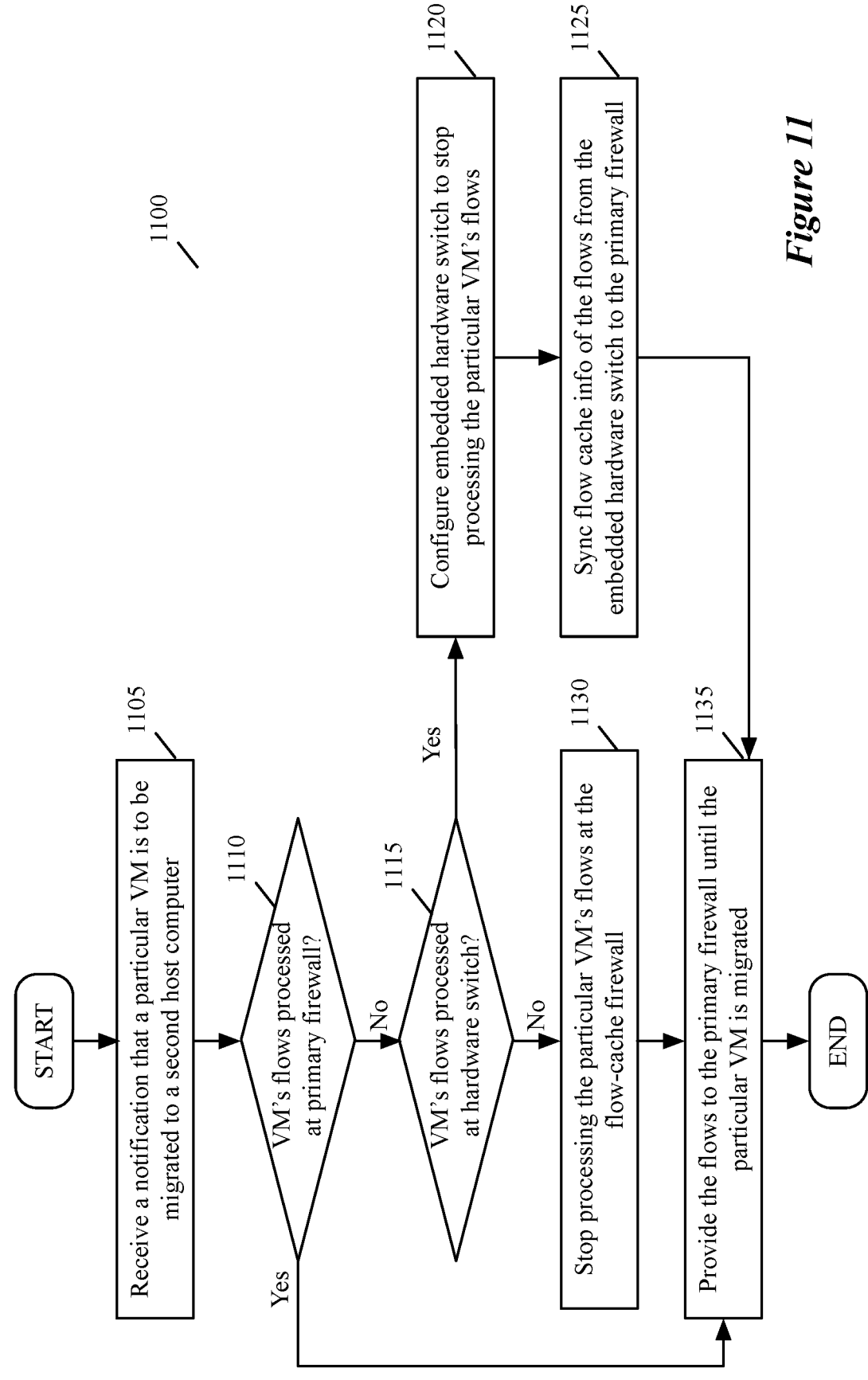
FIG. 11 conceptually illustrates a process of some embodiments for migrating VMs from a first host computer, that uses a PNIC to perform firewall services, to a second host computer.

In some embodiments, when flow processing is offloaded from a firewall of a PNIC to an embedded hardware switch of the PNIC, the flow processing has to be moved back to the firewall (e.g., in the event of a VM migration). FIG. 11 conceptually illustrates a process 1100 of some embodiments for migrating VMs from a first host computer to a second host computer. The process 1100 is performed in some embodiments by a PNIC that connects to the first host computer and performs middlebox service operations for flows associated with the VMs executing on the first host computer. In some embodiments, the PNIC includes a primary firewall, a flow-cache firewall, and an embedded hardware switch. In such embodiments, the flow-cache firewall performs the process 1100.

The process 1100 begins by receiving (at 1105) a notification that a particular VM executing on the first host computer is to be migrated to a second host computer. In some embodiments, the notification is received at the PNIC from a network administrator through a set of network managers and controllers. In some of these embodiments, the notification is received from the set of network managers and controllers through the particular VM (e.g., through a VNIC of the particular VM and a VF of the PNIC). The PNIC in some embodiments receives the notification at the embedded hardware switch, which provides it to the flow-cache firewall (e.g., through a representer port of the PNIC). The notification in some embodiments specifies that the primary firewall should not offload any more flows associated with the particular VM.

Next, the process 1100 determines (at 1110) whether the particular VM's flows are processed at the primary firewall. In some embodiments, the primary firewall offloads flow processing of one or more flows to the flow-cache firewall and/or the embedded hardware switch of the PNIC. In such embodiments, in order to migrate VMs, flows associated with the migrating VMs should be processed back at the primary firewall before the VMs are migrated. As such, the flow-cache firewall determines whether the particular VM's flows are processed at the primary firewall to determine whether the flows' processing has to be reassigned back to the primary firewall.

If the process 1100 determines that the particular VM's flows are processed at the primary firewall, the process 1100 proceeds to step 1135 to provide the flows to the primary firewall until the particular VM is migrated. Because the flows are already processed at the primary firewall, the flow-cache firewall does not have to reconfigure the embedded hardware switch or the primary firewall. The flow-cache firewall provides the flows to the primary firewall as it typically does when the flows are processed by the primary firewall. After providing the flows to the primary firewall, the process 1100 ends.

If the process 1100 determines that the particular VM's flows are not processed at the primary firewall, the process 1100 determines (at 1115) whether the particular VM's flows are processed at the embedded hardware switch of the PNIC. In some embodiments, the primary firewall of the PNIC offloads flow processing to the flow-cache firewall, and notifies the flow-cache firewall that the flow processing can be further offloaded to the embedded hardware switch. In such embodiments, the flow-cache firewall can either process the flows itself or offload the processing to the embedded hardware switch. As such, the flow-cache firewall in some embodiments needs to determine whether itself or the embedded hardware switch is currently processing the particular VM's flows to before moving the processing back to the primary firewall.

If the process 1100 determines that the particular VM's flows are processed at the embedded hardware switch of the PNIC, the process 1100 configures (at 1120) the embedded hardware switch to stop processing the particular VM's flows. In some embodiments, the embedded hardware switch maintains a first flow record table that stores flow cache information (e.g., flow records) for the flows it processes. In such embodiments, to configure the embedded hardware switch to stop processing the particular VM's flows, the flow-cache firewall extracts the flow cache information related to the particular VM's flows from the first flow record table, such that the embedded hardware switch no longer has the information needed to process the flows. The extracted information for each flow specifies in some embodiments a flow ID (e.g., five-tuple, VLAN ID, VNI, GUID, UUID, etc.) and a set of actions to perform on the flow. In some embodiments, the flow-cache firewall also extracts state information regarding the flows, such as statistics for the flows maintained by the embedded hardware switch.

In some embodiments, in configuring the embedded hardware switch to stop processing the flows, the flow-cache firewall also configures the embedded hardware switch to forward the particular VM's flows to the primary firewall (through the flow-cache firewall) without processing them. Because the embedded hardware switch does not have the flow cache information for these flows anymore, when receiving these flows, the embedded hardware switch determines that it does not have the information and forwards it along to the flow-cache firewall.

Next, the process 1100 synchronizes (at 1125) the flow cache information of the particular VM's flows from the embedded hardware switch to the primary firewall. After extracting the flow cache information from the first flow record table of the embedded hardware switch, the flow-cache firewall in some embodiments provides the flow cache information to the primary firewall to store in a second flow table maintained by the primary firewall.

In other embodiments, the flow-cache firewall only extracts the flow cache information from the first flow record table, as the second flow record table already stores the flow cache information for the particular VM's flows. In such embodiments, because the primary firewall created the flow records for these flows before offloading their processing to the embedded hardware switch, the primary firewall already stores the flow records needed to process the flows. Still, in other embodiments, the flow-cache firewall only extracts the flow cache information from the first flow record table, as the primary firewall is able to process the flows using a set of firewall rules instead of using flow records. After synchronizing the flow cache information, the process 1100 proceeds to step 1135 to provide the flows to the primary firewall, and the process 1100 ends.

If the process 1100 at 1115 determines that the particular VM's flows are not processed at the embedded hardware switch, the process 1100 stops (at 1130) processing the particular VM's flows at the flow-cache firewall. Because the flow-cache firewall already determined that the primary firewall is not processing these flows, the flow-cache firewall knows itself is processing the flows when it determines that the embedded hardware switch is not processing the flows. In some embodiments, the flow-cache firewall maintains its own third flow record table that maintains flow cache information for the flows it processed. In such embodiments, to stop processing the particular VM's flows, the flow-cache firewall deletes the flow cache information from the third flow record table.

After stopping processing of the particular VM's flows, the process 1100 proceeds to step 1135 to provide the flows to the primary firewall until the particular VM is migrated. Then, the process 1100 ends. In some embodiments, as the flow-cache firewall provides the particular VM's flows to the primary firewall to process, the primary firewall provides the particular VM's flow cache information and a set of firewall rules to migrate the particular VM to the second host computer. In such embodiments, the primary firewall provides this information and one or more firewall rules to the second host computer through the embedded hardware switch and a physical port of the PNIC. After providing this to the second host computer, and after the particular VM has been successfully migrated to the second host computer, the first host computer and the PNIC no longer receive or process the particular VM's flows.

The particular VM may be migrated to the second host computer using any suitable method. For example, the particular VM is migrated to the second host computer in some embodiments using a VM migration module executing on the second host computer. In such embodiments, the VM migration module sends, to the PNIC, a request for state information relating to the network forwarding operations and the middlebox service operations that the PNIC performs for the particular VM (e.g., the firewall operations and the services performed by the primary firewall, flow-cache firewall, and/or embedded hardware switch). Then, the PNIC provides this information to the VM migration module, which provides it to the second host computer (which also executes VM migration module, in some embodiments) as part of a data migration to migrate the particular VM to the second host computer. Methods and systems regarding VM migration from a host computer that offloads middlebox services (e.g., firewall services) to a PNIC is further described in U.S. patent application Ser. No. 18/122,804, which is incorporated by reference in this application.

Figure 12A:
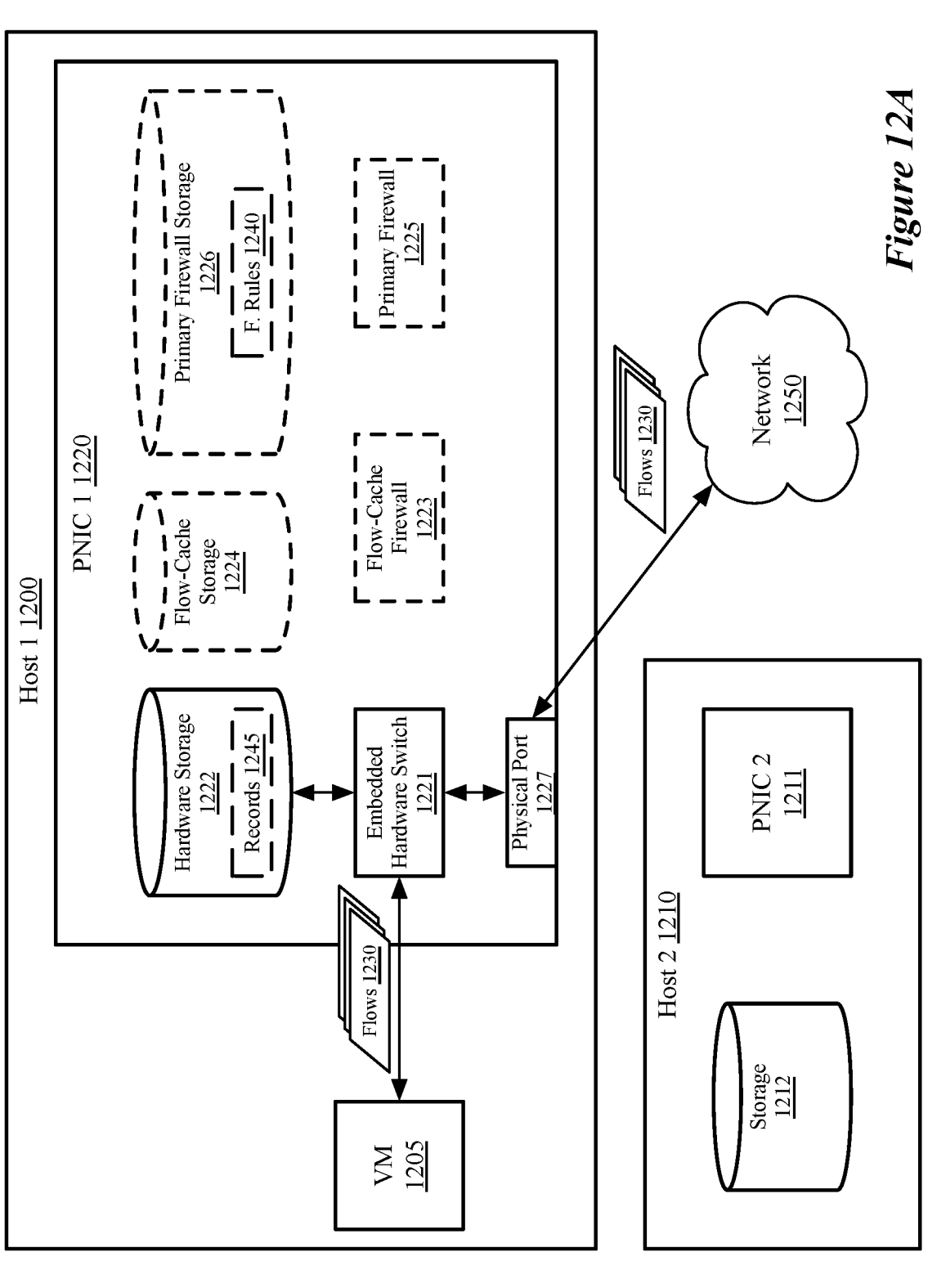
Figure 12B:
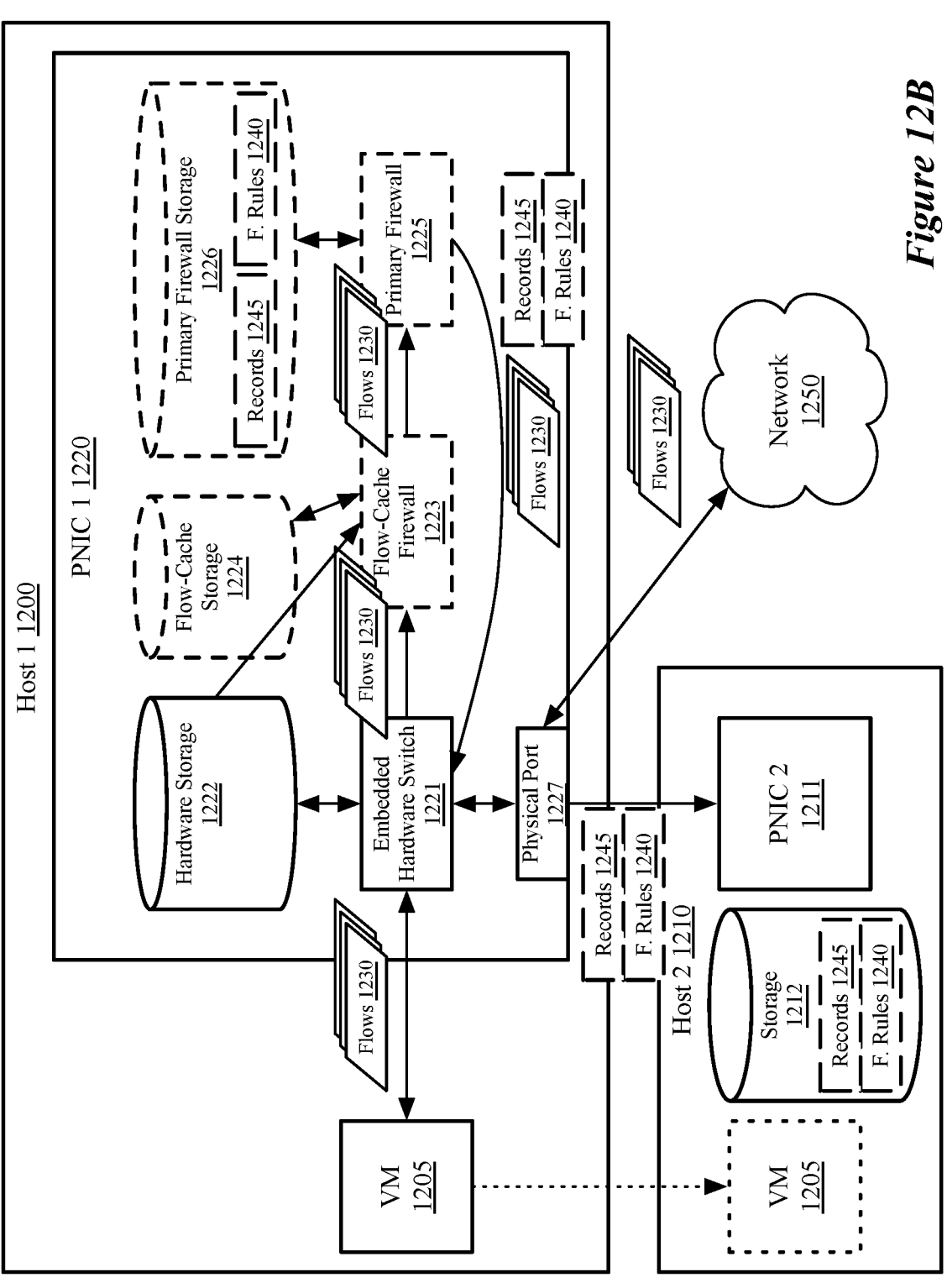

FIGS. 12A-C illustrates three stages 1201-1203 of an example first host computer 1200 migrating a VM 1205 to a second host computer 1210 while also using a PNIC 1220 to perform firewall operations on flows associated with the VM 1205. In some embodiments, the PNIC 1220 is a smart NIC. The PNIC 1220 includes an embedded hardware switch 1221, an embedded hardware switch storage 1222, a software flow-cache firewall 1223, a flow-cache firewall storage 1224, a software primary firewall 1225, a primary firewall storage 1226, and a physical port 1227. In some embodiments, the PNIC 1220 also includes a set of one or more PFs, a set of one or more VFs, a set of one or more representer ports, and a VDS, however these are not illustrated in these figures for simplicity. While no VMs other than the VM 1205 are illustrated on the first host computer 1200 or the second host computer 1210, one of ordinary skill would understand that any number of VMs can execute on the first host computer 1200 and the second host computer 1210.

FIG. 12A illustrates a first stage 1201 before migration of the VM 1205 occurs, and while the embedded hardware switch 1221 processes a set of one or more flows 1230 associated with the VM 1205. The embedded hardware switch 1221 in some embodiments processes the flows 1230 because the primary firewall 1225 offloaded their processing to the flow-cache firewall 1223, and the flow-cache firewall 1223 further offloaded the processing to the embedded hardware switch 1221. The primary firewall 1225 offloaded the processing by using firewall rules 1240 to create flow records 1245 for the flows 1230. The primary firewall 1225 provided the records 1245 to the flow-cache firewall 1223, which provided them to the embedded hardware switch 1221 to store in its storage 1222. In some embodiments, the flow-cache firewall 1223 also stores the records 1245 in its own storage 1224. Conjunctively or alternatively, the primary firewall 1225 stores the records 1245 in its own primary firewall storage 1226.

The flows 1230 in some embodiments include outgoing flows (i.e., flows sent from the VM 1205 to one or more external destinations (e.g., other VMs executing on other hosts, external servers, etc.) through the network 1250). In other embodiments, the flows 1230 include incoming flows (i.e., flows sent from one or more external destinations through the network 1250 to the VM 1205). Still, in other embodiments, the flows 1230 include at least one incoming flow and at least one outgoing flow. In some embodiments, at least one flow is exchanged between the VM 1205 and another VM (not shown) executing on the second host computer 1210.

The PNIC 1220 receives the flows 1230 at the embedded hardware switch 1221 (e.g., through a VNIC of the VM 1205, a PCIe fabric, and one or more VFs of the PNIC 1220). Using the embedded hardware switch storage 1222, the embedded hardware switch 1221 performs a lookup operation to determine whether it stores flow records 1245 associated with the flows 1230. Because processing of the flows 1230 has been offloaded to the embedded hardware switch 1221, the lookup operation is successful and the embedded hardware switch 1221 retrieves the records 1245 from the storage 1245. Using the records 1245, the embedded hardware switch 1221 processes the flows 1230 and forwards them to their destinations.

In some embodiments, the embedded hardware switch 1221 receives a notification that the VM 1205 is about to be migrated to the second host computer 1210. This notification is received in some embodiments from the VM 1205. After receiving this notification, the embedded hardware switch 1221 provides it to the flow-cache firewall 1223 for the flow-cache firewall 1223 to facilitate the migration. FIG. 12B illustrates a second stage 1202 after the migration notification has been received at the PNIC 1220, and before the VM 1205 has been migrated to the second host computer 1210. At this stage, the flow-cache firewall 1223 has to stop processing of the flows 1230 at the embedded hardware switch 1221. To do this, the flow-cache firewall 1223 in some embodiments deletes the records 1245 from the embedded hardware switch storage 1222.

In some embodiments, the flow-cache firewall 1223 extracts the records 1245 from the hardware storage 1222 and provides them to the primary firewall 1225 to store in the primary firewall storage 1226. In other embodiments, the primary firewall 1225 already stores the records 1245 in the primary firewall storage 1226, so the flow-cache firewall 1223 deletes the records 1245 from the hardware storage 1222 without providing them to the primary firewall 1225. While the firewall rules 1240 and the records 1245 are illustrated as being stored in the same storage 1226 in this figure, in other embodiments, the primary firewall 1225 maintains different storages for storing firewall rules and flow records. Now that the embedded hardware switch 1221 no longer has the records 1245 and the primary firewall 1225 has the records 1245, the processing of the flows is performed at the primary firewall 1225.

At stage 1202, the PNIC 1220 still receives the flows 1230 at the embedded hardware switch 1221. However, now when the embedded hardware switch 1221 performs its lookup operation, it is unsuccessful, so the embedded hardware switch 1221 passes the flows 1230 to the flow-cache firewall 1223 (e.g., through a representer port of the PNIC 1220). Upon receiving the flows 1230, the flow-cache firewall 1223 performs its own lookup operation to determine whether it stores the records 1245 in its own storage 1224. This lookup operation is also unsuccessful, and the flow-cache firewall 1223 provides the flows to the primary firewall 1225.

Upon receiving the flows 1230, the primary firewall 1225 processes the flows 1230. In some embodiments, the primary firewall 1225 processes the flows 1230 using the records 1245. In other embodiments, the primary firewall 1225 processes the flows 1230 using the firewall rules 1240. After processing the flows 1230, the primary firewall 1225 provides the processed flows back to the embedded hardware switch 1221 (e.g., through a VDS and a representer port), which forwards the processed flows to their destinations. Until the VM 1205 is successfully migrated to the second host computer 1210, the primary firewall 1225 will continue processing the flows 1230.

To perform the migration of the VM 1205, the primary firewall 1225 in some embodiments provides the records 1245 and/or the firewall rules 1240 to the second host computer 1210 at this stage. In such embodiments, the primary firewall 1225 provides the records 1245 and firewall rules 1240 to the embedded hardware switch 1221, which provides them to a PNIC 1211 of the second host computer 1210. Conjunctively or alternatively, the primary firewall 1225 provides the records 1245 and firewall rules 1240 to the embedded hardware switch 1221, which provides them through the network 1250 to provide them to a PNIC 1211 of the second host computer 1210.

In some embodiments, the PNIC 1211 of the second host computer 1210 is a smart NIC. In some of these embodiments, the PNIC 1211 includes similar components to the first host computer's PNIC 1220 (e.g., embedded hardware switch, flow-cache firewall, primary firewall) that performs firewall operations for the second host computer 1210. In other embodiments, the PNIC 1211 is not a smart NIC. In such embodiments, the second host computer 1210 includes a firewall service (e.g., a firewall service VM, application, or module) that performs the firewall operations for the second host computer 1210.

After receiving the records 1245 and firewall rules 1240, the PNIC 1211 stores them in a storage 1212 of the second host computer 1210. In embodiments where the PNIC 1211 performs firewall operations for the second host computer 1210, the storage 1212 resides on the PNIC 1211. In embodiments where the PNIC 1211 does not perform firewall operations for the second host computer 1210, the storage 1212 resides on the host computer 1210.

FIG. 12C illustrates a third stage 1203 after the VM 1205 has been successfully migrated to the second host computer 1210. At this stage, the PNIC 1220 of the first host computer 1200 does not process any of the flows 1230. Rather, the flows are processed at the second host computer 1210. In embodiments where the PNIC 1211 performs firewall operations for the second host computer 1210, the PNIC 1211 processes the flows 1230 using the firewall rules 1240 and/or the records 1245 and forwards them to their destinations. In embodiments where the PNIC 1211 does not perform firewall operations for the second host computer 1210 and the second host computer executes a separate firewall service, the firewall service processes outgoing flows 1230 and provides the processed flows to the PNIC 1211 for forwarding to their destinations, and received incoming flows from the PNIC 1211 and processes them before providing the processed flows to the VM 1205.

In some embodiments, a migration of a particular VM is unsuccessful. This may be due to various reasons. For example, the destination host computer in some embodiments does not receive the necessary information regarding the VM needed for the migration. When VM migration fails, a PNIC of the source host in some embodiments receives a notification that the migration failed. In some embodiments, this notification is received at a primary firewall of the PNIC (e.g., through an embedded hardware switch and a flow-cache firewall). After receiving this notification, the primary firewall in some embodiments can re-offload processing of the VM's flows to the flow-cache firewall and/or the embedded hardware switch. To do this, the primary firewall provides the necessary flow records to the flow-cache firewall, which can be provided to the embedded hardware switch for storing and using by the embedded hardware switch.

In some embodiments, flows processed at an embedded hardware switch of a PNIC end, and the primary firewall of the PNIC needs to reconfigure the embedded hardware switch to stop processing the flow. For instance, the primary firewall reconfigures the embedded hardware switch when a flow and its connection end. In such embodiments, the flow's connection can be terminated. For example, when traffic for a particular flow is not seen by the PNIC for a particular period of time, the primary firewall can end the connection. As another example, when a last ACK data message of a flow is received, the primary firewall will end the connection.

Figure 13:
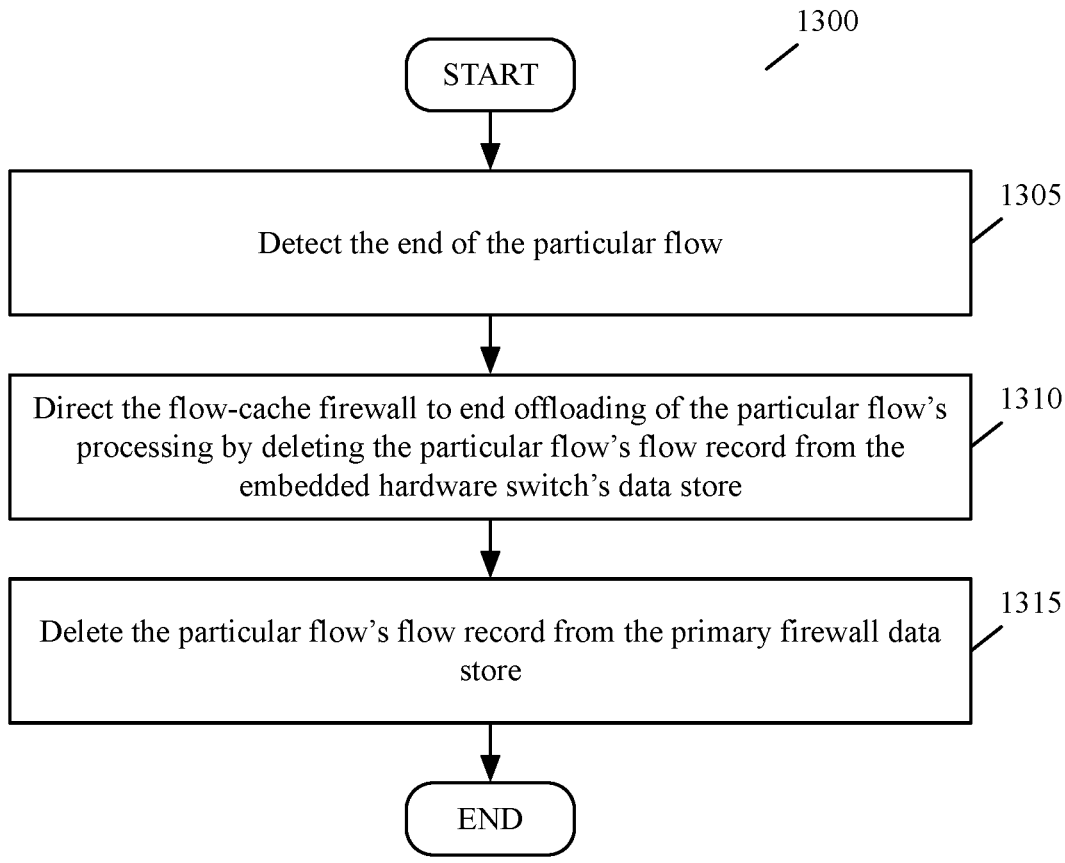
FIG. 13 conceptually illustrates a process of some embodiments for ending flows that are processed at an embedded hardware switch of a PNIC connected to a host computer.

FIG. 13 conceptually illustrates a process 1300 of some embodiments for ending flows that are processed at an embedded hardware switch of a PNIC connected to a host computer. The process 1300 is performed in some embodiments by a primary firewall of the PNIC (such as the primary firewall 450 of FIG. 4) for a particular flow exchanged between a particular VM executing on the host computer and an external component. The external component may be any suitable source or destination of a flow, such as another VM executing on another host, an external server, or an application executing on an external server. In some embodiments, the primary firewall previously processed at least a first data message of the flow, created a flow record to use to process the flow, and offloaded processing of the flow from itself to the embedded hardware switch of the PNIC. The primary firewall in some embodiments stores the created flow record at its own data store, a data store of a flow-cache firewall of the PNIC, and a data store of the embedded hardware switch.

The process 1300 begins by detecting (at 1305) the end of the particular flow associated with the particular VM. The primary firewall detects the end of a flow different based on the type of flow. For example, when the particular flow is a TCP flow, the primary firewall detects the end of the TCP flow when it receives a TCP FIN data message from the embedded hardware switch, which indicates the end of the TCP flow. In such embodiments, the embedded hardware switch receives the TCP FIN message from one of the particular VM or the external component, and is not able to use the flow record to process the TCP FIN data message. As such, the embedded hardware switch provides it to the flow-cache firewall, which similarly determines that it cannot process it. Then, the flow-cache firewall provides the TCP FIN data message to the primary firewall to process. In some embodiments, the primary firewall detects the end of the TCP flow when it receives a first TCP FIN data message of the flow from either the particular VM or the external component. In other embodiments, the primary firewall detects the end of the TCP flow when it receives two TCP FIN data messages, one from the particular VM and one from the external component.

As another example, when the particular flow is a UDP flow the primary firewall detects the end of the UDP flow by determining that no data messages of the UDP flow have been processed by the embedded hardware switch for a particular period of time. In some embodiments, the primary firewall maintains metrics of a flow, such as statistics, aging, counters, and the state for the flow. When the flow is processed at the embedded hardware switch, the embedded hardware switch in these embodiments updates the primary firewall with these metrics. In some embodiments, the embedded hardware switch periodically provides statistics associated with the hardware-processed flows to the flow-cache firewall to provide to the primary firewall, indicating a number of data messages of each flow being processed by the embedded hardware switch. In other embodiments, the flow-cache firewall extracts the statistics from the embedded hardware switch and provides them to the primary firewall. In some embodiments, the statistics also indicate a number of bytes of the flows processed by the embedded hardware switch.

Upon receiving these statistics, the primary firewall in some embodiments examines the statistics to determine that no data messages of a flow have been processed by the embedded hardware switch for the particular period of time (e.g., for five minutes), which indicates to the primary firewall that the flow has ended. In some embodiments, statistics collected for flows processed by the embedded hardware switch, flow-cache firewall, and primary firewall are periodically aggregated to the primary firewall such that the primary firewall maintains all statistics for all flows processed by the PNIC. In some of these embodiments, a user or network administrator requests these statistics from the primary firewall (e.g., in an API request), and the primary firewall provides the requested statistics to the user (e.g., in an API response).

Next, the process 1300 directs (at 1310) the flow-cache firewall of the PNIC to end offloading of the particular flow's processing by deleting the particular flow's flow record from the embedded hardware switch's data store. Because the particular flow's processing has been offloaded to the embedded hardware switch, the primary firewall of some embodiments will move the flow's processing back to itself in order to terminate the flow. In such embodiments, the primary firewall directs the flow-cache firewall to delete the particular flow's flow record from the embedded hardware switch's flow record table.

In embodiments where the embedded hardware switch only processes unidirectional flows (and, therefore, receives two flow records for a bidirectional flow), when the particular flow is a bidirectional flow, the primary firewall directs the flow-cache firewall to delete both of the particular flow's flow records from the embedded hardware switch's flow record table.

In some embodiments, to direct the flow-cache firewall, the primary firewall marks the flow's flow record in the flow-cache firewall's storage with a flag indicating to the flow-cache firewall that it is to delete the flow record for the flow from the embedded hardware switch's storage and from its own storage. In such embodiments, the flow-cache firewall periodically checks for this flag to determine when it is to delete the flow record.

After deleting the flow record from the embedded hardware switch's table, the embedded hardware switch no longer has the necessary information (e.g., the flow's ID and the set of one or more actions that are to be performed on the flow) needed to process the particular flow. In some embodiments, the primary firewall also directs the flow-cache firewall to delete the particular flow's flow record from its own data store, such that the flow-cache firewall also does not have the information needed to process the particular flow.

Lastly, the process 1300 deletes (at 1315) the particular flow's flow record from the primary firewall data store. Because the particular flow has ended and the PNIC will no longer receive any data messages of the particular flow, the primary firewall in some embodiments deletes the particular flow's flow record from its own flow record table. In doing so, the PNIC saves memory and storage, as neither the primary firewall, the flow-cache firewall, nor the embedded hardware switch have to store the flow record anymore. In embodiments where the primary firewall created two flow records for the particular flow (i.e., when the flow is a bidirectional flow), the primary firewall deletes both flow records from its data store. After deleting the flow record or records from the primary firewall data store, the process 1300 ends.

In some embodiments, even after the primary firewall detected the end of the particular flow and deleted the flow record, the PNIC receives at least one more data message of the particular flow. In such embodiments, the embedded hardware switch and the flow-cache firewall do not process these data messages, and they are processed at the primary firewall using a set of firewall rules originally used to create the particular flow's flow record. In some of these embodiments, after processing these data messages, the primary firewall recreates the particular flow's flow record and provides it again to the flow-cache firewall for offloading its processing. In other embodiments, the primary firewall does not recreate the particular flow's flow record, and continues to process the particular flow using the set of firewall rules as long as data messages are received.

Figure 14A:
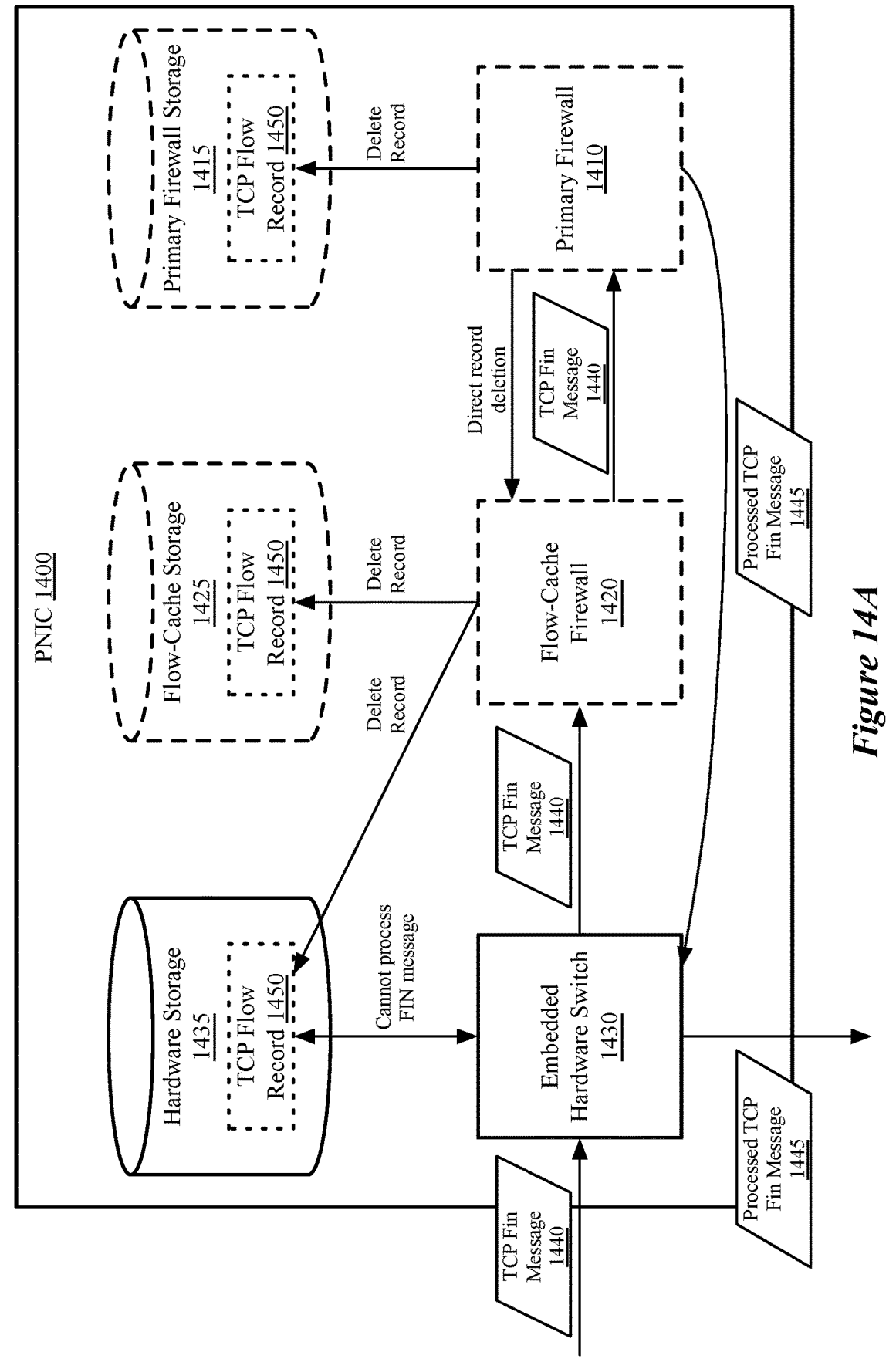
FIGS. 14A-B illustrate an example PNIC that ends flows that are processed at an embedded hardware switch of the PNIC.
Figure 14B:
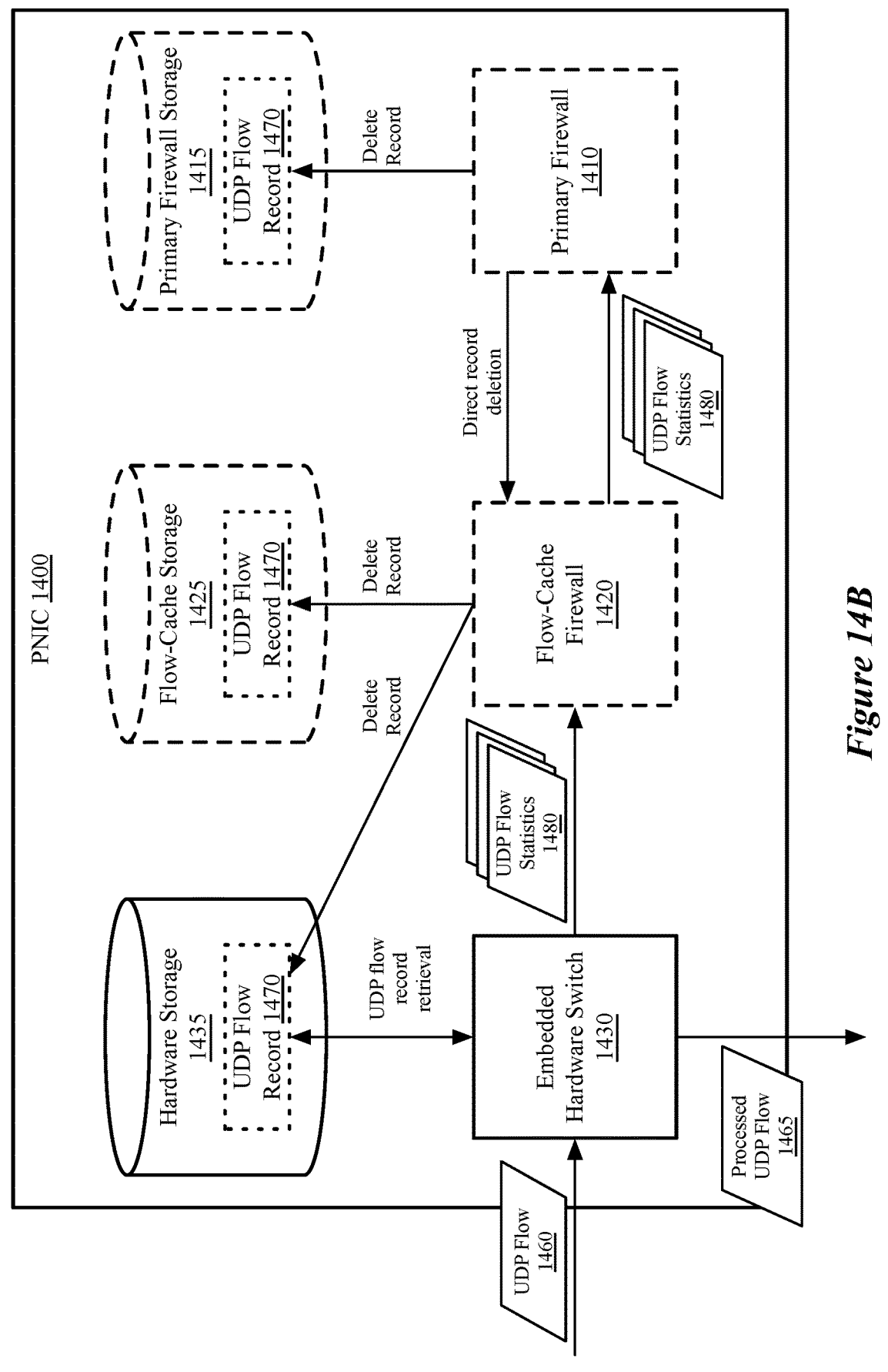

FIGS. 14A-B illustrate an example PNIC 1400 that processes flows. In this example, the PNIC 1400 includes a primary firewall 1410, a software primary firewall storage 1415, a software flow-cache firewall 1420, a flow-cache firewall storage 1425, an embedded hardware switch 1430, and an embedded hardware switch storage 1435.

FIG. 14A illustrates the embedded hardware switch 1430 receiving a TCP FIN data message 1440 for a particular TCP flow. In some embodiments, the TCP FIN message 1440 is received from a VM executing on a host computer connected to the PNIC 1400. In other embodiments, it is received from an external source, such as a VM executing on another host computer, an external server, an application executing on an external server, etc. After receiving the TCP FIN message

1440, the embedded hardware switch determines that the TCP flow's flow record 1450 does not have the necessary information needed to process the TCP FIN message 1440. In some of these embodiments, the primary firewall 1410 created the record 1450 for the TCP flow without this information such that the TCP FIN message 1440 would have to be processed at the primary firewall 1410.

After determining that it cannot process the TCP FIN message 1440, the embedded hardware switch 1430 provides it to the flow-cache firewall 1420. In some embodiments, the flow-cache firewall 1420 provides the TCP FIN message 1440 directly to the primary firewall 1410 without determining whether it is able to process it or not. In other embodiments, after receiving the TCP FIN message 1440 from the embedded hardware switch 1430, the flow-cache firewall 1420 performs a lookup operation similar to the embedded hardware switch 1430, determines that it does not have the necessary information needed to process the TCP FIN message 1440, and forwards it to the primary firewall 1410.

Upon receiving the TCP FIN message 1440, the primary firewall 1410 detects that the TCP flow is ending and initiates its process to end the TCP flow. In some embodiments, the primary firewall 1410 processes the TCP FIN message 1440 and provides the processed TCP FIN message 1445 to the embedded hardware switch 1430 to forward it to its destination (e.g., a VM executing on a host connected to the PNIC 1400 or an external destination). By providing the processed TCP FIN message 1445 to its destination, the destination is notified from the source to end the TCP flow. In some of these embodiments, the destination then sends its own TCP FIN message back, which is processed by the primary firewall 1410 of the PNIC 1400 as well.

In initiating its process to end the TCP flow, the primary firewall 1410 directs the flow-cache firewall 1420 to delete the TCP flow's record 1450 (or records, in some embodiments) from the embedded hardware switch storage 1435 and the flow-cache firewall storage 1425. The primary firewall 1410 in some embodiments also deletes the TCP flow's record 1450 (or record, in some embodiments) from its own data store 1415.

While the above example illustrates ending a TCP flow using TCP FIN data messages, other processes may be used to end a TCP flow. For example, in some embodiments, the TCP FIN data message 1440 is not provided all the way to the primary firewall 1410. In such embodiments, the primary firewall 1410 periodically receives, from the embedded hardware switch 1430, status updates regarding the TCP flow. As the primary firewall 1410 examines these status updates, it determines, at a particular time, that one or more of the status updates includes information indicating that the TCP flow has ended. After determining this, the primary firewall 1410 commands a clean-up of the TCP flow's flow records throughout the various offload layers (i.e., the flow-cache firewall 1420 and embedded hardware switch 1430). By ending the TCP flow using this process, the primary firewall 1410 provides significant improved performance and scalability.

FIG. 14B illustrates the PNIC 1400 performing the process to end UDP flows. While this figure illustrates the ending of a UDP flow, this process is applied in some embodiments to other types of flows, such as TCP flows. In this figure, the embedded hardware switch 1430 receives a UDP flow 1460 for processing, retrieves the UDP flow's flow record 1470 from its storage 1435, processes the UDP flow 1460, and provides the processed UDP flow 1465 to its destination. The UDP flow 1460 is in some embodiments a flow exchanged between a VM executing on a host computer connected to the PNIC 1400 and an external destination (e.g., another VM executing on another host computer, an external server, an external application, etc.). In some embodiments, the UDP flow 1460 is a unidirectional flow, meaning that it is sent from its source to its destination and not in the opposite direction. In other embodiments, the UDP flow is a bidirectional flow, meaning that the PNIC 1400 processes data messages of the flow in both directions.

As the embedded hardware switch 1430 processes the UDP flow 1460, it periodically provides UDP flow statistics 1480 regarding the UDP flow 1460 to the flow-cache firewall 1420 to provide to the primary firewall 1410. In some embodiments, the embedded hardware switch 1430 provides the UDP flow statistics 1480 to the primary firewall 1410 through the flow-cache firewall 1420 to notify the primary firewall 1410 how many data messages of the UDP flow 1460 the embedded hardware switch 1430 is processing. As the primary firewall 1410 receives these statistics 1480, the primary firewall 1410 analyzes them to detect when the UDP flow ends.

Upon detection that the UDP flow 1460 has ended (i.e., using the UDP flow statistics 1480), the primary firewall 1410 initiates its process to end UDP flow. In initiating its process to end the UDP flow, the primary firewall 1410 directs the flow-cache firewall 1420 to delete the UDP flow's record 1470 (or records, in some embodiments) from the embedded hardware switch storage 1435 and the flow-cache firewall storage 1425. The primary firewall 1410 in some embodiments also deletes the UDP flow's record 1470 (or records, in some embodiments) from its own data store 1415. While the above described FIGS. 14A-B have been described for TCP and UDP flows, the PNIC 1400 in some embodiments processes other types of flows and performs processes to end these other types of flows. The PNIC 1400 may also perform any other suitable processes to end flows.

In some embodiments, when flow processing is offloaded from a primary firewall of a PNIC, the primary firewall receives an update to one or more firewall rules that affect the offloaded flow processing. In some of these embodiments, the primary firewall revalidates affected flows (i.e., flows processed using the firewall rules for which an update was received) to apply the updated firewall rules to the flows. In some embodiments, upon receiving a firewall rule update, the primary firewall periodically creates dummy data messages based on its stored flow records and sends them through a rule revalidation using the received update. If the result of these dummy data messages is the same as the original result using the original firewall rules, the primary firewall does not update its set of firewall rules or revalidate the flows.

Figure 15:
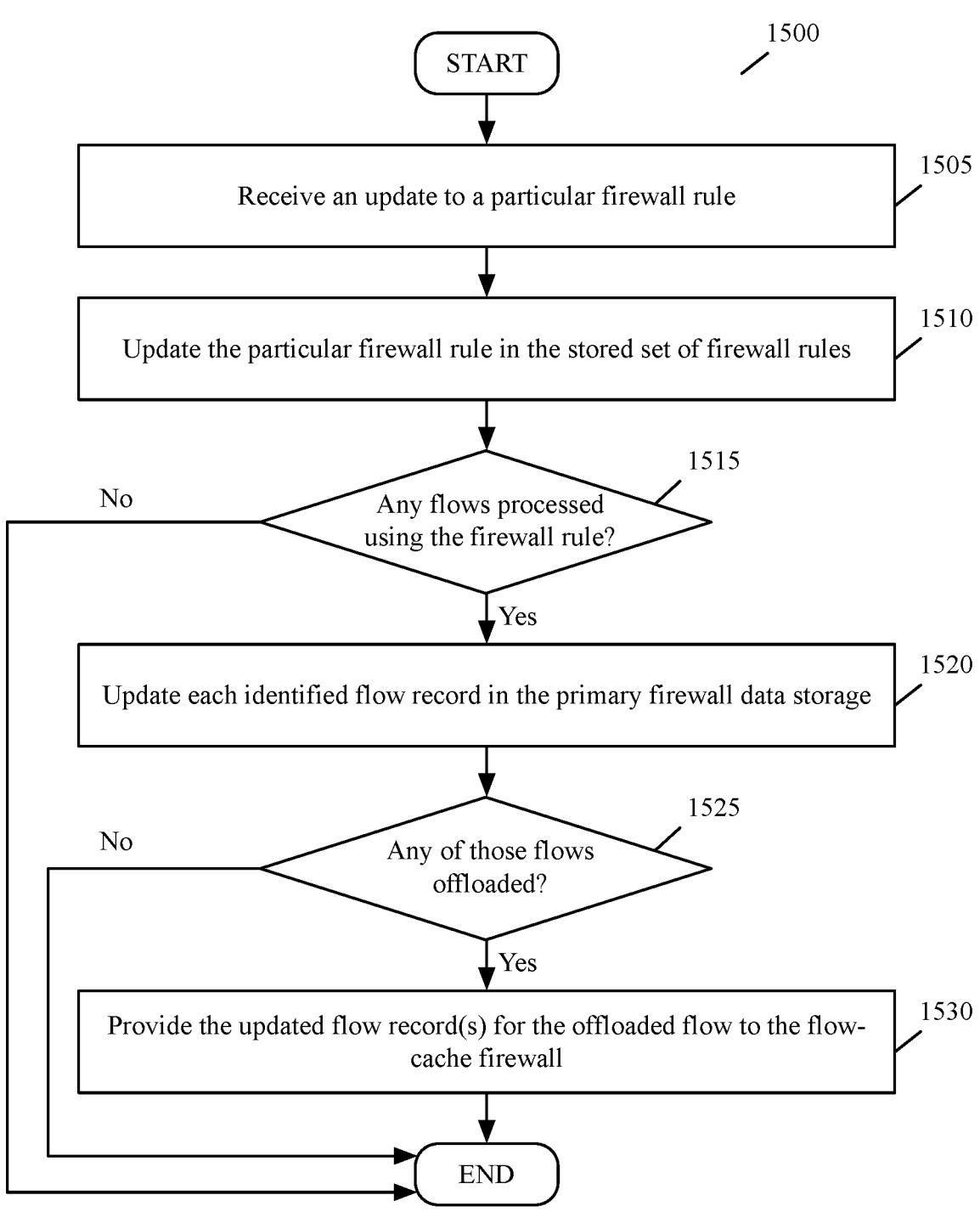
FIG. 15 conceptually illustrates a process of some embodiments for updating firewall rules for flows processed at a PNIC connected to a host computer.

FIG. 15 conceptually illustrates a process 1500 of some embodiments for updating firewall rules for flows processed at a PNIC connected to a host computer. In some embodiments, the process 1500 is performed by a primary firewall of the PNIC (such as the primary firewall 450 of FIG. 4). In some embodiments, the primary firewall executes on the PNIC along with a flow-cache firewall and an embedded hardware switch, which are both capable of processing one or more flows using flow records created and provided by the primary firewall.

The process 1500 begins by receiving (at 1505) an update to a particular firewall rule. The primary firewall in some embodiments maintains a set of firewall rules in a local data store that is used for processing flows and for creating flow records to offload flow processing. The firewall rule update is received in some embodiments as an API from a network administrator through an API interface of the PNIC. In other embodiments, it is received from the network administrator through a VF of the PNIC.

In some embodiments, the received firewall rule update updates allowing flows matching the particular firewall rule to denying (i.e., blocking) the flows or vice versa. In other embodiments, it updates allowing flows matching the particular firewall rule to dropping the flows, or vice versa. Still, in other embodiments, it updates dropping flows matching the particular firewall rule to denying the flows, or vice versa.

After receiving the update to the particular firewall rule, the process 1500 updates (at 1510) the particular firewall rule in the stored set of firewall rules. The primary firewall in some embodiments updates the particular firewall rule it stores in its data store to reflect the received update. In some embodiments, the primary firewall rule updates the particular firewall rule by deleting the particular firewall rule from the set of firewall rules and adding the received updated firewall rule to the set of firewall rules. In other embodiments, the primary firewall uses the received update to modify the particular firewall rule in the set of firewall rules without deleting the particular firewall rule entirely.

Next, the process 1500 determines (at 1515) whether any flows are processed using the particular firewall rule. In some embodiments, one or more flows that are processed at the PNIC are processed using at least the particular firewall rule. In some of these embodiments, the primary firewall previously created flow records for these flows in order to process the flows faster using the flow records, rather than processing them according to the set of firewall rules each time. In such embodiments, the primary firewall needs to identify these flows in order to update their associated flow records to reflect the received update. The primary firewall in some embodiments identifies these flows by examining the flows processed at the PNIC and the firewall rules associated with these flows to identify the flows processed using the particular firewall rule for which the update was received. Alternatively or conjunctively, each flow record includes one or more firewall rule IDs, identifying which firewall rule or rules are associated with that flow record. In such embodiments, the primary firewall identifies the flow record or records that specify the firewall rule ID associated with the received firewall rule update.

If the process 1500 determines that no flows are processed using the particular firewall rule, the process 1500 ends. If the process 1500 determines that one or more flows are processed using the particular firewall rule, the process 1500 updates (at 1520) each identified flow record in the primary firewall data storage. The primary firewall in some embodiments updates the identified flow record or records to reflect the received update to the particular firewall rule. In some embodiments, the primary firewall does so for each identified flow record by updating one or more actions to perform on the flow specified in the flow record. These action updates include in some embodiments changing a first action to a second action. For example, an action update in some embodiments includes changing an "allow" action to a "block" action on the flow.

Conjunctively or alternatively, these action updates include adding or deleting one or more actions to the flow record. For example, an action update in some embodiments includes adding a particular middlebox service (e.g., IDS, IPS, load balancing, NAT, DPI, etc.) to perform on the flow. As another example, the action update in some embodiments includes removing a particular middlebox service that was previously performed on the flow. Any suitable middlebox service may be added or removed from a set of actions to perform on a flow.

After updating each associated flow record to reflect the update to the particular firewall rule, the process 1500 determines (at 1525) whether the processing of any flows associated with the identified flow record or records has been offloaded to the flow-cache firewall or the embedded hardware switch of the PNIC. In some embodiments, a flow's processing is offloaded to the flow-cache firewall or the embedded hardware switch based on the set of actions to perform on the flow. For example, the embedded switch in some embodiments is incapable of processing ALG flows, but the flow-cache firewall is. In such embodiments, the primary firewall can offload the flow's processing to the flow-cache firewall but not the embedded hardware switch. As another example, both the embedded hardware switch and the flow-cache firewall are capable of processing a flow that only needs to be allowed, dropped, or blocked (i.e., no other actions are to be performed on the flow). In such embodiments, the primary firewall offloads the flow's processing to the flow-cache firewall, and notifies the flow-cache firewall that the flow's processing can be further offloaded to the embedded hardware switch.

If the process 1500 determines that none of the flows associated with the identified flow record or records have been offloaded from the primary firewall, the process 1500 ends. If the process 1500 determines that one or more of the flows associated with the identified flow record or records have been offloaded for processing from the primary firewall, the process 1500 provides (at 1530) the updated flow record or records for the offloaded flows to the flow-cache firewall. The primary firewall in some embodiments provides the updated flow record or records to the flow-cache firewall notifying the flow-cache firewall to use these flow records when processing the associated flows.

In some embodiments, the primary firewall provides one or more updated flow records to the flow-cache firewall to provide to the embedded hardware switch to use for processing the associated one or more flows. In such embodiments, the primary firewall notifies the flow-cache firewall that these updated flow records are able to be provided to the embedded hardware switch so that the embedded hardware switch can process the associated flows. After providing the updated flow record or records to the flow-cache firewall, the process 1500 ends.

When a user or network administrator configures or updates firewall rules on a port, one or more firewall connections for that port are in some embodiments not affected by the rule updates. In such embodiments, the primary firewall instead marks that all rules on the port that need to be revalidated. Revalidation is performed in some embodiments when a new data message of a flow is processed. If the firewall action remains the same even after the firewall rule update, only the rule pointer for the connection is updated in some embodiments. If the action updates from allowing the flow to dropping it, the connection becomes invalid in some embodiments.

Figure 16A:
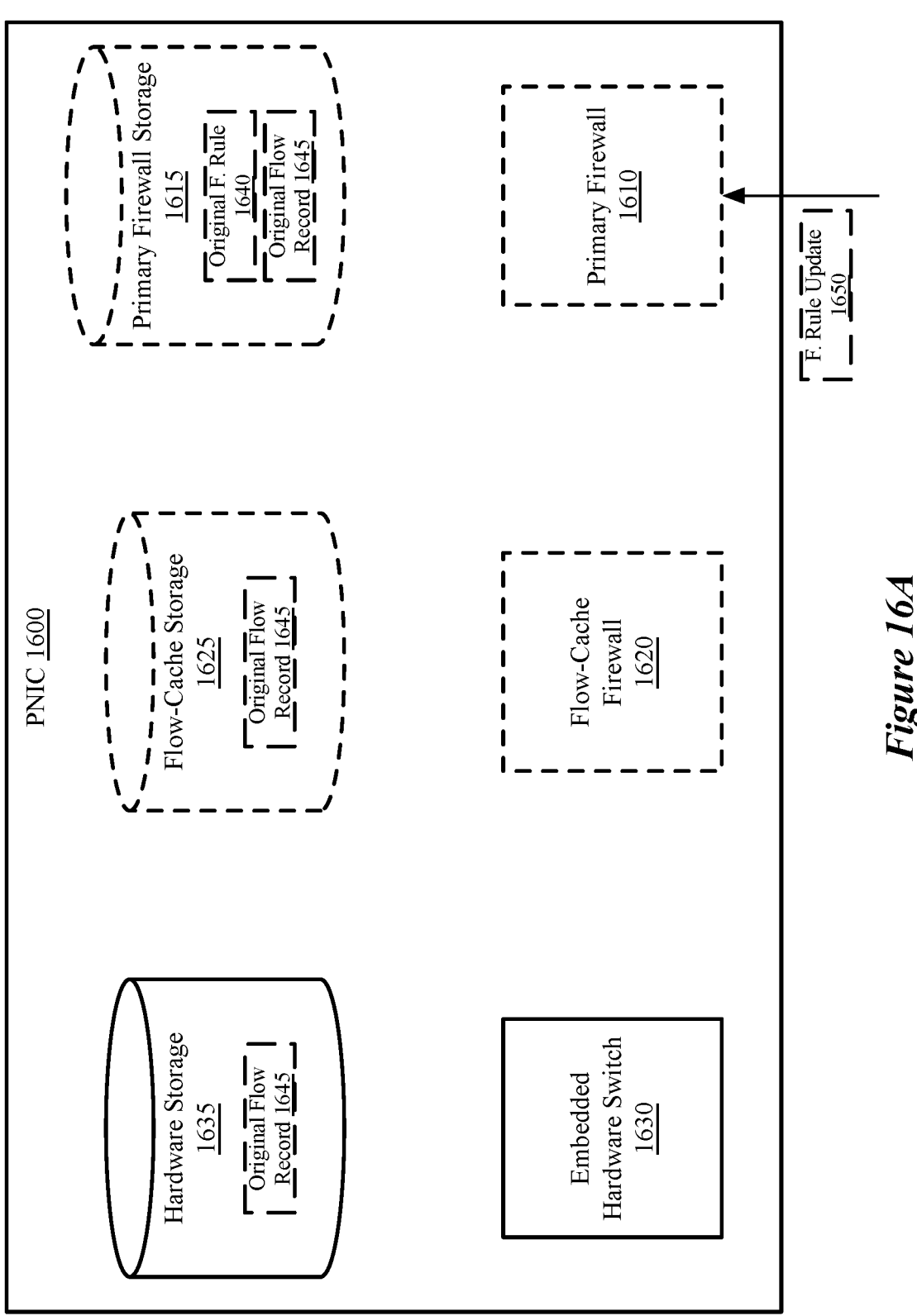
FIGS. 16A-B illustrate an example PNIC that receives updates to firewall rules enforced at the PNIC.
Figure 16B:
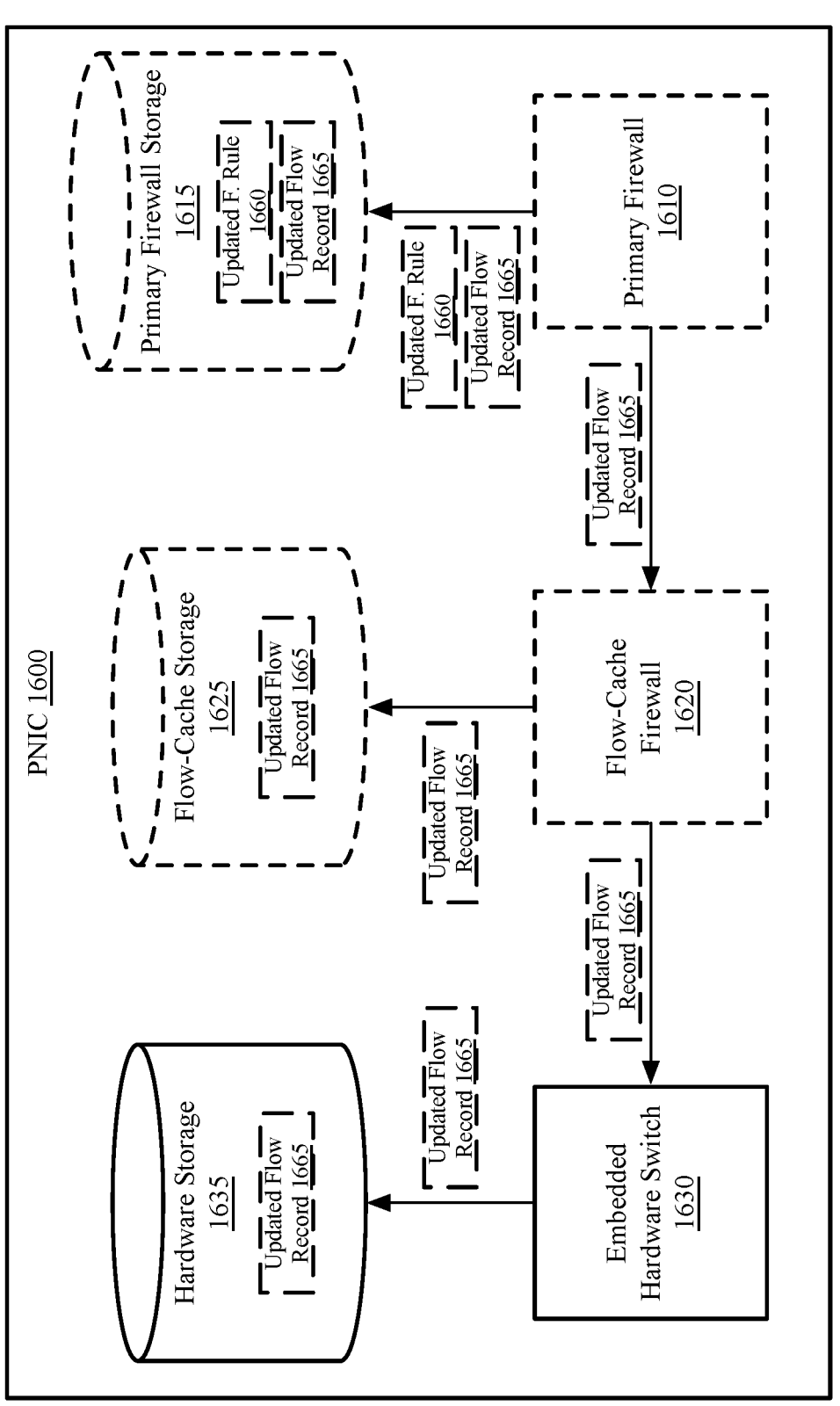

FIGS. 16A-B illustrate an example PNIC 1600 that includes a primary firewall 1610, a primary firewall storage 1615, a flow-cache firewall 1620, a flow-cache firewall storage 1625, an embedded hardware switch 1630, and an embedded hardware switch storage 1635. In this example, the primary firewall 1610 offloaded processing of a particular flow to the embedded hardware switch 1630. To do so, the primary firewall 1610 processed at least a first data message of the flow using an original firewall rule 1640 that matches the flow and created an original flow record 1645 to use to process the flow. The primary firewall 1610 stores the original flow record 1645 in its storage 1615 along with the original firewall rule 1640, and provided the original flow record 1645 to the flow-cache firewall 1620 to store in its own storage 1625. The flow-cache firewall 1620 provided the original flow record 1645 to the embedded hardware switch 1645 to use to process the flow.

FIG. 16A illustrates the PNIC 1600 receiving a firewall rule update 1650. As shown, the firewall rule update 1650 includes an update to the original firewall rule 1640. The PNIC 1600 receives this update 1650 directly at the primary firewall 1610 (e.g., from a network administrator through a network manager (e.g., a management plane) and/or network controller (e.g., a control plane)). In some embodiments, the update 1650 is received at the primary firewall 1610 as an API through an API interface (not shown) of the PNIC. In other embodiments, it is received from the network administrator through a VF (not shown) of the PNIC. After receiving the firewall rule update 1650, the primary firewall 1610 updates the original firewall rule 1640 and the flow's original flow record 1645.

FIG. 16B illustrates the PNIC 1600 after the primary firewall 1610 updated the original firewall rule 1640 and original flow record 1645. The primary firewall 1610 stores the updated firewall rule 1660 in its storage 1615, replacing the original firewall rule 1640. The primary firewall 1610 also stores the updated flow record 1665 in its storage 1615, replacing the original flow record 1645. Because the flow's processing is offloaded to the embedded hardware switch 1630, the primary firewall 1610 provides the updated flow record 1665 to the flow-cache firewall 1620 and directs the flow-cache firewall 1620 to provide it to the embedded hardware switch 1630. In this example, the flow-cache firewall 1665 also stores the received updated flow record 1665 in its storage 1625, replacing the original flow record 1645. The embedded hardware switch 1630 receives the updated flow record 1665 from the flow-cache firewall 1620, and stores it in its storage 1665, replacing the original flow record 1645. After the embedded hardware switch 1630 receives and stores the updated flow record 1665, the embedded hardware switch 1630 processes the associated flow according to the received firewall rule update 1650.

In some embodiments, a primary firewall of a PNIC re-sends flow records to a flow-cache firewall of the PNIC because the flow-cache firewall deleted them. This may be due to various reasons. For example, when a port of the flow-cache firewall that cached a particular flow has been reset (e.g., due to a configuration update), the flow-cache firewall in some embodiments deletes the flow record from its data storage.

Other examples of why the flow-cache second firewall would delete a flow record include issues related to (1) capacity (e.g., running out of entries in its flow record table, running out of memory), (2) performance (e.g., cache size has grown too large and one or more flows' flow records need to be deleted to keep the flow-cache second firewall operating quickly), (3) flow properties (e.g., deleting a flow's flow record when the flow sends little or infrequent traffic). In some embodiments, the embedded hardware switch of a PNIC deletes a flow record or marks it as invalid. In such embodiments, this is because of reasons similar to the flow-cache firewall. Conjunctively or alternatively, it deletes a flow record or marks it invalid after determining that it is incapable of performing one or more actions specified in the flow record (and, therefore, it cannot process that flow).

In some embodiments, a host computer connecting to a PNIC executes control plane services and receives configurations for the PNIC from a set of management servers implementing a management plane. When a configuration for the PNIC is needed (e.g., when a firewall rule update is received from a network administrator, when the initial configuration of the PNIC is initiated, etc.), the host computer's control plane (e.g., a set of controllers acting as a local control plane module for a set of one or more controllers operating as a central control plane) in some embodiments stores the configuration at the host computer and provides proxy services to forward the configuration to the PNIC. In such embodiments, the PNIC does not directly communicate with the set of management servers, as it only communicates with the host computer to which it is connected.

Figure 17:
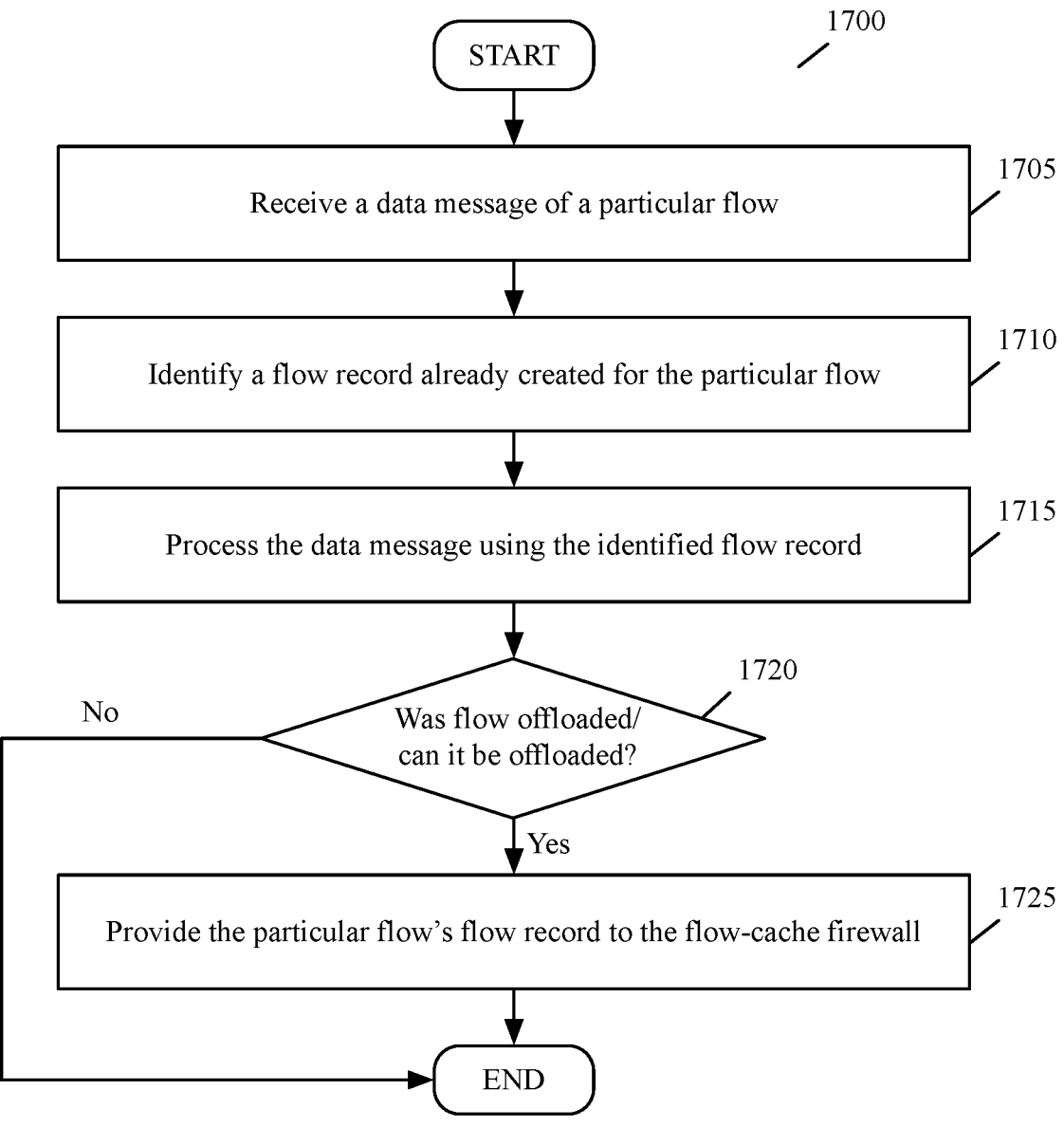
FIG. 17 conceptually illustrates a process of some embodiments for maintaining flow records for flows at a PNIC connected to a host computer.

FIG. 17 conceptually illustrates a process 1700 of some embodiments for maintaining flow records for flows at a PNIC connected to a host computer. This process 1700 is performed in some embodiments by a primary firewall of the PNIC (such as the primary firewall 450 of FIG. 4) that executes on the PNIC along with a flow-cache firewall and an embedded hardware switch. In some embodiments, the PNIC performs flow processing for flows associated with a set of one or more VMs executing on the host computer.

The process 1700 begins by receiving (at 1705) a data message of a particular flow. The primary firewall in some embodiments receives the data message from the flow-cache firewall, which received it from the embedded hardware switch. In some embodiments, the data message is sent from a VM executing on the host computer connected to the PNIC and is destined for an external destination (e.g., another VM executing on another host computer, an external server, etc.). In other embodiments, the data message is sent from an external source (e.g., another VM executing on another host computer, an external server, etc.) and is destined for a VM executing on the host computer connected to the PNIC.

In some embodiments, the primary firewall received the data message even though the primary firewall previously offloaded the particular flow's processing to the flow-cache firewall. In some of these embodiments, the flow-cache firewall provided the data message to the primary firewall instead of processing it because the flow-cache firewall deleted the particular flow's flow record from its data storage. As such, after a period of time after the primary firewall initially provided the particular flow's flow record to the flow-cache firewall, the primary firewall receives the data message.

Next, the process 1700 identifies (at 1710) a flow record created for the particular flow. In some embodiments, the primary firewall receives a data message of a flow even after the primary firewall initially processed one or more data messages of the flow and created a flow record for it. For example, the flow is in some embodiments unable to be processed by the flow-cache firewall or the embedded hardware switch (e.g., based on the action or actions needed to be performed on the flow). As another example, the flow's processing was already offloaded to the flow-cache firewall, but the flow-cache firewall deleted the flow's flow record from its data storage. In such embodiments, because the flow-cache firewall needs the flow record to process the flow, it provides the flow to the primary firewall instead of processing it.

At 1715, the process 1700 processes the data message using the identified flow record. The primary firewall in some embodiments processes the received data message by performing a set of one or more actions specified in the flow record on the data message. Such actions may include performing a particular middlebox service, allowing the data message, dropping the data message, blocking the data message, etc. In other embodiments, rather than using the flow record to process the data message, the primary firewall uses a set of firewall rules to process the data message (which were previously used to create the flow's flow record in some embodiments).

Then, the process 1700 determines (at 1720) whether the particular flow was previously offloaded or the particular flow can be offloaded. Because the flow-cache firewall can delete flow records from its data storage at any time, the primary firewall determines whether the particular flow was previously offloaded. The primary firewall does this so it can provide the particular flow's flow record to the flow-cache firewall again to re-offload the particular flow's processing, if necessary. In other embodiments, the flow was not previously offloaded to the flow-cache firewall before, and the primary firewall determines whether the flow is able to be offloaded or not. If the process 1700 determines that the particular flow has not been offloaded and cannot be offloaded, the process 1700 ends.

If the process 1700 determines that the particular flow can be offloaded and/or it has been offloaded previously, the process 1700 provides (at 1725) the particular flow's flow record to the flow-cache firewall. In embodiments where the particular flow was previously offloaded, this providing of the particular flow's flow record to the flow-cache firewall is a second time of providing the flow record to the flow-cache firewall, as the flow-cache firewall deleted it. After providing the flow record to the flow-cache firewall, the flow-cache firewall is able to process the subsequent data messages of the particular flow and the primary firewall will not receive any more data messages of the particular flow.

In some embodiments, the particular flow is able to be further offloaded to the embedded hardware switch, as it is capable of processing the flow. In such embodiments, the primary firewall also notifies the flow-cache firewall that the particular flow's processing is able to be further offloaded to the embedded hardware switch, and the flow-cache firewall can determine whether it wants to further offload the flow's processing or not. After providing the particular flow's flow record to the flow-cache firewall, the process 1700 ends.

While the process 1700 has been described in relation to the flow-cache firewall deleting a flow record, in some embodiments, the embedded hardware switch deletes a flow record and the primary firewall and/or the flow-cache firewall provides it a second time to the embedded hardware switch.

In some embodiments, the primary firewall maintains metrics of a flow, such as statistics, aging, counters, the state for the flow, etc. When the flow is processed at the embedded hardware switch, the flow-cache firewall retrieves these metrics from the embedded hardware switch and provides them to the primary firewall. The flow-cache firewall in some embodiments reads per-filter statistics related to errors (e.g., a number of bad data messages, a number of bad sequence numbers, etc.) and updates this to the primary firewall. Bad data messages are in some embodiments unknown data messages that are dropped by the embedded hardware switch of the PNIC. The flow-cache firewall in some embodiments also reads the connection state from the embedded hardware switch and updates the primary firewall.

In some embodiments, when flows are processed at the hardware of a PNIC (e.g., an embedded hardware switch), connection tracking of these flows is performed at the hardware. In such embodiments, when the embedded hardware switch receives a data message of a flow and determines it can process the data message, the embedded hardware switch (1) checks whether the data message is malformed, (2) updates statistics for the flow, and (3) updates a timestamp of the flow. In embodiments where the received data message is part of a TCP flow, the embedded hardware switch also (1) keeps track of the TCP state of the flow and verifies incoming data messages against the current TCP state of the flow, (2) keeps track of the TCP window of the flow and validates the data message against the current TCP window information, and calculates the TCP round-trip time (RTT). These described actions performed at the embedded hardware switch are in some embodiments also performed at the flow-cache firewall and the primary firewall when they process data messages.

The connection state of a flow is in some embodiments maintained by the embedded hardware switch of a PNIC. In other embodiments, it is maintained by the software (e.g., the flow-cache firewall and/or the primary firewall) of the PNIC. In some embodiments, the hardware and software of a PNIC are not able to simultaneously access the connection state for the same flow. In some of these embodiments, a connection state for a flow is initially maintained by the primary firewall, as it processes the first data message(s) of the flow. As a flow and its connection are established, and as the flow is offloaded to the embedded hardware switch, the flow's connection state is maintained by the embedded hardware switch.

In some embodiments, when the primary firewall creates a flow record for a flow in its first direction (e.g., from a VM to an external destination, from an external source to a VM), the primary firewall sets the state in the flow record to a software state. Then, when the primary firewall receives the flow in its opposite direction, the primary firewall offloads the flow to the hardware of the PNIC and the connection tracking is moved to the embedded hardware switch.

While connection tracking is performed in the hardware of a PNIC (i.e., after a connection is offloaded from the software to the hardware), some embodiments need to reassign the processing back to the software. For instance, the hardware provides a data message to the software in some embodiments when hardware connection tracking cannot handle it. For example, when a SYN data message of a TCP connection is received after the TCP connection is established, the embedded switch provides the SYN data message to the flow-cache firewall because the primary firewall of the PNIC needs to process it.

As another example, offloaded flows are invalidated in some embodiments when software-processed flows are invalidated. Software invalidation occurs in some embodiments when the associated connection is already established and active. When a VM migrates to another host, all connection states of that VM in some embodiments have to be copied back to the primary firewall of the PNIC in order to transfer them to the destination host of the VM. In some embodiments, a user enables or disables some features (e.g., mirroring, Internet Protocol Flow Information Export (IPFIX), etc.), initiates teaming changes, etc. Relevant flows are invalidated in some embodiments because the action data of the flows are not valid anymore.

When the primary firewall of a PNIC needs to perform connection tracking but the connection tracking is currently offloaded to the embedded hardware switch, the primary firewall in some embodiments claims the ownership of the connection state by specifying the state as the primary firewall in the flow's flow record and copying the state information stored in the flow's flow record stored (e.g., the hardware connection state) at the embedded hardware switch to the flow's flow record stored at the primary firewall (i.e., the primary firewall connection state). Because the state is specified as the primary firewall in the hardware's connection state, the embedded hardware switch in some embodiments provides subsequent data messages of the flow to the software for software connection tracking and processing. The software connection state in some embodiments has the latest state information and is able to perform connection tracking in the software of the PNIC.

In some embodiments, the hardware connection state maintains a flag to indicate whether data messages received at the hardware of the PNIC need to go to the software of the PNIC for further processing. For example, a flag "SWF_STATE" indicates that the software owns the connection state and data messages are to be sent to the PNIC's primary firewall for processing. As another example, the flag "HW_STATE" indicates that the hardware owns the connection state and connection tracking and processing is to be performed at the embedded hardware switch. Still, as another example, the flag "SWC_STATE" indicates that the flow-cache firewall owns the connection state and connection tracking and processing is to be performed at the flow-cache firewall.

When the embedded hardware switch provides a data message to the flow-cache firewall of the PNIC, the embedded hardware switch in some embodiments specifies the reason for the software processing so that the flow-cache firewall or the primary firewall can process the data message properly. The reason for software processing is different in different embodiments depending on how the flow records are constructed for the flow-cache firewall's storage. For example, the reason in some embodiments is when the embedded hardware switch determines that it does not have the necessary flow record needed to process a received data message. As another example, the reason is in some embodiments when the embedded hardware switch has a flow record needed to process a received data message, but the flow record specifies that the flow's connection state is maintained by the software. Still, as another example, the reason is in some embodiments when the embedded hardware switch has a flow record needed to process a received data message, but a hardware connection tracking exception is raised.

The reasons for software processing is in some embodiments encoded in a mark value in a memory buffer (mbuf). The mark value is used by the software in some embodiments to identify the processing context of the flow-cache firewall owning the flow and to find the flow information (i.e., action data) to continue processing data messages in the software flow-cache firewall. In some embodiments, the unused bits of this mark value are used to store the reasons for the software processing. As with a hardware exception, when fragmented data messages of a flow are received at the PNIC, the flow's processing is moved back to the primary firewall.

After a hardware connection tracking exception is fixed or after a flow's flow record is created by the primary firewall, the primary firewall in some embodiments reassigns the flow's processing and connection tracking back to the embedded hardware switch. In such embodiments, connection state information for the flow is provided back to the embedded hardware switch and the flag of the hardware connection state is changed to specify the hardware state.

When the primary firewall switches a flow's processing back from itself or to the embedded hardware switch, in some embodiments, the primary firewall (1) queues data messages that come to it, (2) updates the connection state of the flow with the state information stored at the primary firewall, (3) sets the connection state to specify the flow-cache firewall, and (4) reinjects queued data messages to the embedded hardware switch for processing. In some embodiments, data messages are queued because they still come to the primary firewall while transitioning to hardware connection tracking. After setting the connection state to specify the flow-cache firewall, in some embodiments, the flow-cache firewall decides to further offload the flow's processing to the embedded hardware switch, and sets the connection state to specify the embedded hardware switch.

Figure 18A:
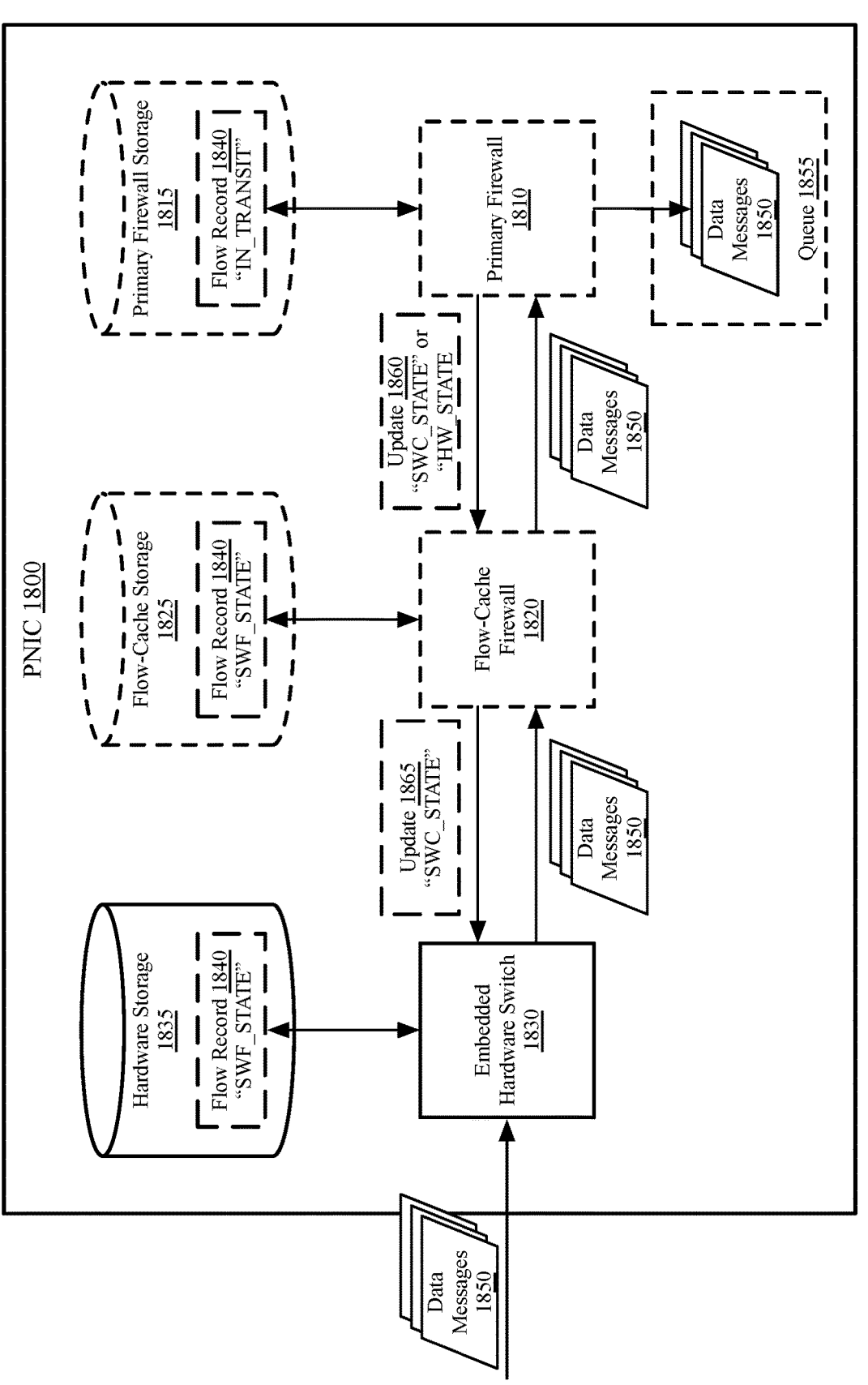
FIGS. 18A-C illustrate a PNIC during and after offloading a particular flow's processing from a primary firewall of the PNIC to a flow-cache firewall of the PNIC and then to an embedded hardware switch of the PNIC.
Figure 18B:
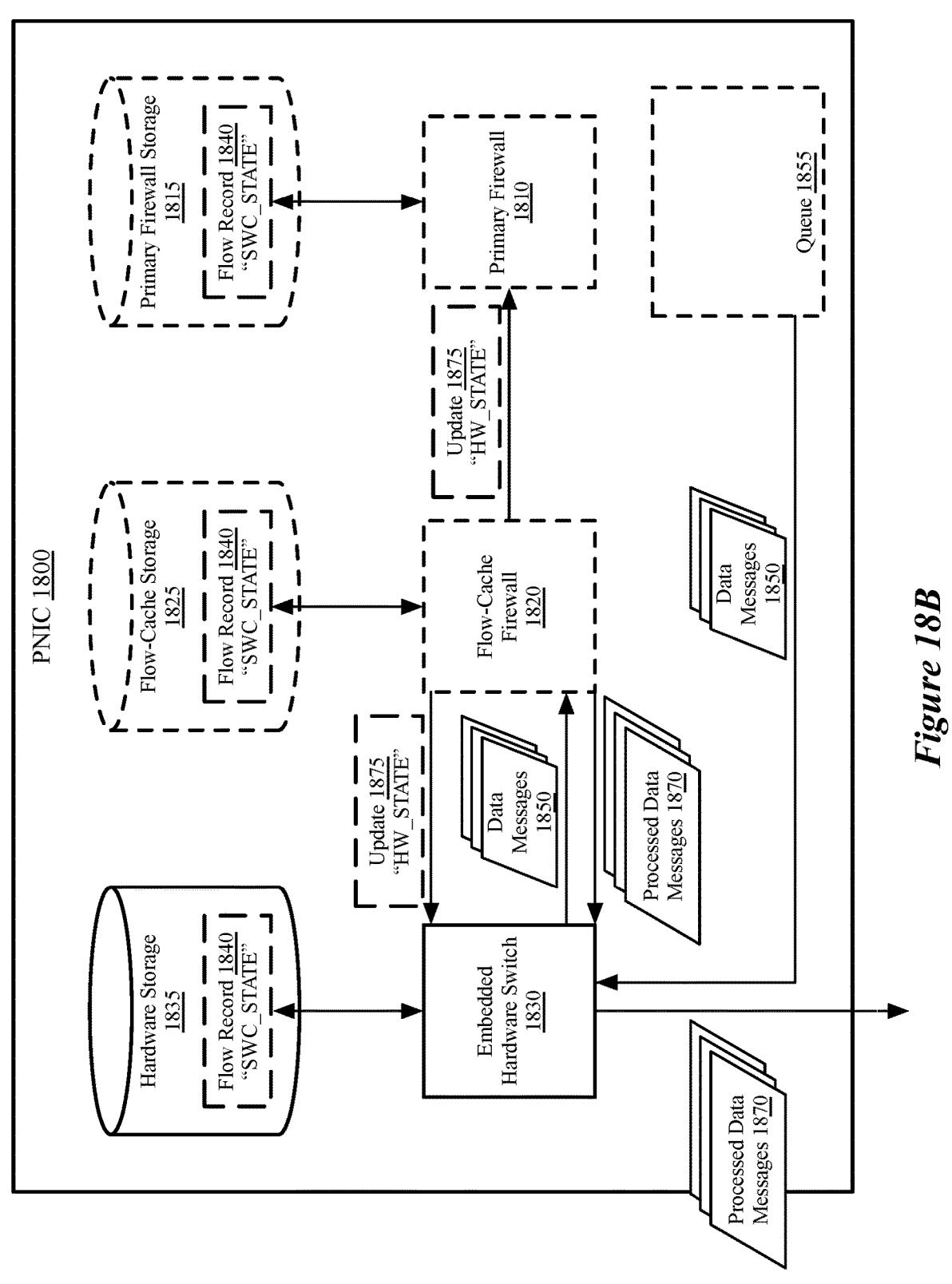

FIGS. 18A-B illustrate an example PNIC 1800 that includes a primary firewall 1810, a primary firewall storage 1815, a flow-cache firewall 1820, a flow-cache firewall storage 1825, an embedded hardware switch 1830, and an embedded hardware switch storage 1835. In this example, a particular flow is able to be processed by the primary firewall 1810, flow-cache firewall 1820, and embedded hardware switch 1830, and the state described below (in some embodiments, called the actual state) specified in the particular flow's flow record 1840 relate to which component is currently responsible for processing the particular flow. Conjunctively or alternatively, a second state (in some embodiments, called the desired state) is stored in the flow record 1840 to specify which component is capable of processing a flow, which will be described further below. Because the flow record 1840 stores connection tracking information along with a flow ID and a set of one or more actions to perform on the associated flow, it is a connection tracking record.

FIG. 18A illustrates the PNIC 1800 during the process of offloading the particular flow's processing from the primary firewall 1810 to the flow-cache firewall 1820. In this figure, the embedded hardware switch 1830 and the flow-cache firewall 1820 each store a flow record 1840 for the particular flow. This record 1840 specifies the state as "SWF_STATE" (i.e., software firewall state), meaning that the embedded hardware switch 1830 and the flow-cache firewall 1820 know to provide data messages of the particular flow to the primary firewall 1810, as it is currently assigned to process the particular flow.

Upon receiving data messages 1850 of the particular flow, the embedded hardware switch 1830 performs a lookup in its storage 1835, and finds the record 1840. Because the record specifies the state as the primary firewall 1810, the embedded hardware switch 1830 provides the data messages 1850 to the flow-cache firewall 1820. Upon receiving data messages 1850 of the particular flow, the flow-cache firewall 1820 also performs a lookup in its storage 1825 and finds the record 1840. Because the record specifies the state as the primary firewall 1810, the flow-cache firewall 1820 provides the data messages 1850 to the primary firewall 1810.

The primary firewall 1810 also stores the flow record 1840 for the particular flow. However, because the primary firewall 1810 is in the process of offloading the particular flow's processing, the primary firewall 1810 stores the flow record 1840 specifying the state as "IN_TRANSIT," meaning that offloading of the particular flow has been initiated but not completed. The primary firewall 1810 specifies this in its copy of the flow record 1840 in some embodiments because it waits to offload the particular flow's processing until all flow records for the particular flow have been created and provided to the flow-cache firewall 1820 (and the embedded hardware switch 1830, in some embodiments). Alternatively, the primary firewall's copy of the flow record 1840 specifies "SWF_STATE" like the flow-cache firewall 1820 and embedded hardware switch 1830.

For a bidirectional flow, the primary firewall 1810 in some embodiments creates two flow records for each direction of the flow, as the flow-cache firewall 1820 and the embedded hardware switch 1830 only process unidirectional flows. This is done in some embodiments to ensure that different directions of a same flow are not processed by different components of the PNIC 1800. When the particular flow is a TCP flow, the primary firewall 1810 in some embodiments waits to offload the TCP flow's processing until the connection has been established (i.e., when a three-way handshake has been completed to establish the connection). For TCP flows or other types of flows (e.g., UDP flows), the primary firewall 1810 waits to offload the flow's processing until it processes at least one data message per direction of the flow. Once the flow has been established and all flow records (if multiple are needed) have been created for the flow, then the primary firewall 1810 can offload the flow's processing.

Upon receiving the data messages 1850, the primary firewall 1810 in some embodiments stores them in a queue 1855 to be processed in the future. Because the primary firewall's copy of the flow record 1840 specifies that the offloading of the flow is currently being performed (i.e., "IN_TRANSIT"), the primary firewall 1810 knows to queue the data messages 1850 rather than process them. Alternatively, rather than queueing the data messages 1850, the primary firewall 1810 processes them using its copy of the flow record 1840.

After determining that the particular flow is ready for offloading (e.g., all flow records have been created and distributed to the flow-cache firewall 1820 and/or embedded hardware switch 1830, the flow has been established, etc.), the primary firewall 1810 provides a flow record update 1860 to the flow-cache firewall 1820. The update 1860 specifies "SWC_STATE" (i.e., software flow-cache state), which indicates to the flow-cache firewall 1820 that it is to update its copy of the flow record 1840 and process the particular flow. Because the particular flow is also able to be processed by the embedded hardware switch 1830 (i.e., the embedded hardware switch is capable of processing it), the update 1860 in some embodiments also specifies "HW_STATE" (i.e., hardware state), indicating to the flow-cache firewall 1820 that it can decide to further offload the particular flow's processing to the embedded hardware switch 1830. In embodiments where the embedded hardware switch 1830 is incapable of processing a flow but the flow-cache firewall 1820 is capable, the update 1860 does not specify "HW_STATE."

After receiving the update 1860 from the primary firewall 1810, the flow-cache firewall 1820 in some embodiments provides a different update 1865 to the embedded hardware switch 1830 specifying only "SWC_STATE." This notifies the embedded hardware switch 1830 that it is to update its copy of the flow record 1840 to specify "SWC_STATE." The flow-cache firewall 1820 does not notify the embedded hardware switch 1830 that it can process the particular flow (like the primary firewall 1810 did using the update 1860) because the flow-cache firewall 1820 has not yet decided to further offload the particular flow's processing.

FIG. 18B illustrates the PNIC 1800 after the primary firewall 1810, flow-cache firewall 1820, and embedded hardware switch 1830 have updated the flow record 1840 to specify "SWC_STATE." The primary firewall 1810 in some embodiments provides the queue data messages 1850 back to the embedded hardware switch 1830 for processing. Because the embedded hardware switch's copy of the flow record 1840 indicates that the flow-cache firewall 1820 is assigned to process the particular flow, the embedded hardware switch 1830 provides the data messages 1850 to the flow-cache firewall 1820 for processing.

After processing the data messages 1850, the flow-cache firewall 1820 provides the processed data messages 1870 to the embedded hardware switch 1830, which provides them to their destination (e.g., a VM, an external destination, etc.). During this state of the offloading process, the embedded hardware switch 1830 will also provide any subsequent data messages of the particular flow it receives to the flow-cache firewall 1820 for processing. The primary firewall 1810 no longer sees any data messages of the particular flow.

Because the primary firewall 1810 notified the flow-cache firewall 1820 that it can further offload the particular flow's processing to the embedded hardware switch 1830, the flow-cache firewall 1820 is able to further offload the processing at any time. In some embodiments, the flow-cache firewall 1820 immediately offloads the flow's processing to the embedded hardware switch 1830. In other embodiments, it waits until it has finished processing the data messages 1850 before it offloads the processing to the embedded hardware switch 1830. Still, in other embodiments, it waits until it has determined that it has processed one or more other subsequent data messages of the flow before offloading the processing to the embedded hardware switch 1830. The flow-cache firewall 1820 can wait any amount of time to offload processing to the embedded hardware switch 1830.

After determining that it will offload the particular flow's processing to the embedded hardware switch 1830, the flow-cache firewall 1820 provides an update 1875 to the embedded hardware switch 1830, specifying "HW_STATE." This update 1875 indicates to the embedded hardware switch 1830 that it is to update its copy of the flow record 1840, and that it will process the particular flow after updating the flow record 1840. In some embodiments, the flow-cache firewall 1820 also provides the update 1875 to the primary firewall 1810 to notify the primary firewall 1810 that the embedded hardware switch 1830 will now process the particular flow.

Figure 18C:
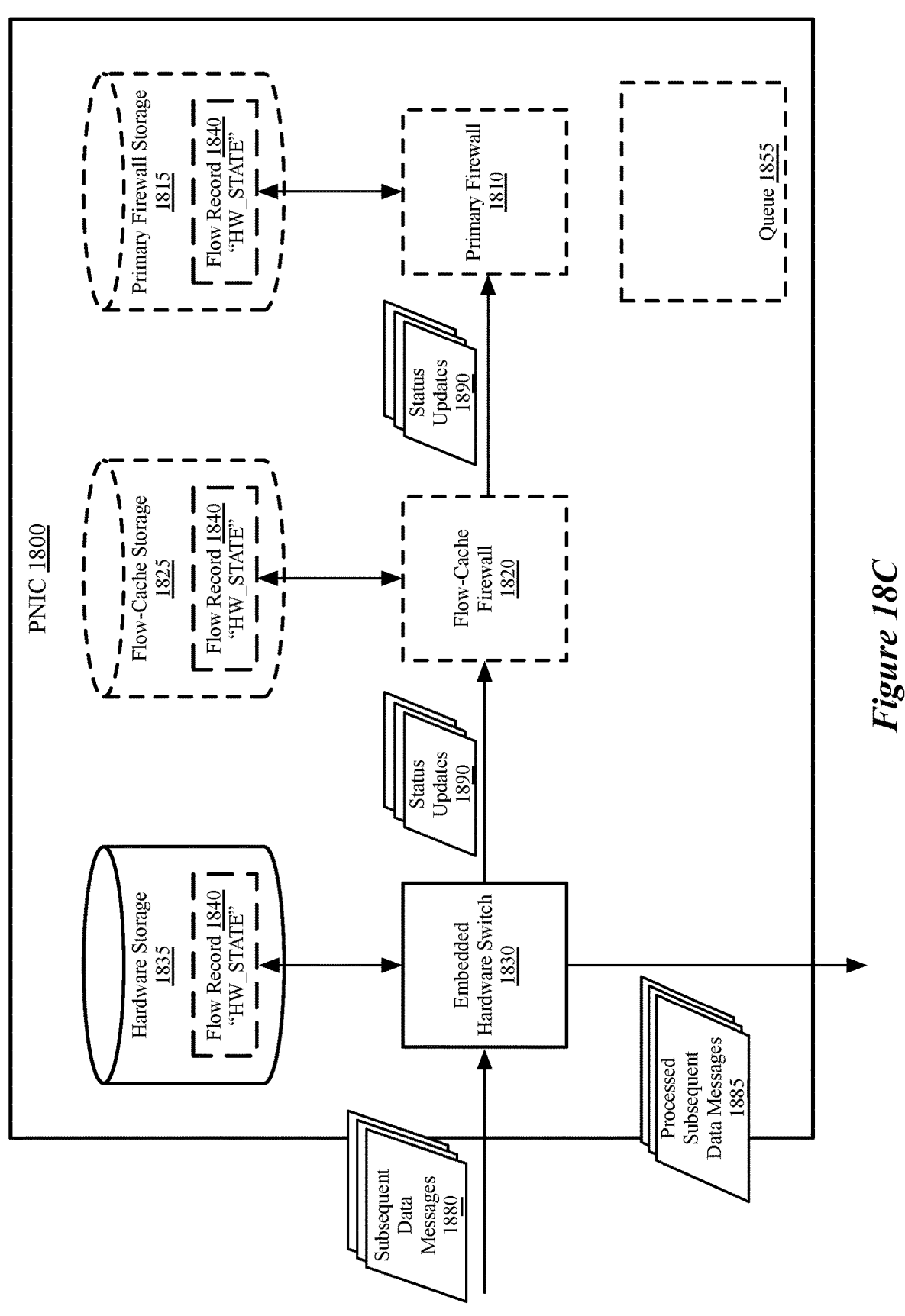

FIG. 18C illustrates the PNIC 1800 after the primary firewall 1810, flow-cache firewall 1820, and embedded hardware switch 1830 have updated the flow record 1840 to specify "HW_STATE." After making these updates, subsequent data messages 1880 for the particular flow are received, processed, and forwarded at the embedded hardware switch 1830. The flow-cache firewall 1820 and the primary firewall 1810 no longer see any data messages of the particular flow.

In some embodiments, the embedded hardware switch 1830 also provides status updates 1890 regarding the particular flow to the flow-cache firewall 1820, which provides them to the primary firewall 1810. Alternatively or conjunctively, the flow-cache firewall 1820 extracts the status updates 1890 from the embedded hardware switch 1830 to provide to the primary firewall 1810. The status updates 1890 include in some embodiments metrics regarding the particular flow (e.g., number of data messages of the particular flow that are being processed, number of bytes of the particular flow that are being processed, etc.). Any suitable metrics, statistics, or status updates for flows may be provided from the embedded hardware switch 1830 to the primary firewall 1810.

Although the above described embodiments of FIGS. 18A-C describe the flow-cache firewall 1820 determining when to further offload the particular flow and providing the update 1875 to the primary firewall 1810 and embedded hardware switch 1830, in other embodiments, the flow-cache firewall 1820 does not make some or all of these decisions on its own. In some of these embodiments, an orchestrator (not shown) of the PNIC 1800 aids the flow-cache firewall 1820 in making these decisions. Alternatively, the orchestrator makes these decisions itself and directs the flow-cache firewall 1820 to implement them.

As discussed previously, in some embodiments, a flow record for a flow specifies two states (i.e., a desired state and an actual state). The above-described actual states of FIG. 18A-C are example conceptualizations of an actual state. In other embodiments, the actual state (and/or the desired state) is indicated using a ternary value or flag (e.g., 0, 1, 2).

The desired state specified in a flow record indicates which component or components are capable of processing the flow. For example, the desired state specifies "SWF_STATE" or "0" indicating that only the primary firewall is capable of processing the flow. The desired state specifies "SWC_STATE" or "1" when the primary firewall and the flow-cache firewall are capable of processing the flow. The desired state specifies "HW_STATE" or "2" when the primary firewall, flow-cache firewall, and embedded hardware switch are capable of processing the flow. In some embodiments, the desired state is determined by the primary firewall. In other embodiments, it is determined by the orchestrator. After the desired state is determined, it is provided by the primary firewall to the flow-cache firewall and the embedded hardware switch for them to reflect the desired state in their local storages.

The actual state (as described in FIGS. 18A-C) specified in a flow record indicates which component is currently assigned to process the flow. When only the primary firewall is capable of processing a flow (i.e., when the desired state indicates this), the actual state will only be "SWF_STATE" or "0." When the primary firewall and the flow-cache firewall are capable of processing a flow (i.e., when the desired state indicates this), the actual state will either be (1) "SWF_STATE" or "0" indicating the primary firewall, or (2) "SWC_STATE" or "1" indicating the flow-cache firewall. When the primary firewall, the flow-cache firewall, and the embedded hardware switch are capable of processing a flow (i.e., when the desired state indicates this), the actual state will either be (1) "SWF_STATE" or "0" indicating the primary firewall, (2) "SWC_STATE" or "1" indicating the flow-cache firewall, or (3) "HW_STATE" or "2" indicating the embedded hardware switch. In some embodiments, the actual state is determined by the primary firewall or the flow-cache firewall. Conjunctively or alternatively, it is determined by the orchestrator. While examples of desired state values and actual state values are provided above, any suitable value for a desired state or an actual state may be used.

In some embodiments, poll counters of processing contexts of a flow-cache firewall are recorded. A processing context of a flow-cache firewall in some embodiments processes flows end-to-end, meaning that it processes the flows according to all of the services required to perform on them before sending the processed flows off (e.g., to a different processing context of a VNIC, to a PNIC queue). In some embodiments, processing contexts are pinned to a CPU such that one or more CPUs of the PNIC are fully dedicated to flow processing tasks.

In some embodiments, no actions are done until after the current poll counter of two processing contexts become greater than the one recorded. In some embodiments, this process is performed to ensure that data messages already being processed are done before providing the flow's flow record specifying "HW_STATE" to the embedded hardware switch. The second processing context in some embodiments copies the primary firewall connection state to the hardware connection state from the primary firewall connection state, and sets the flag in the hardware connection state to "HW_STATE." From this point, the hardware owns the entire connection state. Then, in some embodiments, the second processing context removes the transit flag, indicating that the connection state is completely moved to the hardware. In some embodiments, each processing context removes the flow from the offload pending list and reinjects queued data messages back to the hardware processing pipeline. In some embodiments, port migration is also unblocked after this process.

As discussed previously, flow connection tracking is moved back to primary firewall tracking from hardware tracking in some embodiments. When the software (e.g., primary firewall, flow-cache firewall) of a PNIC decides to switch from hardware connection tracking to software connection tracking, the software in some embodiments (1) queues data messages that come to it, (2) updates the software connection state with the state information stored in the embedded hardware switch, (3) sets the hardware connection state to "SWF_STATE," (4) processes queued data messages at the primary firewall, and (5) returns to normal flow processing without queueing data messages. In some embodiments, hardware to software connection tracking is performed when both directions of a flow are present, i.e., it is performed before any of the two flows for a single connection is deleted.

In some embodiments, the primary firewall of a PNIC also adds two flows to an offload pending list to corresponding processing contexts, and sets the connection state as "IN_TRANSIT." From this point, all new data messages coming to the primary firewall for the two flows of one connection are queued. Then, in some embodiments, the second processing context sets the flag in the hardware state to "SWF_STATE." From this point, the primary firewall maintains the flow's connection state. In some embodiments, data messages are sent to the primary firewall and are not processed at the embedded hardware switch. In such embodiments, the second processing context copies the hardware state to the primary firewall's connection state for the flow. The second processing context removes the "IN_TRANSIT" flag in some embodiments, which indicates that the connection state is moving to the software. In some embodiments, each processing context removes the flow from the offload pending list, processes queued data messages, and unblocks port migration.

Figure 19:
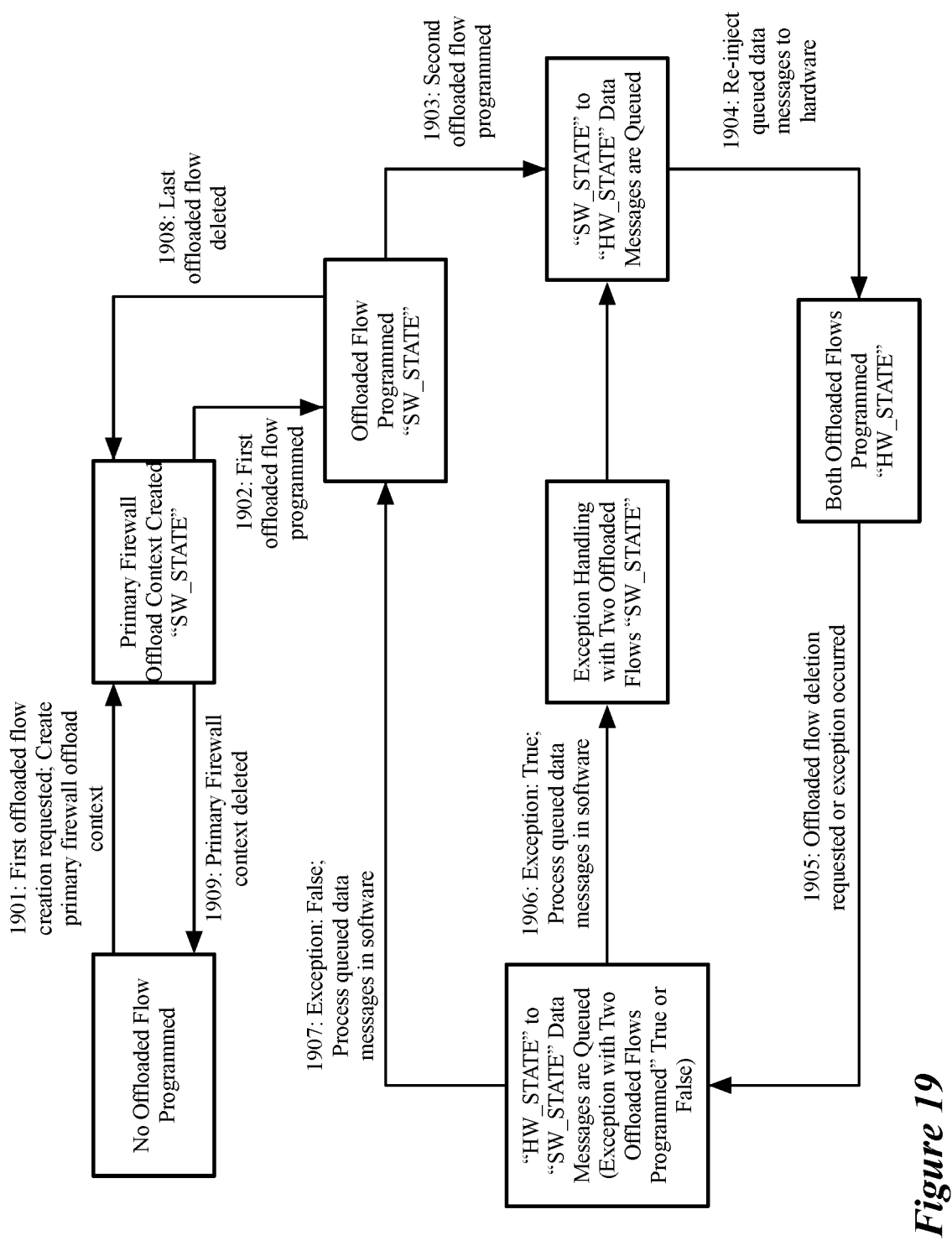
FIG. 19 illustrates an example state diagram of a flow processing offload process performed by a primary firewall of a PNIC that also executes an embedded hardware switch.

FIG. 19 illustrates an example state diagram of a flow processing offload by a primary firewall of a PNIC that also executes a flow-cache firewall and an embedded hardware switch. In this example, a single bidirectional connection is treated as two separate flows, as the flow-cache firewall and the embedded hardware switch only process unidirectional flows. At 1901, when no offloaded flow is programmed, a first offloaded flow creation is requested. In some embodiments, as this request is created for a first direction of the connection, the primary firewall offload context is created. After 1901, the primary firewall offload context specifies "SWF_STATE," meaning that the primary firewall is assigned to process the connection. At 1902, the first offloaded flow is programmed, and the first offloaded flow is programmed to specify "SWF_STATE." This first offloaded flow is a first direction of the connection, and the initially created context indicates that the primary firewall is to perform the first offloaded flow's processing. At 1903, the second offloaded flow is programmed, and the first and second offloaded flows are programmed to specify "HW_STATE." This second offloaded flow is the second direction of the connection, and the context of the two flows indicates that the hardware of the PNIC (i.e., the embedded hardware switch) is to perform the second offloaded flow's processing.

At 1904, the queued data messages of the connection are re-injected to the hardware, i.e., the primary firewall provides the data messages of the connection it queued back to the embedded hardware switch for processing. After this, both offloaded flows (i.e., both directions of the connection) are programmed to specify "HW_STATE." At 1905, either an offloaded flow deletion is requested (e.g., because the flow-cache firewall wishes to migrate the flow's processing back to the primary firewall) or an exception has occurred (e.g., a SYN data messages of a TCP flow was received specifying "FIN WAIT"). The software (i.e., the flow-cache firewall, the primary firewall) in some embodiments wishes to migrate a flow's processing back to the primary firewall because of a firewall rule change. A "FIN WAIT" state in some embodiments indicates that the source of the SYN data message wishes to shut down the connection and the flow. After 1905, the primary firewall offload context is changed to specify "SWF_STATE" instead of "HW_STATE."

When an offloaded flow deletion is requested or when an exception has occurred, some embodiments will reassign the connection (i.e., both directions of the connection) processing back to the primary firewall (e.g., because the embedded hardware switch no longer has the necessary information to process the flow). Because of this, both offloaded flows are reprogrammed to specify "SWF_STATE."

When the exception is true (i.e., when an offloaded flow deletion request is not received), at 1906, data messages of the connection are in some embodiments queued in the primary firewall, and the exception handling with the two offloaded flows is specified as "SWF_STATE." Then, the two offloaded flows are changed back to specify "HW_STATE" in some embodiments, and the process proceeds back to step 1904. In other embodiments, however, the two offloaded flows are still processed at the hardware even when an exception occurs. For example, in some embodiments, when the embedded hardware switch receives an unexpected SYN data message, it will drop the data message rather than providing a potentially unimportant SYN data message to the software. If the SYN data message is a legitimate SYN data message to end a connection, another SYN data message will be received in some embodiments from the source of the SYN data message that is requesting to end the connection.

When the exception is false (i.e., when an offloaded flow deletion request is received), at 1907, data messages of the connection (i.e., both directions of the connection) are queued in the software, and the offloaded flows are programmed to specify "SWF_STATE." Then, at 1908, the two offloaded flows are deleted so the primary firewall offloaded state specifies "SWF_STATE" again. Lastly, at 1909, the primary firewall offload context is deleted, and no offloaded flow is programmed anymore.

In some embodiments, an offloaded flow has a one to one mapping to a corresponding software-processed flow. A software connection state object in some embodiments has a one to one mapping to a primary firewall connection state. In some embodiments, a software connection state object has a one to one mapping to a hardware connection state. A software connection state object is created in some embodiments when a software-processed flow is created. Once a software-processed object connection state object is created, it won't be deleted until the primary firewall connection state is set to expire and is invalid in some embodiments. If the primary firewall detects that the primary firewall connection state is expiring or is invalid, in some embodiments, it clears software-processed flows and the software connection state object.

In some embodiments, each processing context re-scans offloaded flows to delete offloaded flows for invalidated software-processed flows. In such embodiments, this scanning is performed to detect rule changes and revalidate primary firewall connections. Re-validation is performed in some embodiments by consuming the meta information of the flow instead of consuming a data message. In some embodiments, software-processed flows have a fixed timeout and expire even though they are active. In such embodiments, this is so that data messages are sent to the primary firewall from time to time so that modules can consume them to refresh any kind of timeout values they are using. For example, media access control (MAC) learning aging in a virtual switch uses fixed timeouts. Flow creation and deletion is in some embodiments expensive with primary firewall actions due to software and hardware conditions. As such, in some embodiments flow deletion is avoided unless it is necessary.

In some embodiments, software-processed flow aging is updated by keeping active flows instead of using a fixed timeout from flow creation. To achieve this, two timestamps are maintained in some embodiments for a software-processed flow. One is used to keep track of flow expiration when the flow is idle. The other is used to periodically notify modules by either generating and sending a data message or calling into modules with necessary meta information (e.g., MAC address for a virtual switch module to refresh MAC learning information). For the latter approach, the primary firewall assembles the meta information specific to each module, which implements a new callback function to consume the meta data and refresh its timers.

In some embodiments, statistics for software-processed flows are maintained for each software-processed flow by updating the number of data messages in the flow and the number of bytes processed in the flow. These counters are updated back to modules when the software-processed flows are deleted using a callback framework. However, when flows offloaded to the embedded hardware switch, the software (e.g., the flow-cache firewall, the primary firewall) of the PNIC does not see any data messages of the offloaded flow. Because of this, in some embodiments, counters in offloaded flows are added. In some embodiments, the flow-cache firewall reads the counters and specifies them to the software-processed flows when offloaded flows are deleted. Then, the flow-cache firewall's existing statistics update mechanism updates modules with the collected counters. For the primary firewall, a bulk read capability provided by the embedded hardware switch is used in some embodiments to read the counters from a range of offloaded flows periodically and update the counters in software-processed flows.

Similar to statistics updates, the a flow-cache firewall in some embodiments periodically reads the aging bits or timestamps from hardware-offloaded flows and updates the timeout value of the corresponding software-processed flows. In some embodiments, the primary firewall session timeout is also updated so that the primary firewall purge thread does not purge active firewall sessions. In some embodiments, the timeout period of a primary firewall connection state depends on the current state of connection (e.g. TCP connection state). In such embodiments, the flow-cache firewall also reads the current TCP state when reading timestamp from offloaded flows so that the timeout value is properly adjusted based on the current TCP state.

In some embodiments, the flow-cache firewall periodically and frequently checks to see if the primary firewall connection state has timed out by using the above described revalidation mechanism. Once timeout is detected, software-processed flows and the corresponding software connection states are deleted. Regarding VM migration, all connection state data is in some embodiments extracted and transferred to the destination host of the migrating VM. When one or more flows associated with the migrating VM are offloaded to the PNIC hardware, these flows are in some embodiments invalidated for the VNICs of the VM. This is done in some embodiments before the primary firewall connection state information is copied over to the destination host.

In some embodiments, before extracting connection state information from the primary firewall, the hardware connection state for all connections is copied to the software (i.e., the primary firewall) connection state before the migration begins. Before migration begins, all flows for the VNIC(s) of the VM are invalidated, which triggers the hardware to software connection tracking switching. After this switch is done, the VM is migrated. Until the migration is complete, all flows associated with the migrating VM are processed in the software of the PNIC so that new flows are not created on the source host.

A primary firewall in some embodiments monitors the state of active connections and uses this information to determine which data messages to allow through the firewall. In some embodiments, the primary firewall is implemented in the hypervisor of the host computer and applied to VMs on a per-VNIC basis. That is, the firewall rules are enforced at the VNIC of each VM. Inspection of traffic happens at the VNIC of a VM just as the traffic is about to exit the VM and enter the virtual switch (egress), and just as the traffic leaves the switch but before entering the VM (ingress).

In some embodiments, the primary firewall is consulted during data message processing when the flow-cache firewall does not determine that itself is to process the data message. After the primary firewall processes the data message, if the primary firewall in some embodiments caches the created connection state for the flow of the data message. The flow-cache firewall also in some embodiments caches the connection state. In some embodiments, the flow-cache firewall carries a pointer to the primary firewall's connection state table it stores. For read/write access to the primary firewall connection state table, the flow-cache firewall in some embodiments uses a primary firewall API call.

Two main periodic operations occur in some embodiments with the flow-cache firewall and the primary firewall of a PNIC. The first operation is to read counters and the connection state from the embedded hardware switch. The second operation is to revalidate the flow-cache firewall's stored flow records by checking filters and the primary firewall's stored flow records. In some embodiments, the existing flows processed at the flow-cache firewall are periodically checked against filters, and if any change is detected (e.g., an allow action changing to a deny or reject action), the corresponding flow entry in the flow-cache firewall is invalidated. This invalidation causes all subsequent data messages of the flow to be processed at the primary firewall.

In some embodiments, the primary firewall is enabled on a port. In such embodiments, this is detected and the flow-cache firewall is invalidated, such that subsequent data messages will be processed at the primary firewall to apply configured rules. In some embodiments, the primary firewall is disabled on a port. This happens in some embodiments for various reasons. For example, the port is in some embodiments put in an exclude list. This is a primary firewall specific event initiated by an agent in some embodiments. As another example, the port is deleted in some embodiments, which impacts the entire stack. Still, as another example, this occurs during normal port deletion, such as during VM migration. In embodiments where the primary firewall is disabled on a port, revalidation of flows in some embodiments takes care of the issue.

Figure 20:
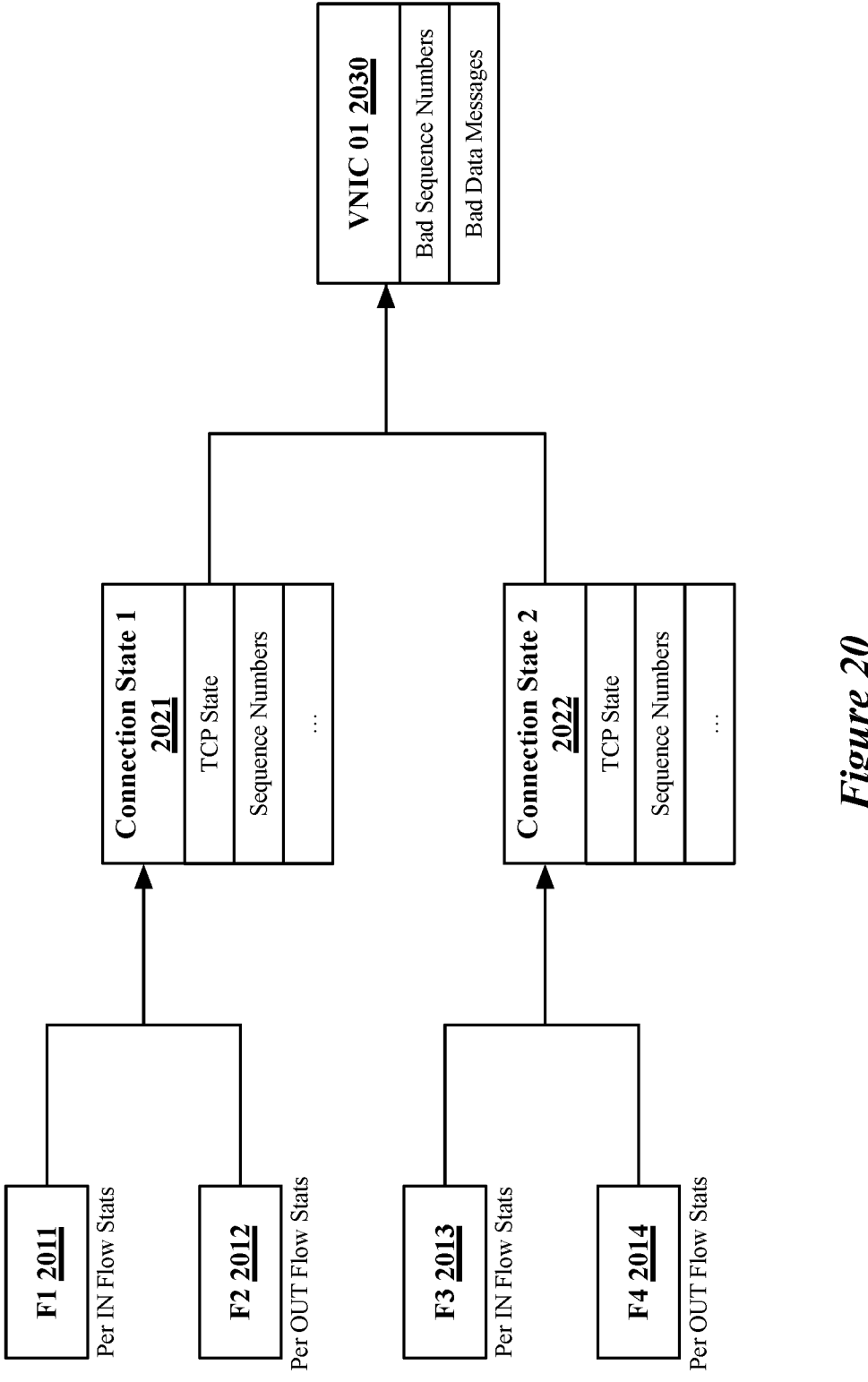
FIG. 20 illustrates four flows whose metrics are collected and stored at a PNIC.

As discussed previously, metrics associated with a flow are in some embodiments collected as the flow is processed at a PNIC. FIG. 20 illustrates an example of four flows 2011-2014 whose metrics are collected and stored at a PNIC. In some embodiments, two of the flows (e.g., flows 2011 and 2012) are two directions of a first connection, and the other two flows (e.g., 2013 and 2014) are two directions of a second connection. In other embodiments, the four flows 2011-2014 are of different connections. In some embodiments, the flows 2011-2014 are received at the PNIC for processing before they are forwarded to their destination(s). The flows 2011-2014 are associated with one or more VMs executing on a host computer connected to the PNIC.

The first and second flows 2011 and 2012 have statistics collected for them, which are written in the first connection state 2021. The third and fourth flows 2013-2014 also have statistics collected for them, which are written in the second connection state 2022. In some embodiments, the flows' statistics are collected by a primary firewall of the PNIC processing the flows 2011-2014. Conjunctively or alternatively, an embedded hardware switch of the PNIC collects the flows' statistics as it processes the flows 2011-2014. In this example, the connection states 2021 and 2022 each specify the TCP state associated with the flows and any sequence numbers associated with the flows.

Both of the connection states 2021 and 2022 and the statistics they specify are combined in some embodiments to specify VNIC statistics 2030 for a VNIC of the VM associated with the flows 2011-2014. These statistics 2030 specify a number of bad sequence numbers collected for the flows 2011-2014, and a number of bad data messages of the flows 2011-2014.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 21:
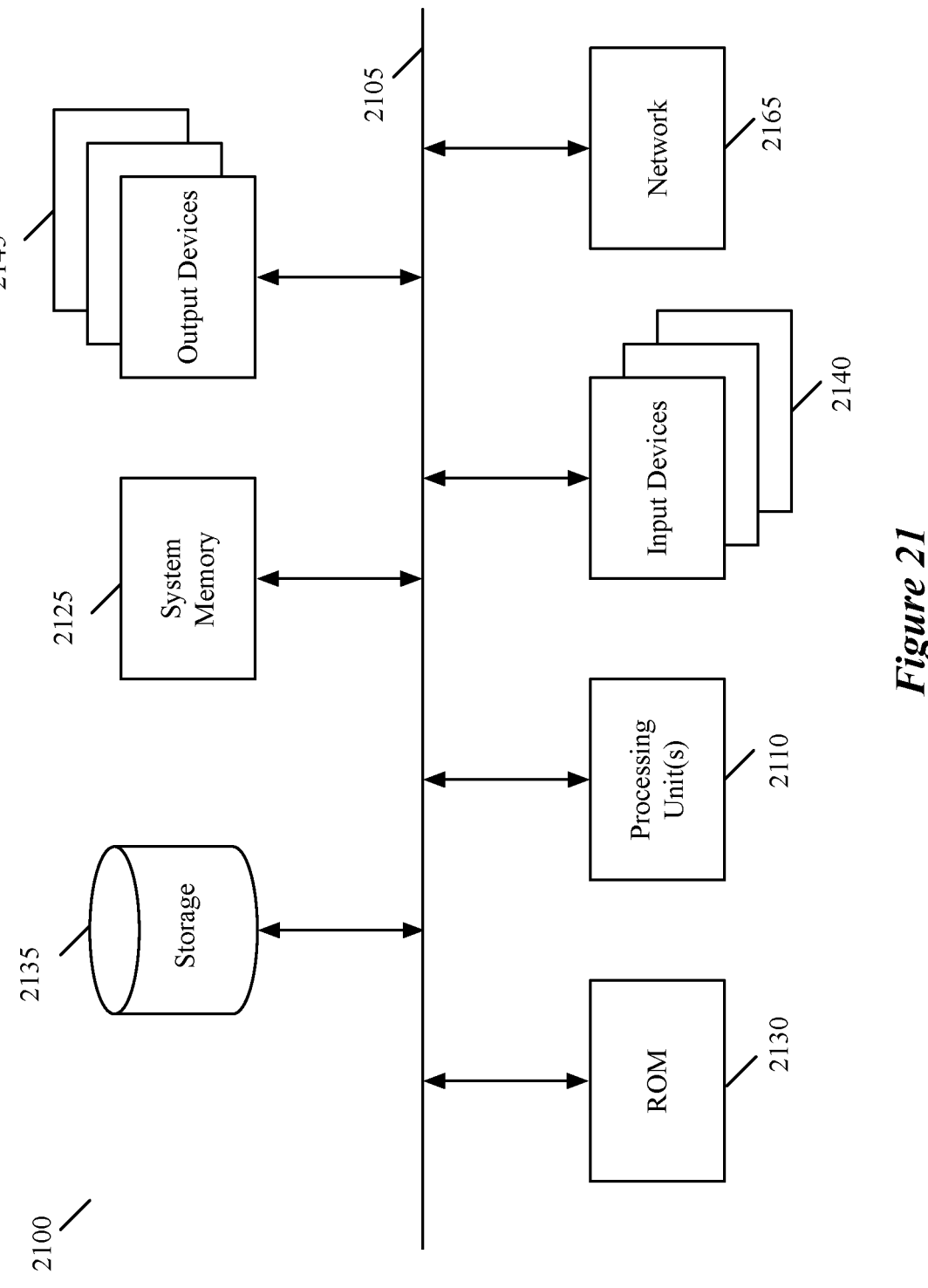
FIG. 21 conceptually illustrates an electronic system with which some embodiments of the invention are implemented.

FIG. 21 conceptually illustrates a computer system 2100 with which some embodiments of the invention are implemented. The computer system 2100 can be used to implement any of the above-described computers and servers. As such, it can be used to execute any of the above described processes. This computer system includes various types of non-transitory machine readable media and interfaces for various other types of machine readable media. Computer system 2100 includes a bus 2105, processing unit(s) 2110, a system memory 2125, a read-only memory 2130, a permanent storage device 2135, input devices 2140, and output devices 2145.

The bus 2105 collectively represents all system, peripheral, and chipset buses that communicatively connect the numerous internal devices of the computer system 2100. For instance, the bus 2105 communicatively connects the processing unit(s) 2110 with the read-only memory 2130, the system memory 2125, and the permanent storage device 2135.

From these various memory units, the processing unit(s) 2110 retrieve instructions to execute and data to process in order to execute the processes of the invention. The processing unit(s) may be a single processor or a multi-core processor in different embodiments. The read-only-memory (ROM) 2130 stores static data and instructions that are needed by the processing unit(s) 2110 and other modules of the computer system. The permanent storage device 2135, on the other hand, is a read-and-write memory device. This device is a non-volatile memory unit that stores instructions and data even when the computer system 2100 is off. Some embodiments of the invention use a mass-storage device (such as a magnetic or optical disk and its corresponding disk drive) as the permanent storage device 2135.

Other embodiments use a removable storage device (such as a flash drive, etc.) as the permanent storage device. Like the permanent storage device 2135, the system memory 2125 is a read-and-write memory device. However, unlike storage device 2135, the system memory is a volatile read-and-write memory, such a random access memory. The system memory stores some of the instructions and data that the processor needs at runtime. In some embodiments, the invention's processes are stored in the system memory 2125, the permanent storage device 2135, and/or the read-only memory 2130. From these various memory units, the processing unit(s) 2110 retrieve instructions to execute and data to process in order to execute the processes of some embodiments.

The bus 2105 also connects to the input and output devices 2140 and 2145. The input devices enable the user to communicate information and select commands to the computer system. The input devices 2140 include alphanumeric keyboards and pointing devices (also called "cursor control devices"). The output devices 2145 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 21, bus 2105 also couples computer system 2100 to a network 2165 through a network adapter (not shown). In this manner, the computer can be a part of a network of computers (such as a local area network ("LAN"), a wide area network ("WAN"), or an Intranet, or a network of networks, such as the Internet. Any or all components of computer system 2100 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, and any other optical or magnetic media. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. In addition, a number of the figures (including FIGS. 3, 5, 7, 9, 11, 13, 15, 17, and 19) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

The invention claimed is:

1. A method for migrating virtual machines (VMs) from a first host computer to a second host computer, the first host computer connected to a physical network interface card (PNIC) that performs middlebox service operations for data message flows associated with the VMs, the method comprising:

at the PNIC:

receiving a notification that a particular VM is to be migrated from the first host computer to the second host computer;

configuring an embedded hardware switch of the PNIC to forward a set of data message flows associated with the particular VM to a firewall of the PNIC, wherein the embedded hardware switch was initially programmed to process the set of data message flows instead of the firewall;

synchronizing flow cache information regarding the set of data message flows from a first flow record table of the embedded hardware switch to a second flow record table of the firewall; and processing the set of data message flows at the firewall until the particular VM is migrated to the second host computer.

2. The method of claim 1, wherein receiving the notification comprises receiving the notification at the embedded hardware switch.

3. The method of claim 2, wherein the notification is received from the particular VM.

4. The method of claim 3, wherein the notification is received from the particular VM through a virtual network interface card (VNIC) of the particular VM that connects to a virtual function (VF) of the PNIC.

5. The method of claim 4, wherein the VF is a virtualized peripheral component interconnect express (PCIe) function exposed as an interface of the PNIC.

6. The method of claim 5, wherein the VF is associated with a physical interface of the PNIC.

7. The method of claim 1, wherein configuring the embedded hardware switch comprises configuring the embedded hardware switch to forward the set of data message flows to the firewall without processing the set of data message flows.

8. The method of claim 1, wherein synchronizing the flow cache information comprises extracting, for each data message flow in the set of data message flows, a flow record from the first flow record table and storing the flow record in the second flow record table.

9. The method of claim 8, wherein each flow record for each data message flow comprises a flow identifier (ID) identifying the data message flow and a set of one or more actions to perform on data messages of the data message flow.

10. The method of claim 9, wherein the flow ID is at least one of a source network address, a destination network address, a source port, a destination port, a protocol of the data message flow, a virtual local area network (VLAN) ID, and a virtual network identifier (VNI).

11. The method of claim 9, wherein each set of actions for each data message flow comprises one of (i) allowing the data message flow, (ii) dropping the data message flow, or (iii) blocking the data message flow.

12. The method of claim 11, wherein at least one set of actions for at least one data message flow comprises performing at least one middlebox service operation on the data message flow.

13. The method of claim 12, wherein the at least one middlebox service operation is at least one of (i) an intrusion detection system (IDS) service, (ii) a network address translation (NAT) service, (iii) a load balancing service, and (iv) a deep packet inspection (DPI) service.

14. The method of claim 8, wherein, after the extracting, the first flow record table no longer stores the flow records for the set of data message flows such that the embedded hardware switch is no longer able to process the set of data message flows.

15. The method of claim 1 further comprising, while processing the set of data message flows at the firewall, providing the flow cache information and a set of firewall rules associated with the set of data message flows to the second host computer to migrate the particular VM to the second host computer.

16. The method of claim 15, wherein providing the flow cache information and the set of firewall rules to the second host computer comprises providing the flow cache information and the set of firewall rules from the firewall to the embedded hardware switch to provide to the second host computer.

17. The method of claim 1, wherein:

the firewall is a first firewall, the receiving, configuring, synchronizing, and processing are performed by a flow-cache second firewall of the PNIC, and processing the set of data message flows at the first firewall comprises providing the set of data messages to the first firewall for processing.

18. The method of claim 1, wherein the notification is a first notification, the method further comprising:

receiving a second notification that migration of the particular VM to the second host computer has failed; and after receiving the second notification, reconfiguring the embedded hardware switch to process the set of data message flows without providing the set of data message flows to the firewall.

19. The method of claim 18, wherein reconfiguring the embedded hardware switch comprises providing the flow cache information a second time to the embedded hardware switch to store in the first flow record table.

20. A non-transitory machine readable medium storing a program for execution by at least one processing unit for migrating virtual machines (VMs) from a first host computer to a second host computer, the first host computer connected to a physical network interface card (PNIC) that performs middlebox service operations for data message flows associated with the VMs, the program comprising sets of instructions for:

at the PNIC:

receiving a notification that a particular VM is to be migrated from the first host computer to the second host computer;

configuring an embedded hardware switch of the PNIC to forward a set of data message flows associated with the particular VM to a firewall of the PNIC, wherein the embedded hardware switch was initially programmed to process the set of data message flows instead of the firewall;

synchronizing flow cache information regarding the set of data message flows from a first flow record table of the embedded hardware switch to a second flow record table of the firewall; and processing the set of data message flows at the firewall until the particular VM is migrated to the second host computer.

\* \* \* \* \*